US009246979B2

(12) United States Patent
Bomgaars et al.

(10) Patent No.: US 9,246,979 B2
(45) **Date of Patent: *Jan. 26, 2016**

(54) METHOD AND SYSTEM FOR PROVIDING SECURE REMOTE ACCESS AND CONTROL

(71) Applicant: BOMGAAR CORPORATION, Ridgeland, MS (US)

(72) Inventors: Joel Bomgaars, Ridgeland, MS (US); Nathan McNeill, Brandon, MS (US); David Durham, Raymond, MS (US); Jeremy Cross, Kelowna (CA); Ryan Sleevi, Hernando, MS (US); Huey Jiun Ngo, Flowood, MS (US)

(73) Assignee: BOMGAR CORPORATION, Ridgeland, MI (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/046,666

(22) Filed: Oct. 4, 2013

(65) Prior Publication Data

US 2014/0040397 A1 Feb. 6, 2014

Related U.S. Application Data

(63) Continuation of application No. 11/764,691, filed on Jun. 18, 2007, now Pat. No. 8,589,489.

(60) Provisional application No. 60/814,867, filed on Jun. 19, 2006.

(51) Int. Cl.

| | |
|---|---|
| ***G06F 15/16*** | (2006.01) |
| ***H04L 29/08*** | (2006.01) |
| *H04L 12/24* | (2006.01) |
| *H04L 29/06* | (2006.01) |

(52) U.S. Cl.

CPC .............. *H04L 67/025* (2013.01); *H04L 41/22* (2013.01); *H04L 41/50* (2013.01); *H04L 63/20* (2013.01); *H04L 63/0428* (2013.01)

(58) Field of Classification Search

USPC .................. 709/205, 206, 217, 208, 221, 202

See application file for complete search history.

(56) References Cited

U.S. PATENT DOCUMENTS

| | | | |
|---|---|---|---|
| 6,327,579 | B1 | 12/2001 | Crawford |
| 6,353,446 | B1 | 3/2002 | Vaughn et al. |
| 7,376,538 | B1 | 5/2008 | Eatough |
| 7,539,733 | B2 | 5/2009 | Mohammed et al. |

(Continued)

OTHER PUBLICATIONS

Office Action for related U.S. Appl. No. 11/764,691, dated Jun. 11, 2009, 24 pages.

(Continued)

*Primary Examiner* — Lan-Dai T Truong

(74) *Attorney, Agent, or Firm* — Ditthavong & Steiner, P.C.

(57) ABSTRACT

A network appliance is configured to communicate with a representative system and a customer system. The network appliance permits control and access to the customer system by the representative system or to the representative system by the customer system for providing remote support service. The network appliance manages, logs, and routes screen updates of the customer system to the representative system. In addition, the network appliance logs and provides reports for all actions taken during the support service.

29 Claims, 77 Drawing Sheets

(56) References Cited

U.S. PATENT DOCUMENTS

| | | | |
|---|---|---|---|
| 2002/0161895 | A1 | 10/2002 | Appiah et al. |
| 2003/0008269 | A1 | 1/2003 | Helmick et al. |
| 2003/0233432 | A1 | 12/2003 | Davis et al. |
| 2004/0001514 | A1 | 1/2004 | Wookey et al. |
| 2004/0153712 | A1 | 8/2004 | Owhadi et al. |
| 2005/0038827 | A1 | 2/2005 | Hooks |
| 2005/0289226 | A1 | 12/2005 | Mohammed et al. |
| 2007/0033265 | A1 | 2/2007 | Anderson et al. |
| 2007/0176787 | A1 | 8/2007 | Iten et al. |
| 2007/0218875 | A1 | 9/2007 | Calhoun et al. |
| 2008/0065236 | A1 | 3/2008 | Bristol |
| 2009/0077184 | A1 | 3/2009 | Brewer et al. |

OTHER PUBLICATIONS

Office Action for related U.S. Appl. No. 11/764,691, dated Dec. 11, 2009, 35 pages.

Office Action for related U.S. Appl. No. 11/748,871, dated Nov. 1, 2010, 12 pages.

Office Action for related U.S. Appl. No. 11/748,871, dated Jul. 20, 2011, 19 pages.

Office Action for related U.S. Appl. No. 11/764,691, dated Sep. 21, 2012, 38 pages.

Citrix Online, LLC., "GoToAssist", 2005, 23 pages.

Citrix Online, LLC., "GoToMeeting", 2005, 4 pages, retrieved from web page: http://web.archive.org/web/20050603160514/http://www.gotomeeting.com/en_US/pre/howItWorks.tmpl?_sid=1036993%3AB8EE8C5CFD28E46.

500a

501

502

500b

500c

507

500d

504

500e

500f

500g

506

500h

500i

500j

509

500k

600a

600b

600c

600d

600e

600f

600g

600h

600i

600j

600k

600l

600m

600n

600o

600p

600q

600r

600s

600t

600u

600v

600w

600x

600y

600z

600aa

600bb

600cc

600dd

613

600ee

600ff

600gg

600hh

600ii

600jj

600kk

600ll

700b

700c

700d

700e

700f

700g

700h

700i

708

700

700k

700l

700m

700n

700o

700p

711

700q

712

700r

800a

800b

800c

800d

METHOD AND SYSTEM FOR PROVIDING SECURE REMOTE ACCESS AND CONTROL

RELATED APPLICATIONS

This application is a Continuation of U.S. application Ser. No. 11/764,691, filed Jun. 18, 2007, which is now a U.S. Pat. No. 8,589,489 and claims the benefit of the earlier filing date under 35 U.S.C. §119(e) of U.S. Provisional Application Ser. No. 60/814,867 filed Jun. 19, 2006, entitled "Method and Apparatus for Providing Secure Remote Access and Control"; the entireties of which are incorporated by reference.

BACKGROUND OF THE INVENTION

Information Technology (IT) companies (or departments) that manage their customers' (or organizations') computer systems are constantly challenged with the need to provide timely, secure, and cost-effective support. Remote support provides the means for IT professionals to remotely access and control customers' (or organizations') computer systems. This eliminates the need for these professionals to physically travel on-site to address a problem, thereby minimizing delay in response time.

Traditional remote support approaches possess a number of drawbacks. For example, an Application Service Provider (ASP) hosted approach (also known as Software as a Service, SaaS) requires customers to route all centrally stored or logged data communication through a 3rd party data center, thereby potentially introducing security risks. Also, a server software installation deployment model poses complicated, costly integration issues, particularly when implemented into a large IT infrastructure (e.g., corporate network).

Based on the foregoing, there is a clear need for a mechanism that can support secure remote access and control and enable ease of deployment, while minimizing security risks and cost.

DESCRIPTION OF THE PREFERRED EMBODIMENT

A method and apparatus for providing secure remote access and control are described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various embodiments of the invention are described with respect to a wired network and remote technical support services, it is contemplated that these embodiments have applicability to other networks including wireless systems, as well as other communication services.

Figure 1A:
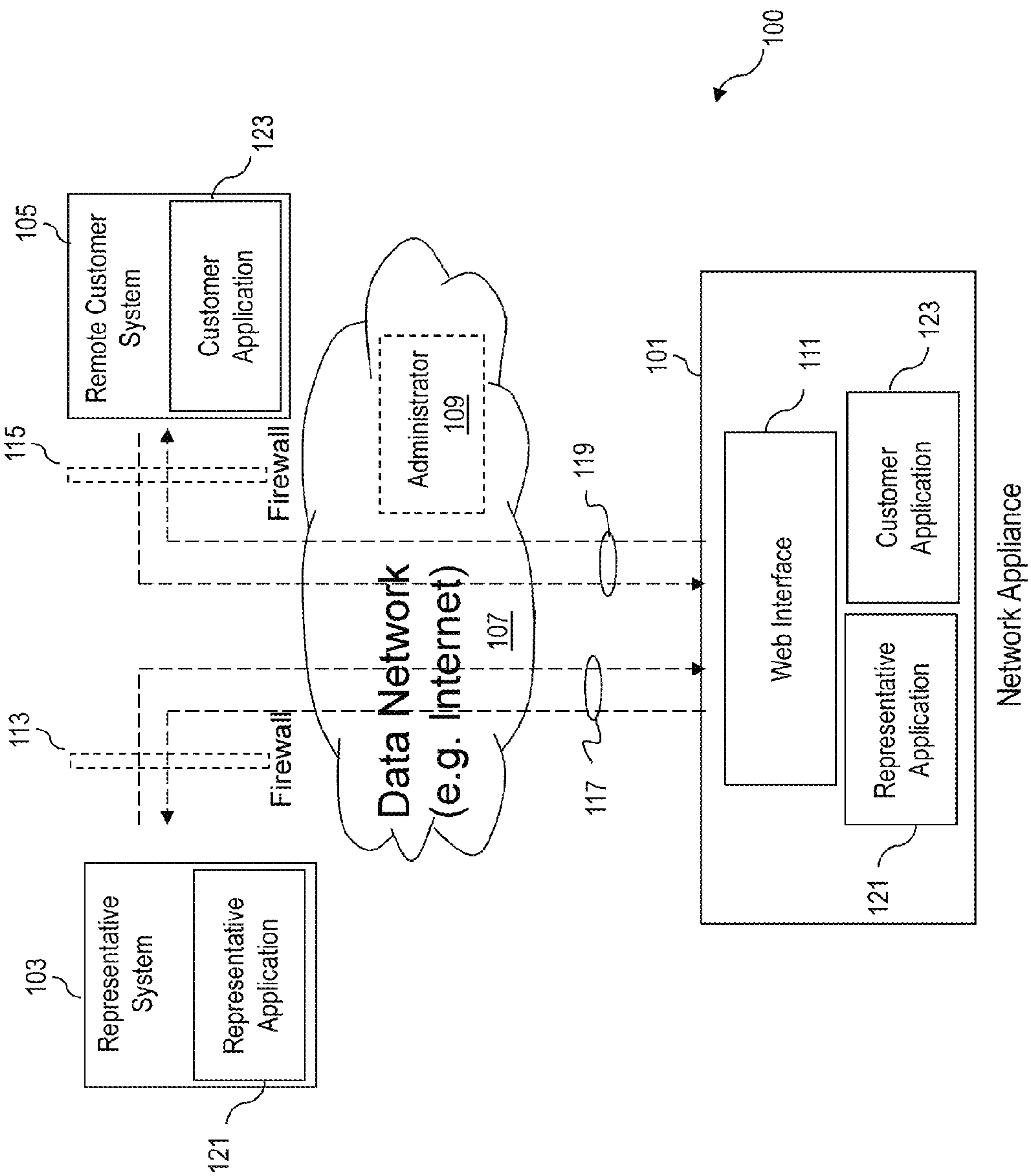
FIGS. 1A and 1B are diagrams, respectively, of a communication system and associated architecture capable of providing remote access and control, according to various embodiments of the invention.
Figure 1B:
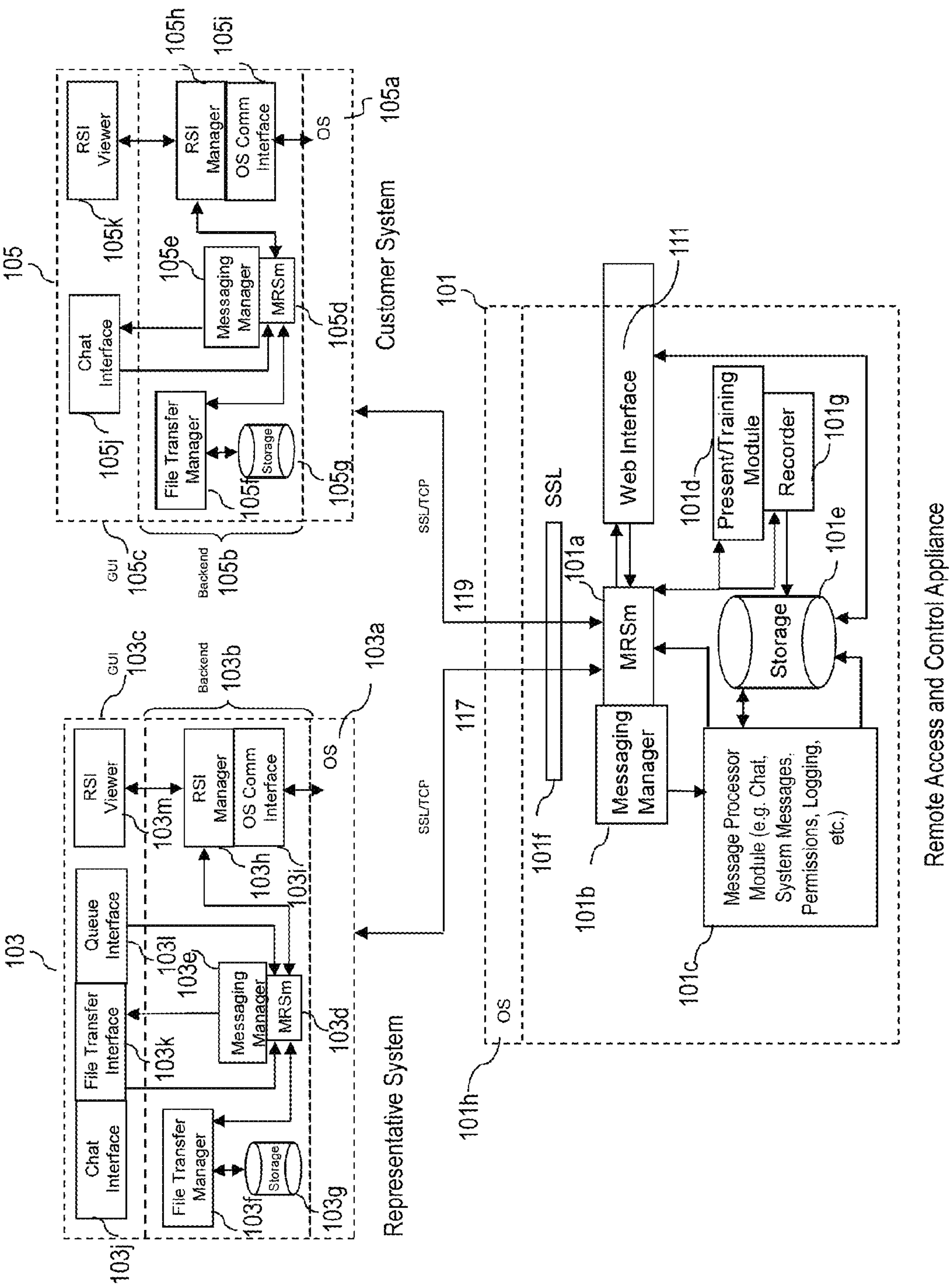

FIGS. 1A and 1B are diagrams, respectively, of a communication system and associated architecture capable of providing remote access and control, according to various embodiments of the invention. For the purposes of illustration, a communication system 100 (FIG. 1A) is described with respect to a remote support service (e.g., technical support), as facilitated by a network appliance 101, between a representative system 103 and a customer system 105. The network appliance 101, among other functions, is configured to provide remote access and control by the representative system 103 of the customer system 105, thereby enabling, for example, direct control and management of remote PC (personal computer) or remote server support. Thus, the appliance 101 is also referred to herein as a remote access and control appliance. According to one embodiment, the appliance 101 can be implemented as a standalone hardware device; alternatively, the appliance 101 can be virtualized—i.e., virtual appliance.

In this example, the representative system 103 provides, in certain embodiments, a remote support mechanism that is secure and implemented in a turnkey fashion to one or more remote customers systems 105 over a data network 107 using the network appliance 101. By way of example, the data network 107 can be an internetwork, such as the global Internet, or a private network. The traffic between the representative system 103 and any customer system 105 is handled and managed at the network appliance 101. In an exemplary embodiment, the network appliance 101 is managed by an administrator 109, who can access the network appliance 101 using a graphical user interface (GUI), such as a web interface 111. The network appliance 101, thus, has the capability of allowing on demand product use from anywhere in the world. For example, as long as the network appliance 101 is deployed accessible via a known network address (e.g., public Internet Protocol (IP) address), a support representative can log into his/her account via the web interface 111 hosted on the network appliance 101 to enable the support service functions.

The network appliance 101, according to an exemplary embodiment, is a rack-mountable device (e.g., 1U) that can be installed and deployed at the representative's organization or site; in this manner, data security is in full control of the representative's organization.

The remote access and control appliance 101 also enables the administrator 109 to change settings (configuration parameters) on the appliance 101 itself, in addition to the software it contains. The appliance 101 also provides management functions including the management of one or more representatives via the web interface 111. After physical installation of the appliance 101, the administrator 109 may log on to the appliance via the web interface 111 by using the appliance's public Uniform Resource Locator (URL) address.

In an exemplary embodiment, the representative system 103 can communicate with the customer system 105 using the network appliance 101 via the web interface 111 through one or more firewalls 113 and 115 over secure links 117 and 119. In one embodiment, the security on these links is achieved using the 256-bit Advance Encryption Standard (AES) Secure Sockets Layer (SSL). The firewalls 113 and 115 may be implemented at the representative's site, the remote customer's site, or at both sites. Alternatively, no firewall exists at either site. FIG. 1 illustrates the firewall 113 at the representative's site and the firewall 115 at the remote customer's site. According to one embodiment, the representative system 103 and the customer system 105 connect outbound to the appliance 101, thereby eliminating firewall incompatibilities. As such, the appliance 101 can operate through firewalls 113 and 115 as well as proxy servers (not shown).

The representative system 103 may provide remote support to the customer system 105 by downloading a representative application 121 from the network appliance 101 and establishing a session using the downloaded application 121. In an exemplary embodiment, the downloading (e.g., file transfer) can be executed via the web interface 111. Additionally, a customer system 105 may download a customer application 123 from the web interface 111 of the network appliance 101 to receive the necessary support service from the representative system 103. Such service can be provided by the downloaded program 121, which provides for the establishment of a support session. These processes are more fully described below with respect to FIGS. 3 and 4. Once the support representative has provided the necessary support to the remote customer, the remote customer application 123 can automatically be deleted from the customer system 105. As a result, the application 123 is no longer present at the customer system 105, thereby providing for increased security.

Each support session is initiated by the remote customer system 105 when a support issue occurs and is then discontinued automatically when the session is complete, allowing only a small, irregular period of time wherein the support traffic is crossing the Internet. This secure architecture provides the initial level of security, obscuring the entire support process by leaving existing security structures in place and spontaneously generating each support session.

Under the above arrangement, data from a remote support sessions can remain secure at a facility of the support representative's organization, freeing the representative organization from the compliance liabilities involved in, for instance, using application service providers (ASPs) for remote computer support. In one embodiment, as a software/hardware approach, the network appliance 101 eliminates the risk of incompatibilities with other applications that may be running in a shared server environment.

FIG. 1B shows an exemplary software architecture of the system of FIG. 1A, according to an embodiment of the invention. The remote access and control appliance 101, in various embodiments, execute software applications that can receive, handle, manage, and dispatch system or data messages to and from the representative and customer applications residing in the representative system 103 and the customer system 105, respectively, via secure links 117 and 119.

The architecture, in one embodiment, is formed based on a message handling and routing System—denoted as a Message Router System (MRS) which includes a collection of MRS modules (i.e., MRSm 101*a*). The MRSm's 101*a*, 103*d*, and 105*d* provide a message routing system that enables the routing of data within envelopes among the appliance 101, representative system 103 and remote customer system 105 with, for example, mailboxes as data endpoints. The mailboxes, which can be used for sending and receiving data, are also responsible for all handling of encoding (creation) and decoding of message envelopes with appropriately designed read and write methods. By way of example, the message envelope can include the following fields: a fromRouterID field specifying an identifier associated with the MRS 101*a*, a toRouterAddress field specifying addressing information of the destination routing module.

In addition, the MRS 101*a* can communicate with other modules in a manner similar to that described above. By way of example, the MRSm 101*a* can communicate with the web interface 111, a message manager 101*b*, a message processor module 101*c* (includes chat, permission, logging, etc), a present/training 101*d*, a secure layer module 101*f* (e.g., SSL wrapper module), and a recorder module 101*g*. The web interface 111 can communicate with other application modules via the MRS 101*a*.

In an exemplary embodiment, the web interface 111 includes the following: (1) a network configuration web interface; (2) a User/Admin web interface which includes but not limited to user profile configuration, log reporting interface, and administrative user interface; (3) a support portal that provides, in an exemplary embodiment, front end survey and session key submission components; and (4) a customer satisfaction (exit) survey. According to one embodiment, the web interface provides functions for configuring the appliance 101 to be deployed and integrated into the network infrastructure of the installer. In one embodiment, all other interfaces can communicate through the MRSm 101*a* or to a storage module 101*e* directly.

For ensuring proper dispatching of system messages received at the MRSm 101*a*, a message manager 101*b* can be used in this exemplary embodiment. These messages can include such data as chat data, session system data logging, system message posting, and system message queries, etc.

The message processor module 101*c* receives system messages from MRSm 101*a* via the message manager module 101*b*. These messages can include such date as chat, session system data logging, system message posting, system message queries, permissions queries, and storage data retrievals.

The present-training module 101*d* is configured to reduce the amount of screen update data transmitted from the client-side. In an exemplary embodiment, the present-training module 101*d* includes the following components (not shown): a viewer component, and one or more remote screen image servers. These servers collect RSI change updates and send them on to the RSI viewer via the MRSm 101*a*. The viewer component receives RSI update data from a client-side (remote-side in this case) server via the MRSm 101*a* and then sends the data off to the active servers to be transmitted to the appropriate destination. The main stream of RSI update data can be transmitted to the appropriate client via the MRSm 101*a*. Another stream of screen update data is transmitted to the recorder module 101*g* to be written into the storage module 101*e*.

The SSL module 101*f* ensures that the data transfer between the appliance 101 and the representative and customer system (103 and 105) is encrypted, e.g., 256-bit AES SSL encryption over links 117 and 119.

In one embodiment, the remote access and control appliance 101 utilizes an operating system (OS) 101*h* that supports a variety of applications. For example, a web server application can run on top of the OS 101*h* to provide web hosting capabilities. The OS 101*h* can also support SSL. The SSL wrapper module 101*f* provides SSL over Transmission Control Protocol (TCP) or other network protocols.

As described, in one embodiment, the network appliance utilizes an OS 101*h* with a web server for providing web hosting capabilities. The routing and handling module (e.g., MRSm) 101*a*, which is a transport layer atop the OS 101*h*, provides various network facilities. Accordingly, MRSm 101*a* provides the generic means of transporting data from one system to another.

The MRSm 101*a* of the network appliance 101 can communicate with the customer application of customer system 105, and the representative application of the representative system 103 or another appliance.

Under this example, the representative system 103 and customer system 105 include operating systems 103*a*, 105*a*; backend components 103*b*, 105*b*; and GUIs 103*c*, 105*c*. The backend components 103*b* of the representative system 103 can include a MRSm 103*d*, a message manager module 103*e*, and a file transfer manager module 103*f*. The module 103*f* interfaces with a storage module 103*g*, which is configured to store retrieved content stemming from the operation of the file transfer manager module 103*f*. The backend components 103*b* also include a RSI manager module 103*h*. Yet another module 103*i* (i.e., OS interface module), which is integral to the backend components 103*b*, provides communication interfaces to the OS 103*a*. As shown, the backend components 105*b* of the customer system 105 resemble that of the backend components 103*b* of the representative system 103: a MRSm 105*d*, a message manager module 105*e*, and a file transfer manager module 105*f*, a storage module 105*g*, a RSI manager module 105*h*, an OS interface module 105*i*.

As for the GUI 103*c*, the representative system 103 can provide a number of interfaces depending on the applications. For instance, the GUI 103*c* can include a chat interface 103*j*, a file transfer interface 103*k*, a queue interface 103*l*, and a viewer 103*m*. In this example, the customer system 105 utilizes a chat interface 105*j* and a viewer 105*k*. The GUI 103*c* can include other interfaces such as remote command shell, system diagnostics, and system information to name a few. The GUI 105*c* can include application specific chooser interface to only allow specific application viewing.

As explained with respect to the operation of the network appliance 101, the MRSm 103*d* is the medium for handling all messages coming to the representative application 121 and all messages sent from the representative application 121. The MRSm 103*d* communicates with the message manager 103*e*, a RSI manager 103*h*, and the file-transfer manager modules 103*f*. The system messages, session data, and chat data are delivered to the message manager module 103*e*. The MRSm 103*d* sends, as well as receives, system/control messages and RSI update data to and from the RSI manager module 103*h*. The MRSm 103*d* interacts with the file-transfer manager 103*f* in sending and receiving system messages and file-transfer data.

The file-transfer manager 103*f* handles all remote-to-local and local-to-remote (i.e. between the representative system and the customer system) reading and writing of files. The system messages and file-transfer data are received and sent through the MRSm 103*d*. Notably, the file-transfer interface module 103*k* on the GUI component 103*c* receives data from the MRSm 103*d* and sends all data directly to the MRSm 103*d*. Assuming the permissions to the customer file system access have been granted, the processes and steps involved in transferring a file from representative storage 103*g* to the customer storage 105*g* include an initiation of a file transfer from the file-transfer GUI, a system command message sent to the MRSm 103*d*. MRSm 103*d* delivers the command to the file-transfer manager module 103*f* to execute on constructing the data to be sent to MRSm 105*d* of the customer system 105 via the MRSm 103*d*. A system notification message is delivered to the message manager 103*e* via MRSm 103*d* to be displayed in the chat GUI 103*j* after being delivered there by the message manager 103*e*. The processes and steps involved in transferring a file from the customer to the representative include an initiation from the file-transfer GUI 105*k*, a system command message sent to the file-transfer manager 105*f* via the customer MRSm 105*d*. The file-transfer manager 105*f* constructs a proper remote file transfer request, which is then sent through the customer MRSm 105*d* to the representative MRSm 103*d* through the MRSm 101*a* on the appliance. The representative MRSm 103*d* receives the request command, delivering it to the remote file-transfer manager 103*f*, which in turn, receives the file system data requested to be transmitted back to the customer MRSm 105*d* by the representative MRSm 103*d* through the MRSm 101*a* on the appliance. The representative MRS 103*d* delivers the file system data received from the customer MRS 105*d* to the file-transfer manager 103*f* for processing and storing in the local file system storage 103*g*. Also, a system notification message as well as a file-transfer GUI refresh command is delivered to the file-transfer GUI 103*k* via the dispatcher 103*e* from the MRS 103*d*.

The RSI manager modules 103*h* and 105*h*, in one embodiment, includes the following components: a RSI updater, which “paints” the RSI viewer GUIs 103*m* and 105*k* with RSI screen update data; RSI server, which utilizes the OS Communication Interface modules 103*i* and 105*i*. The OS communication interface modules 103*i* and 105*i* interfaces with the OS system 103*a* and 105*a* for detecting and listening for screen and system updates, collecting these updates, and packaging and encoding these updates into data to be then sent to the viewing system via the respective MRSm’s.

The RSI manager modules 103*h* and 105*h* can also provide the capability of reverse viewing. In this mode, the viewing of the remote system is reversed to being viewed by the remote system.

The network appliance 101 also permit support representatives to predict and lower the total cost of ownership (TCO) vis-à-vis the ASP model, in which the support representatives are typically charged a monthly fee. With the network appliance 101, representatives can predict their budget without monthly fees, surcharges or overages.

Figure 2:
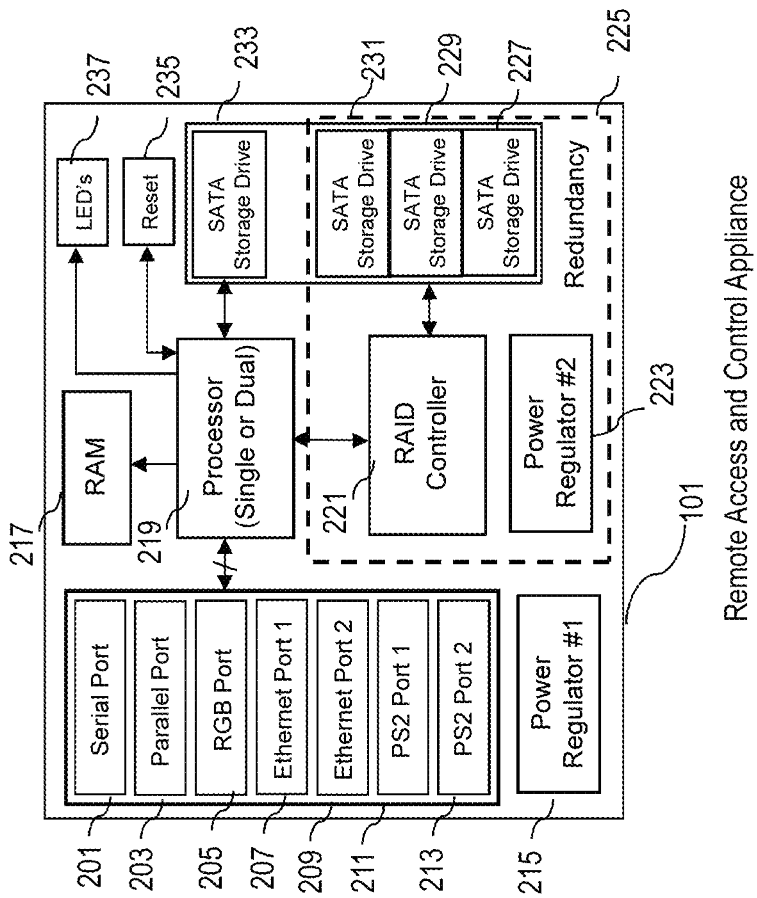
FIG. 2 is a diagram showing exemplary components of a network appliance, according to various embodiments of the invention.

FIG. 2 is a diagram showing exemplary components of a network appliance, according to various embodiments of the invention. The network appliance 101, in one embodiment, comprises various component interfaces, including serial and parallel ports 201 and 203, a display interface (e.g., an RGB (Red, Green and Blue) port 205), local area network (LAN) ports (e.g., Ethernet ports) 207 and 209, and input device ports (e.g., PS2) 211 and 213. The network appliance 101 also contains a power regulator 215, internal memory in the form of RAM (Random Access Memory) 217, one or more processors 219, each which may be a multi-core processor, LEDs (Light Emitting Diodes) 237, reset control 235 and a SATA (Serial Advanced Technology Attachment) storage drive 233.

As mentioned, the network appliance 101, in an exemplary embodiment, can be a 1U rack-mountable server hardware. However, it is contemplated that configurations other than those illustrated in FIG. 2 can be constructed, depending on the particular applications. For example, different types of appliances can be designed for different uptime requirements. With uptime-critical customers, the network appliance 101 provides for fail-over redundancies; e.g., use of multiple disk drives 227-231, for Fail-over and Hot-Swap capabilities via a RAID (Redundant Array of Independent Disks) controller 221. This configuration of the appliance 101 can also be equipped with a backup AC-DC (Alternating Current-Direct Current) regulator 223, which can be triggered when the main regulator 215 is detected as non-functional. Alternatively, for non-uptime-critical customers, the network appliance 101 can be configured without the additional hardware and/or software required for providing redundancies.

The network appliance 101 is configured to communicate with the representative system 103 and the customer system 105, and can be collocated within either of these systems 103 and 105. The network appliance 101, in various embodiments, execute software applications that can receive, handle, manage, and dispatch system or data messages to and from the representative and customer applications within the respective systems 103 and 105 via secure links 117 and 119. In one embodiment, the security on these links is achieved using the 256-bit Advance Encryption Standard (AES) Secure Sockets Layer (SSL).

As earlier described, the network appliance 101, in an exemplary embodiment, can be a virtual appliance. Such software appliance can be run in a virtual environment. For instance, an image of the operating system and base software application can be installed on a virtual machine. Virtualization provides an abstraction layer that separates the operating system from the hardware, as to permit resource sharing. In this matter, different virtual machines (using heterogeneous operating systems) can co-exist on the same hardware platform.

On the customer side, the customer application 123 is installed temporarily (in one embodiment). The customer application 123, in an exemplary embodiment, can be a native application, as to achieve a reduced executable size for quick download by the remote customer from the network appliance 101. Architecturally, this application 123 can be identical to the representative application 121. One difference with this application is the use of an uninstaller component, in which the application is capable of uninstalling itself when, for example, a session is completed with proper termination, a session is ended by the user of this customer application, or a session connection timed out. In the alternative, the customer application 123 can be permanently installed.

With the above arrangement, the representative application 121 via the network appliance 101 can securely communicate with the customer application 123 to access and control the customer system 105.

Figure 3:
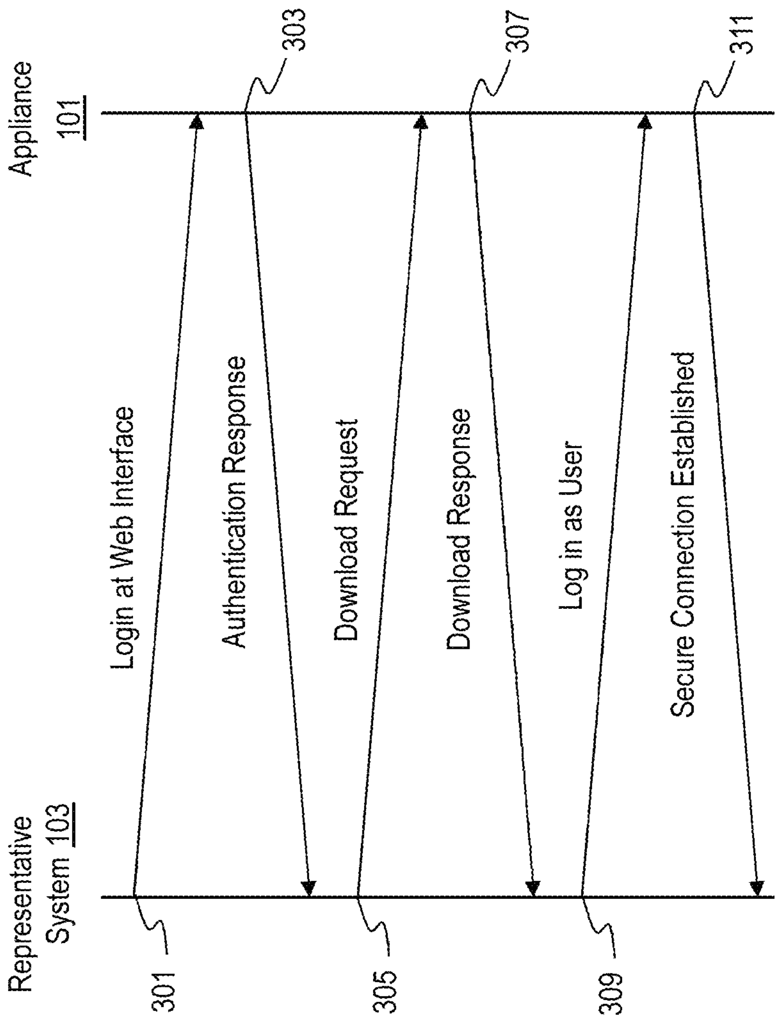
FIG. 3 is a ladder diagram of a process for establishing secure communication between a network appliance and a representative system, according to an exemplary embodiment.

FIG. 3 is a ladder diagram of a process for establishing secure communication between the network appliance 101 and the representative system 103, according to an exemplary embodiment. In step 301, a representative user utilizing the representative system 103 can visit the web interface 111 of the network appliance 10 by entering a public Uniform Resource Locator (URL) and supply login information. In one embodiment, the login information has been set up by an administrator of the network appliance 101. Once the representative system 103 is authenticated through acknowledgement of an authentication response, the system 103 can issue a download request for an application program (e.g., representative software), per steps 303 and 305. In response, the network appliance 101 supplies the representative application 121 to the system 103, per step 307. Accordingly, the representative application 121 can be installed and executed by the representative system 103.

Once the representative system 103 executes the representative application 121 to provide customer support, the user can now log into the network appliance 101 (step 309). Thereafter, in step 311, a secure connection is established between the representative application 121 and the network appliance 101 using the use of the installed client program 123.

The above process establishes the segment of the secure communication from the representative application 121 to the network appliance 101. Next, a secure communication session can be established between the network appliance 101 and the customer application 123.

Figure 4:
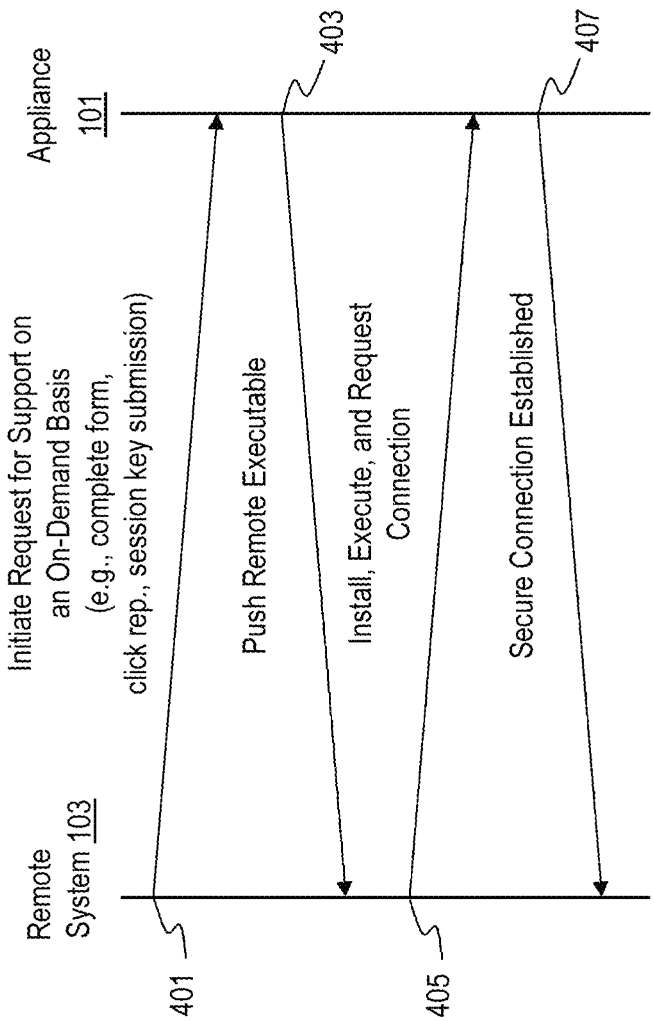
FIG. 4 is a ladder diagram of a process for establishing secure communication between a network appliance and a customer system, according to an exemplary embodiment.

FIG. 4 is a ladder diagram of a process for establishing secure communication between the network appliance 101 and the remote customer system 105, according to an exemplary embodiment. As described, the customer can initiate the support session. For this to occur, the customer system 105 can access the website of the network appliance 101 through the web interface 111. Via this interface 111, the remote customer system 105 submits, as in step 401, a session initiation request to the network appliance 101. The session initiation request by the customer may be realized using various methods: (1) by either completing and submitting a form, (2) by directly selecting a representative from a list of representatives, or (3) by contacting the representative and the representative issuing the customer a session key (e.g., a one-time, randomly generated key).

Regardless of the method by which the customer chooses to initiate a session, the appliance 101 then supplies (e.g., pushes) the remote customer system 105 with a customer application's installer package 106 (in step 403). After downloading the installer package 106, the customer system 105 runs the program. This package 106 can be, for example, a self-executable file of the customer application 123. The network appliance 101 then establishes a secure connection with the remote customer system 105 in response to a request by the remote customer system 105, as in steps 405 and 407. Once the secure connection is established, the representative and the customer can interact securely over the network appliance for support.

FIGS. 5A-5K are diagrams of a graphical user interface (GUI) for providing administrative functions within the network appliance 101 of FIG. 1, according to an exemplary embodiment. The remote access and control appliance 101 comprises an administrative interface, which allows a network administrator 115 of FIG. 1 to change settings on the appliance 101 using any one or more screens 500*a*-500*k*. After physical installation of the network appliance 101, the administrator 115 may log on to the appliance administrative interface by accessing the appliance administration homepage through a public URL.

Figure 5A:
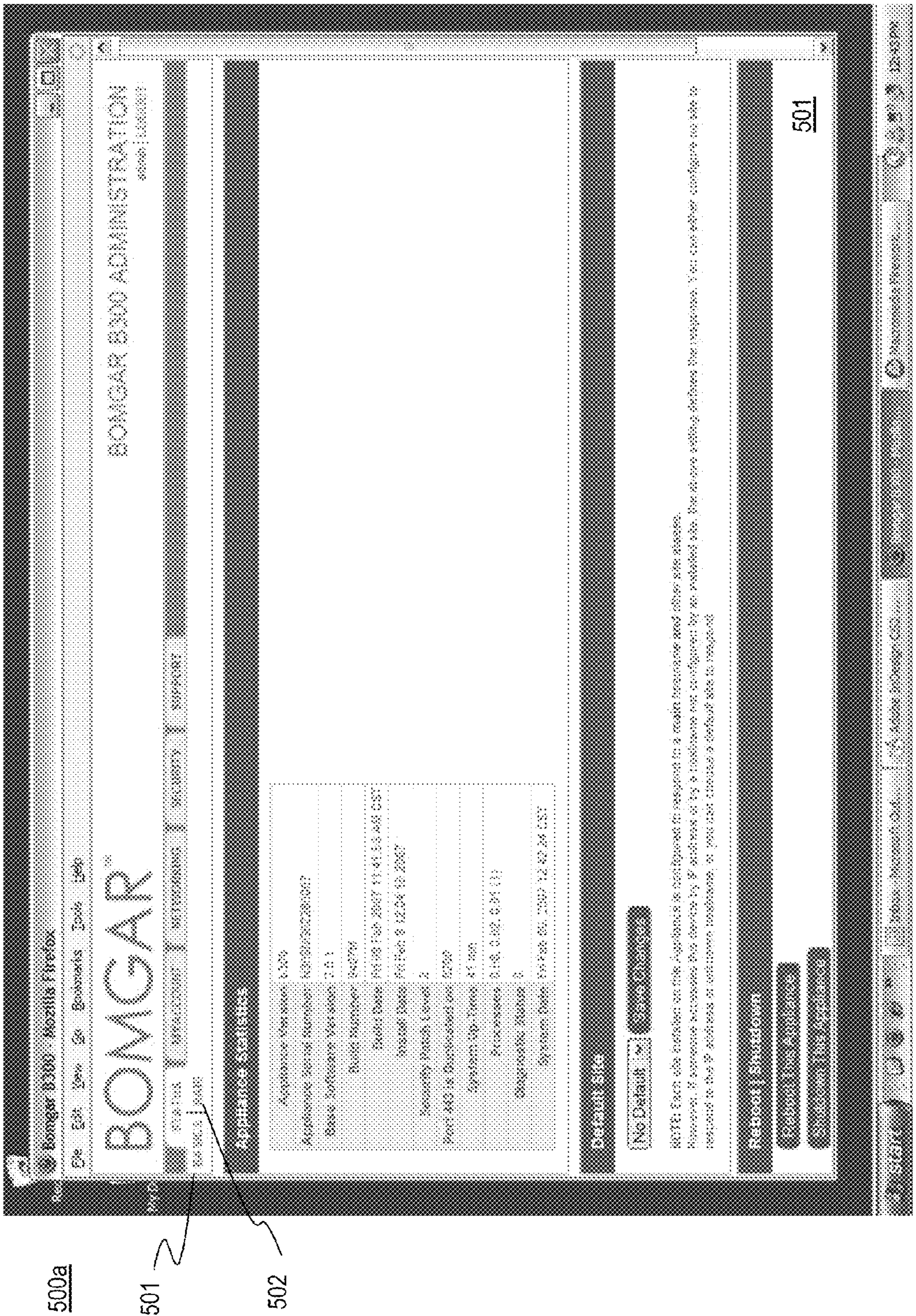
FIGS. 5A-5K are diagrams of a graphical user interface (GUI) for providing administrative functions within the network appliance of FIG. 1, according to an exemplary embodiment.

Tab 501 titled "Main Basics" in FIG. 5A illustrates the appliance administration "Main Basics" page in the appliance administration homepage. This page provides statistical information about the network appliance 101 and allows the administrator to monitor operation of the appliance 101.

Figure 5B:
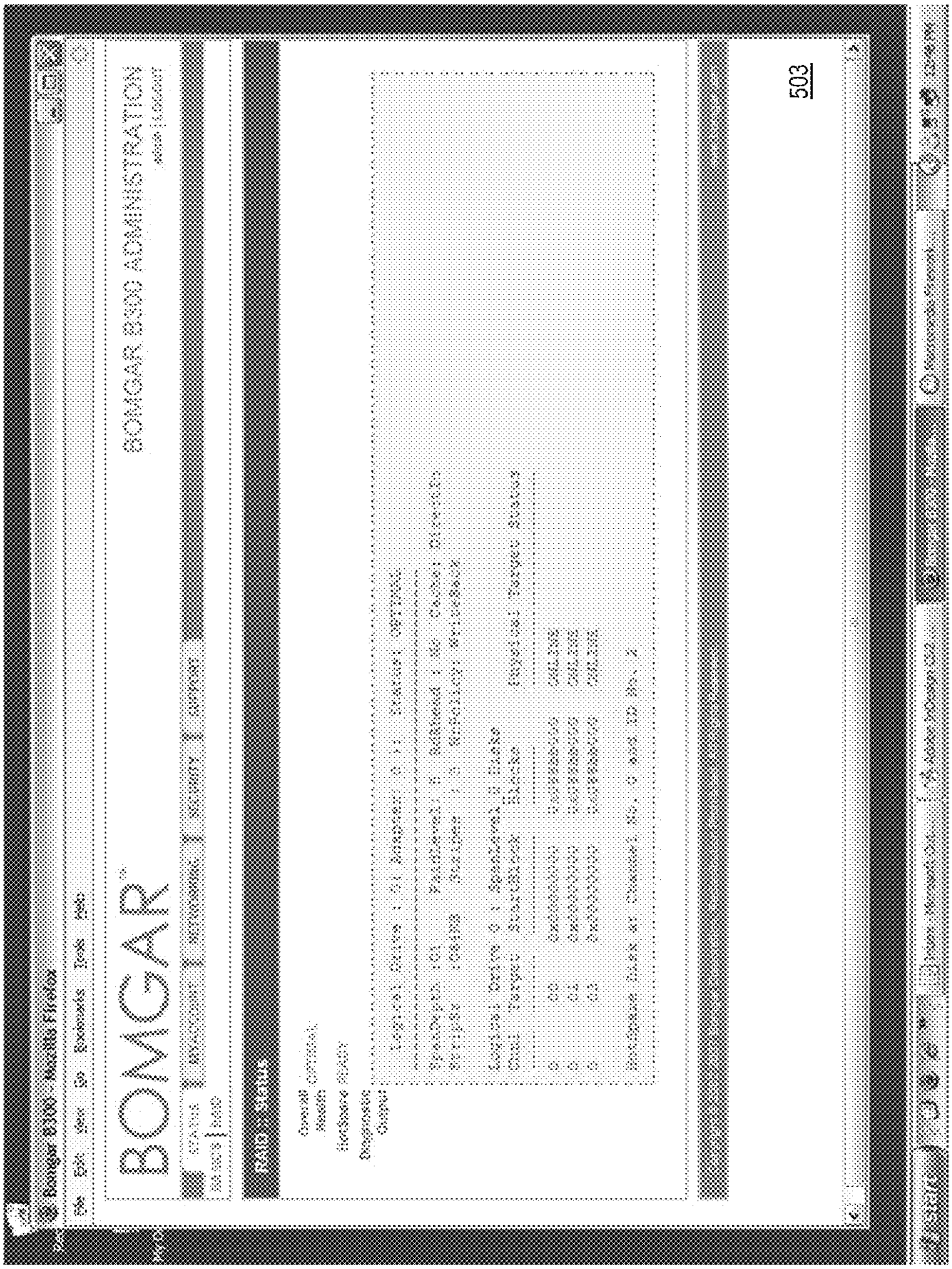

From the "RAID" tab 502, the administrator can also view the hard drive status of the network appliance 101 as illustrated in FIG. 5B.

Figure 5C:
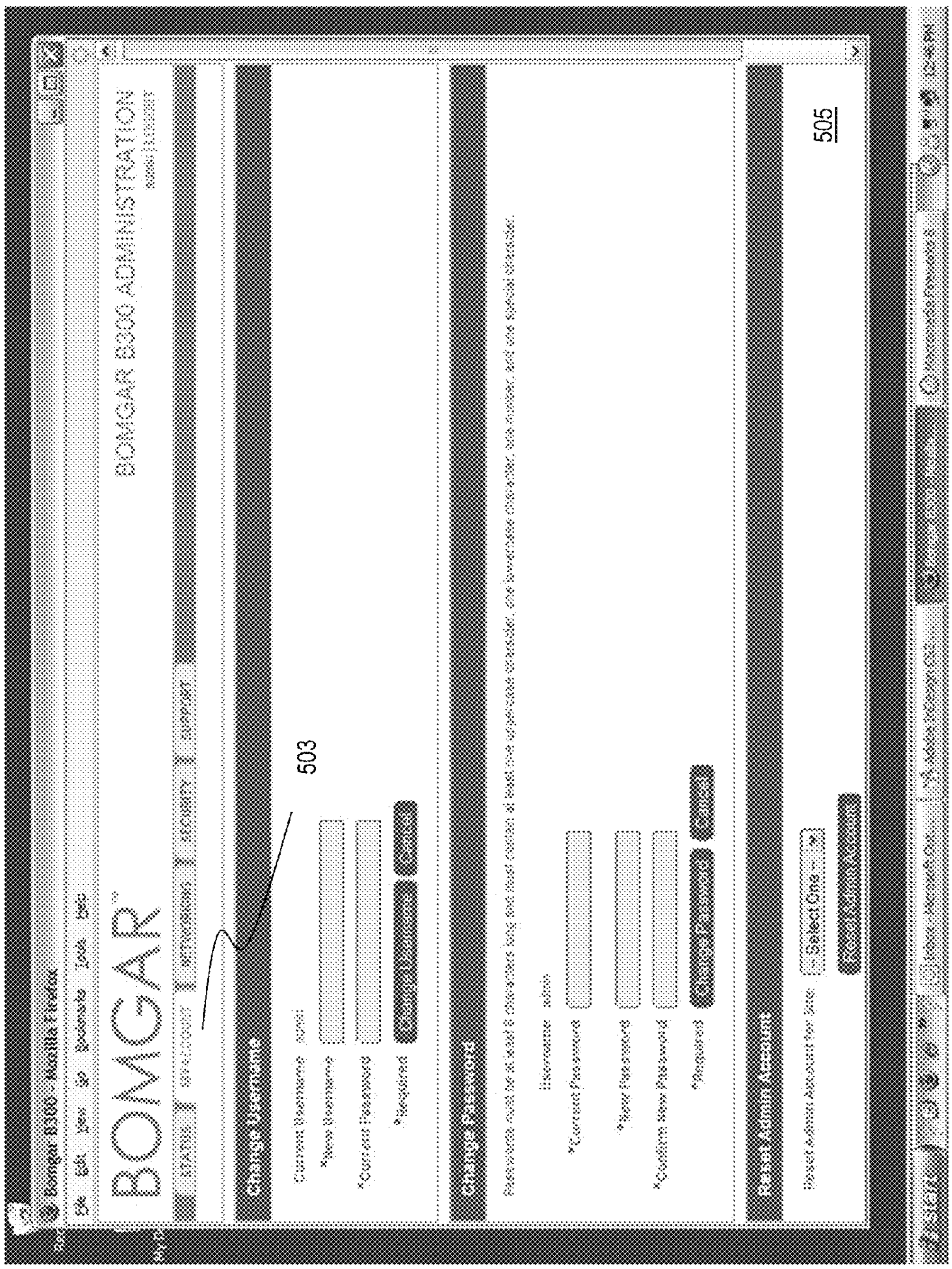

The administrator can also change the username and password as illustrated in FIG. 5C through the "Admin My Account" tab 503. In an exemplary embodiment, resetting the admin account for a site changes the username and password for that site back to the default.

Figure 5D:
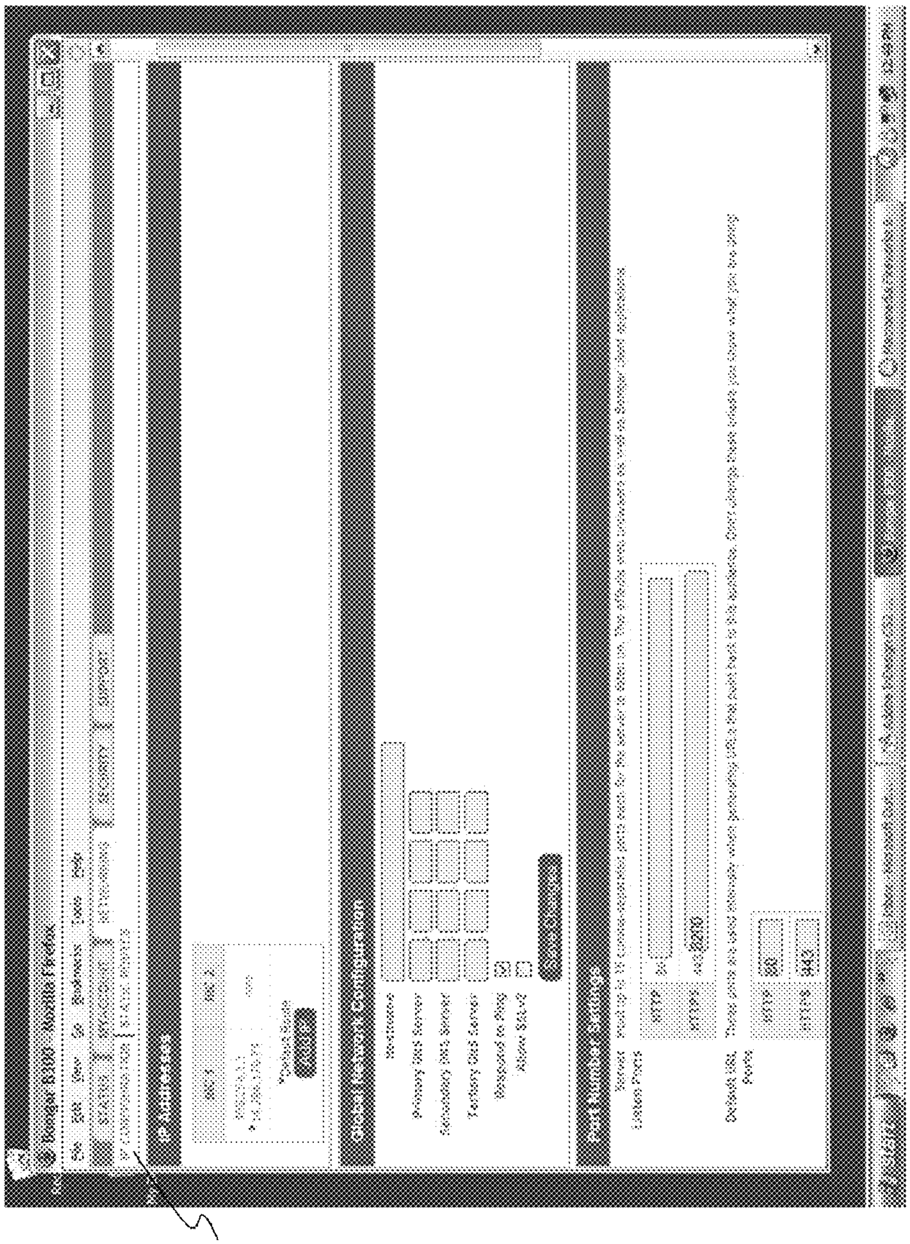
Figure 5E:
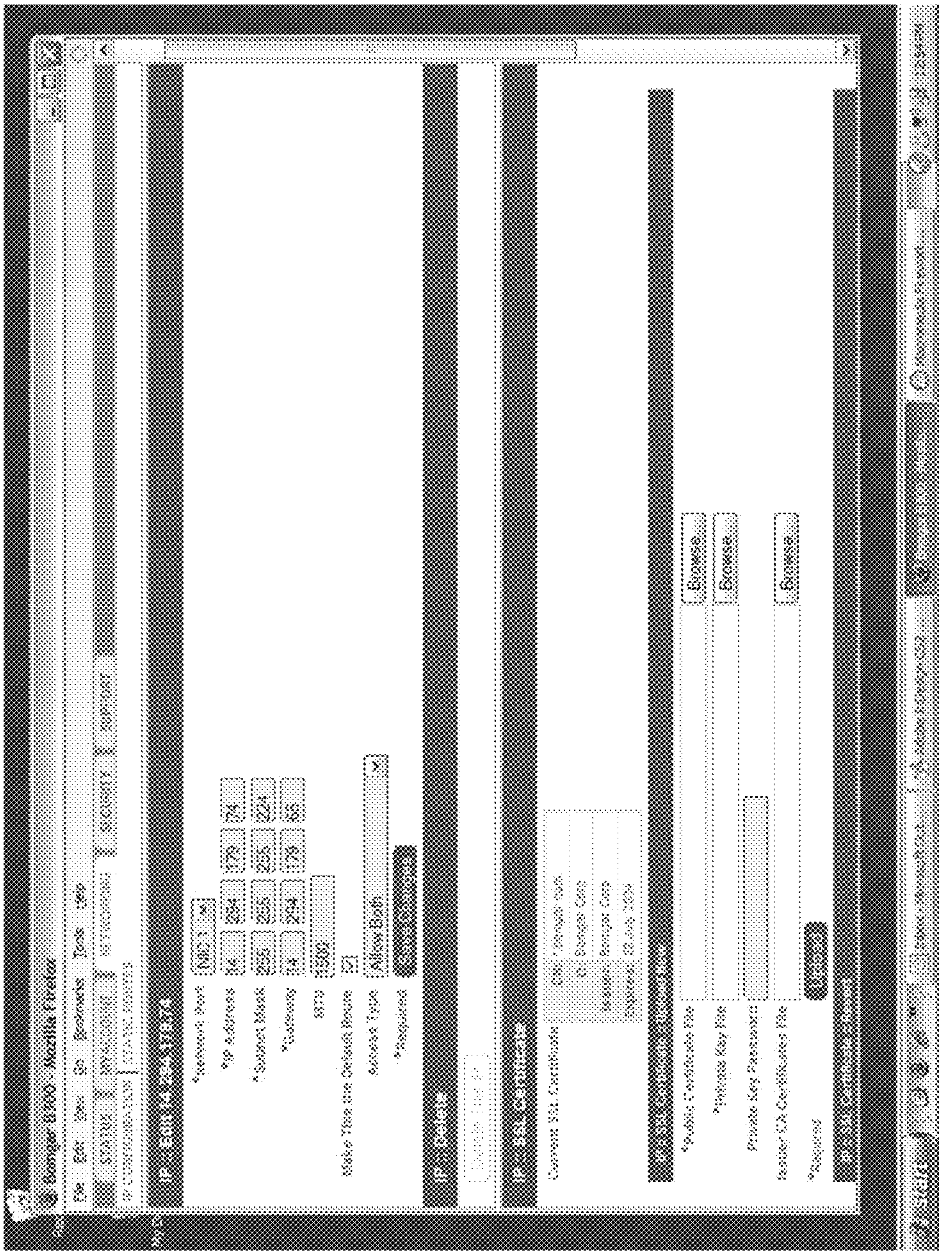

As demonstrated in FIGS. 5D and 5E, the administrator can configure multiple IP addresses for the network appliance 101 and can add a separate SSL certificate to each address from the "IP Configuration" tab 504. From this tab, the administrator can also configure further network settings including the hostname, SSL version, and port numbers. The static IP for configuration is the address to which the network appliance 101 responds and the subnet mask and default gateway enable the network appliance 101 to communicate with other devices. The administrator is advised to allow the appliance 101 to respond to "pings" if the administrator wishes to test whether the host is functioning. Although the appliance 101 always defaults to SSL version 3, the administrator can allow representatives to access the administrative interface from older browsers which may support only SSLv2.

Figure 5F:
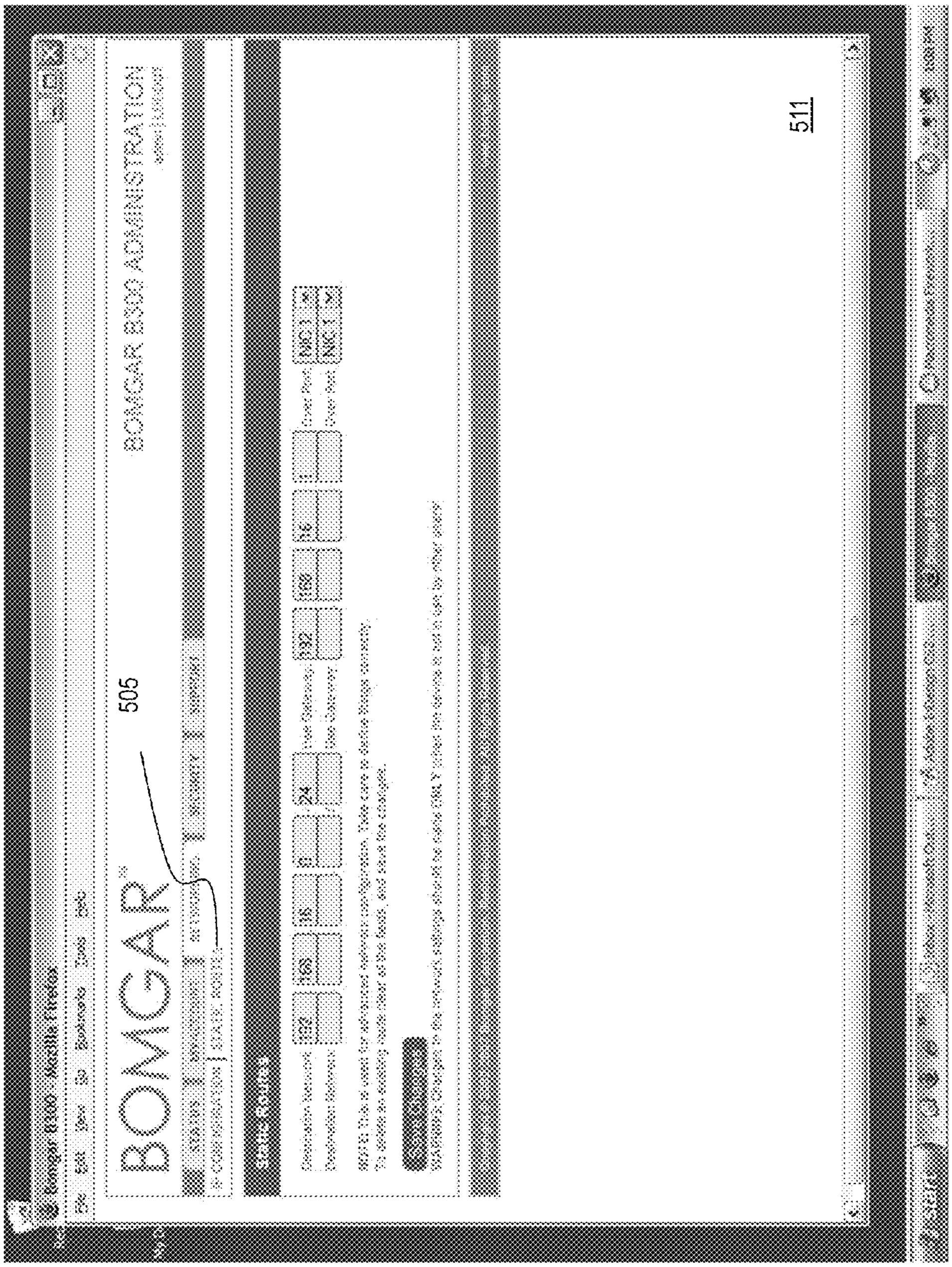

The "Static Routes" tab 505 of FIG. 5F allows an advanced administrator to establish a static route to enable two networks that are normally unable to communicate to each connect to the appliance 101 in order for a representative on one network to support a user (e.g., customer) on the other network.

Figure 5G:
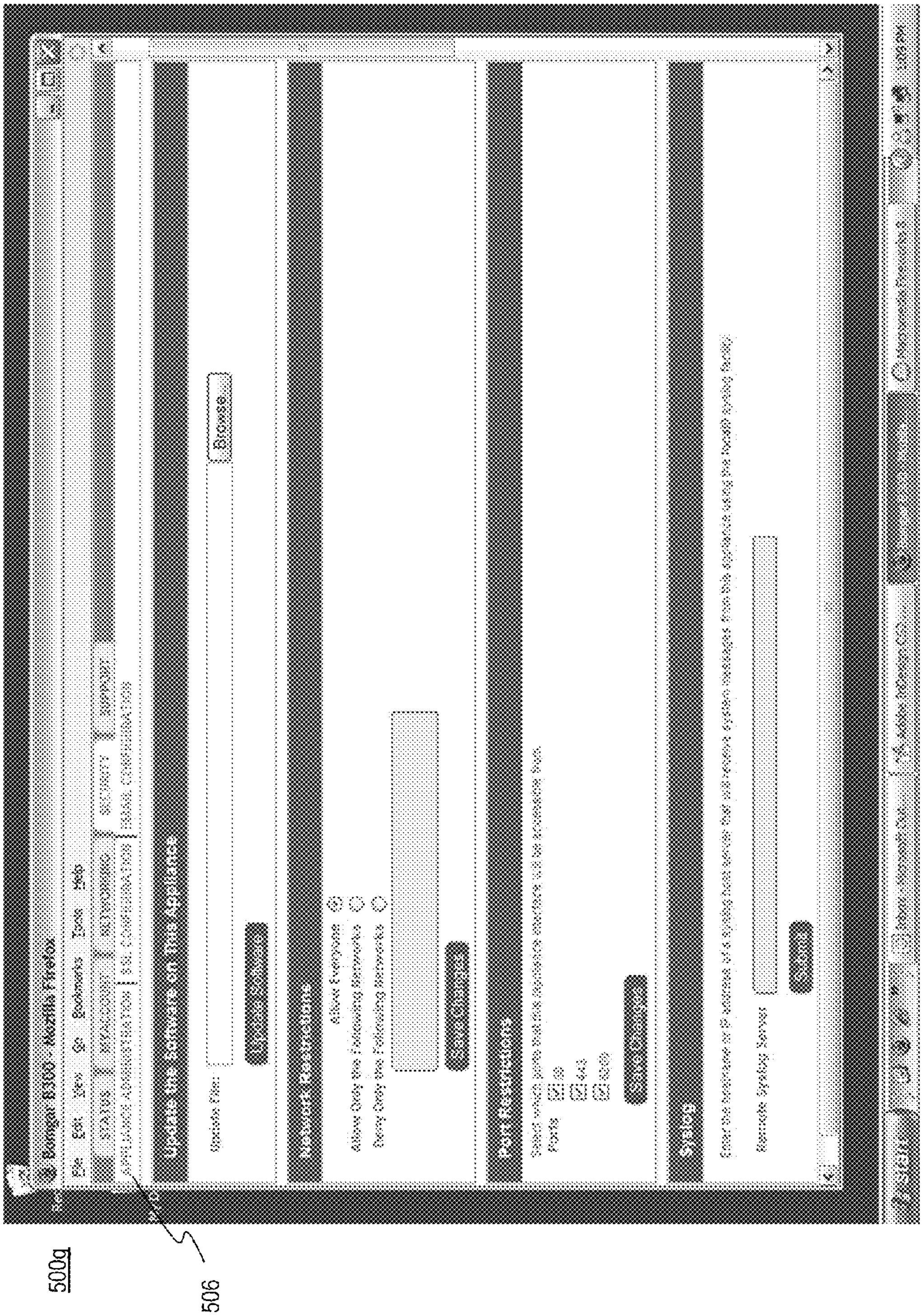

The "Appliance Administration" tab 506 of FIG. 5G provides an "Update Software" function for an administrator to upload new software packages to the appliance 101. In one embodiment, this function provides for automatically upgrading all software licenses on the appliance 101. The administrator can restrict access to the appliance administrative interface by setting network addresses that are or are not allowed and by selecting the ports through which the interface will be available. The administrator can also configure the appliance 101 to send log messages to an existing syslog (i.e., "system log") server using the local facility.

Figure 5H:
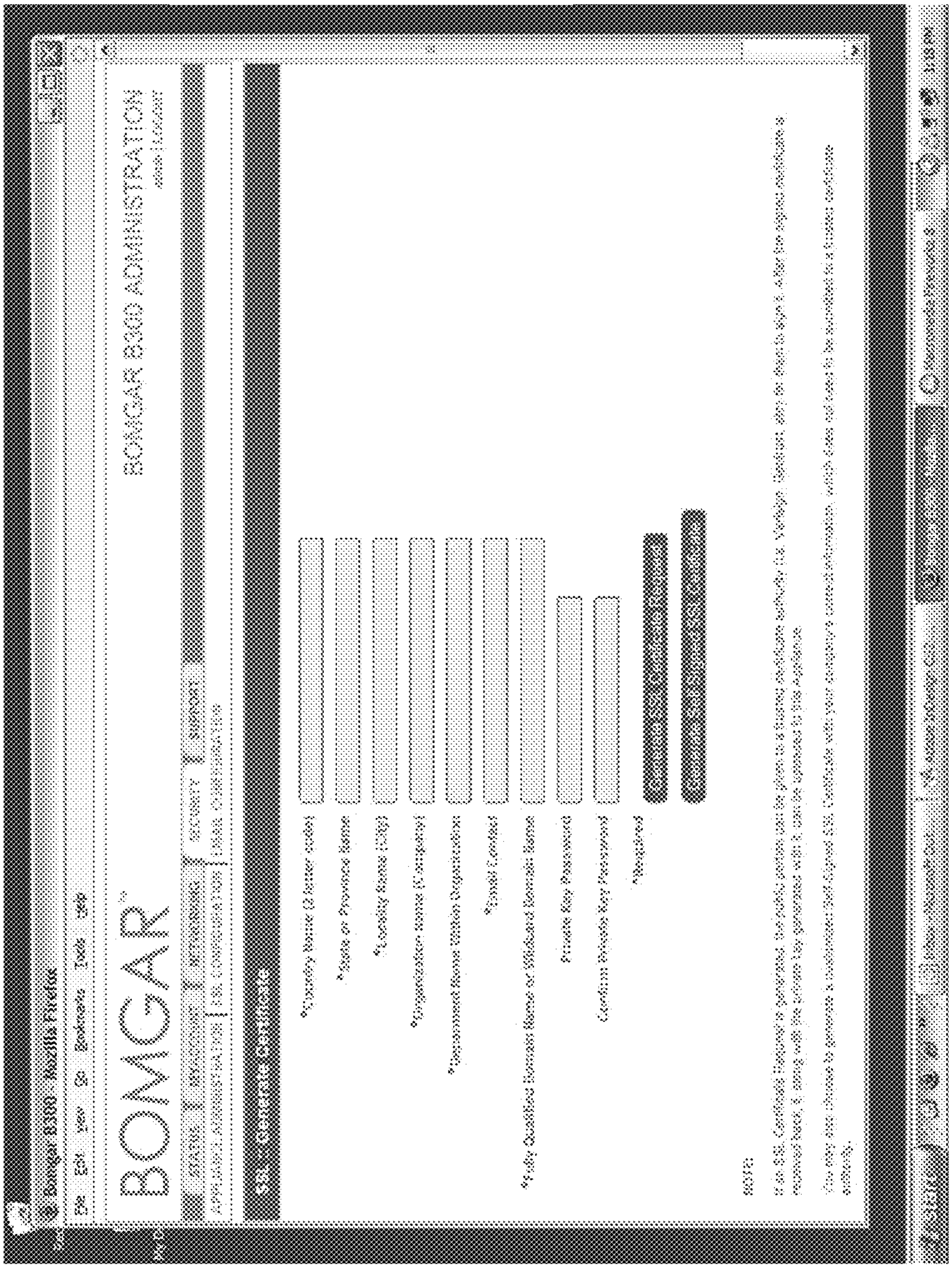
Figure 5I:
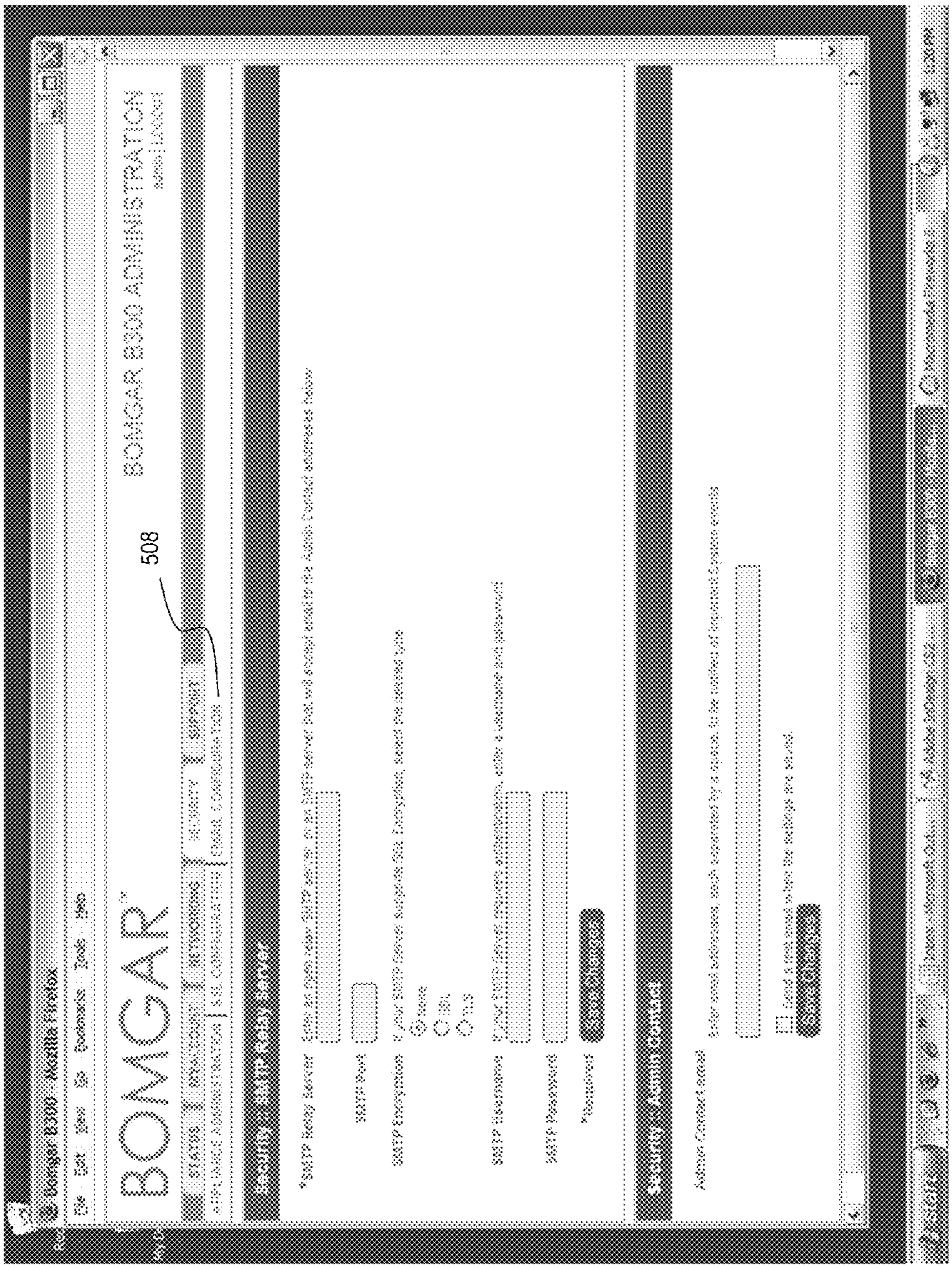

The "SSL Configuration" tab of FIG. 5H allows the appliance administrator to request a certificate authority for an SSL certificate for the network appliance 101. After an SSL Certificate Request is generated, the public portion can be given to a trusted certificate authority (i.e., Verisign, Geotrust, etc.) for them to sign it. After the signed certificate is received back, the certificate, along with the private key generated with it, can be uploaded to the appliance 101 using the "Upload New SSL Certificate" form on the "IP Configuration" page (FIG. 5E). A self-signed SSL certificate indicates to the users (e.g., customers) that the company guarantees the security of the appliance connection. This self-signed certificate contains the company's correct information and will take the place of any previously existing certificate. At any time, the original SSL certificate that comes with the appliance 101 can be restored.

From the "Email Configuration" tab 508 of screen 500*i* (FIG. 5I), the administrator can configure the SMTP relay server and designate one or more administrative contacts so that the appliance 101 is able to send automatic email notifications.

Figure 5J:
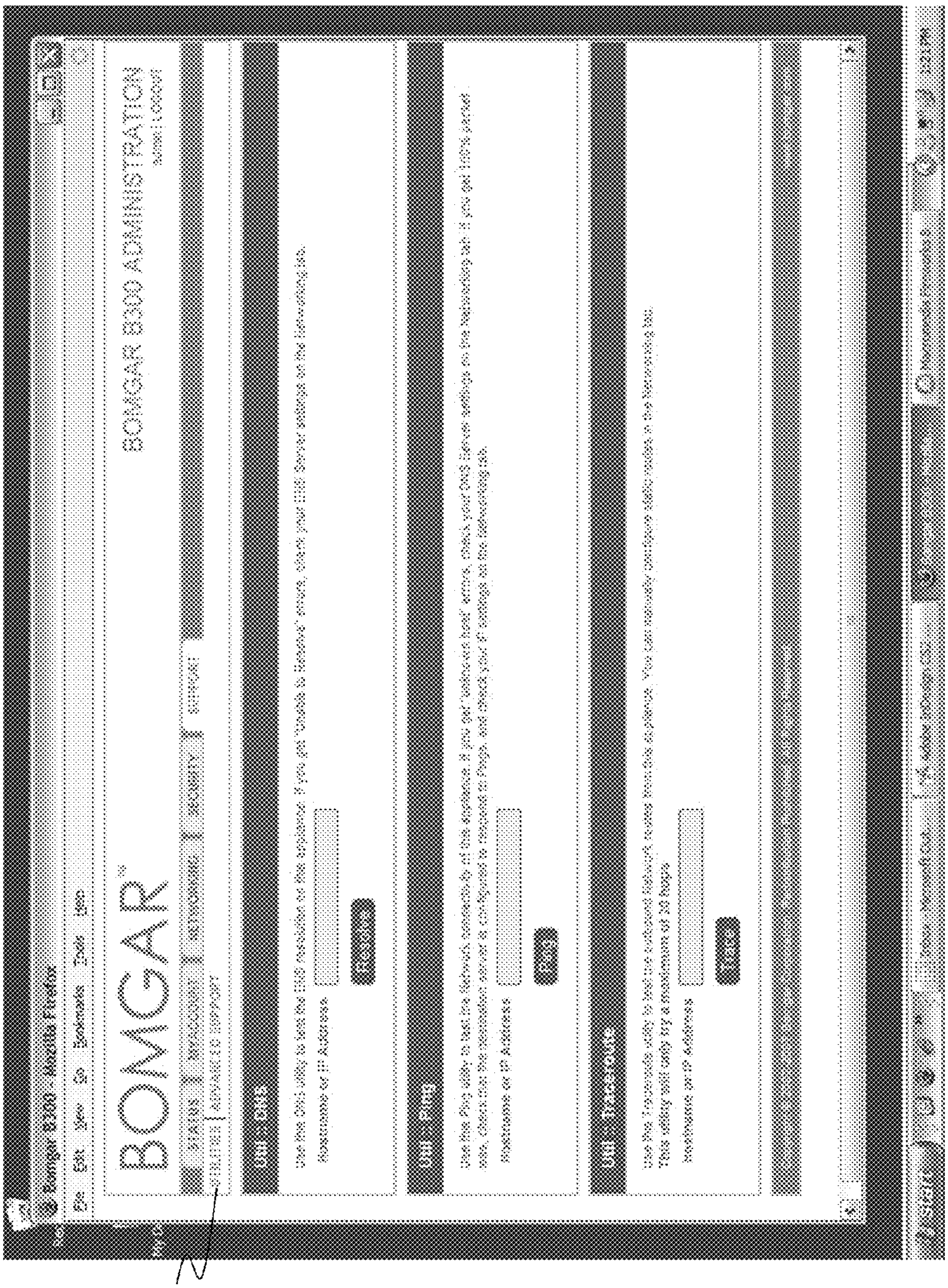

FIG. 5J demonstrates the "Utilities" tab 509, which provides several means of debugging network problems. The administrator can test the DNS server to check if the hostname or IP address is resolving correctly, send pings from the appliance 101 to test its network connectivity, and use the traceroute to view the path that packets take on their journey from the network appliance 101 to any external system.

Figure 5K:
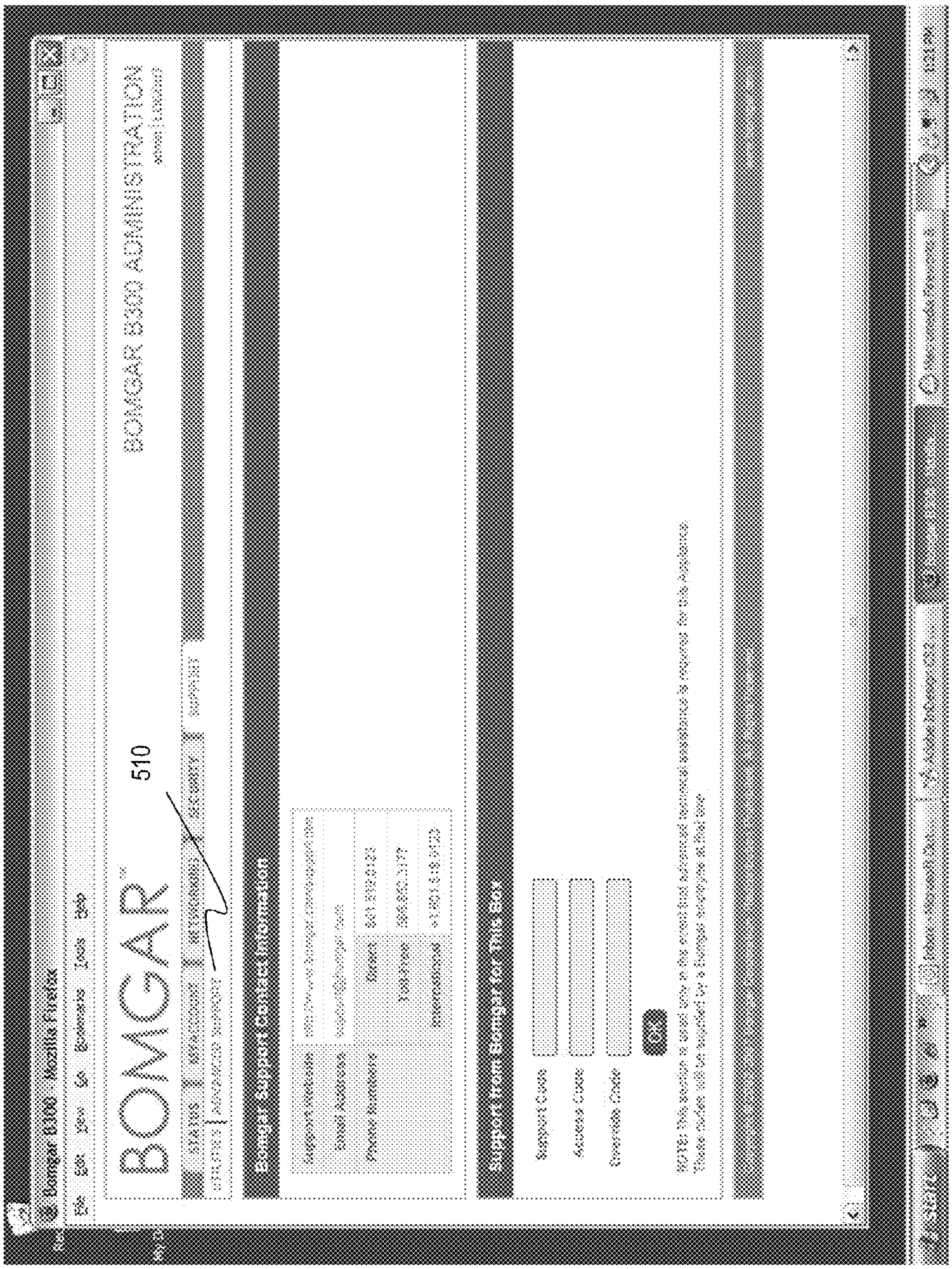

The "Advanced Support" tab 510 shown in screen 500*k* of FIG. 5K provides support contact information and also allows an appliance-initiated support tunnel for quick resolution of complex issues.

FIGS. 6A-6LL are diagrams of a GUI for providing remote access and control functions within the network appliance 101 of FIG. 1, according to an exemplary embodiment. The GUI comprises screens 600*a*-600*ll*, which provide the user with a multitude of functions. In addition to configuring the network appliance 101, the administrator also has the capability to manage representatives, generate activity reports, view or download customer exit surveys, add/remove users, etc.

Figure 6A:
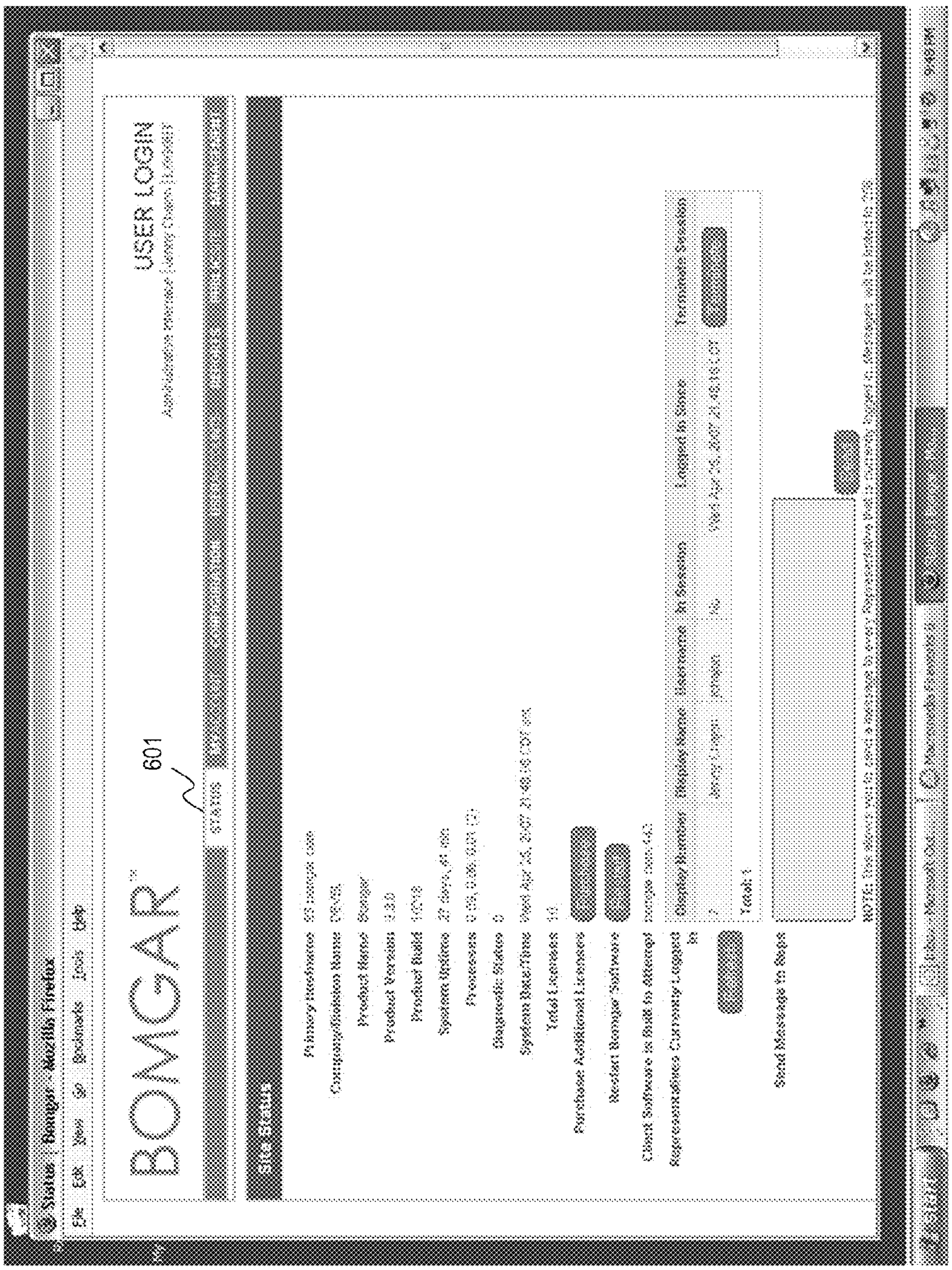
FIGS. 6A-6LL are diagrams of a GUI for providing remote access and control functions within the network appliance of FIG. 1, according to an exemplary embodiment.

FIG. 6A illustrates the interface through which the administrator can realize these functions. The administrator can also change username and password through the "account settings" tab 601. A "Status" tab 6013 of FIG. 6BA provides an overview of the representative account. Ann administrator can view a list of representatives who are logged in. The administrator also has the ability to terminate representative sessions or even end the current session and can also send a pop-up message to all logged-in representatives.

Figure 6B:
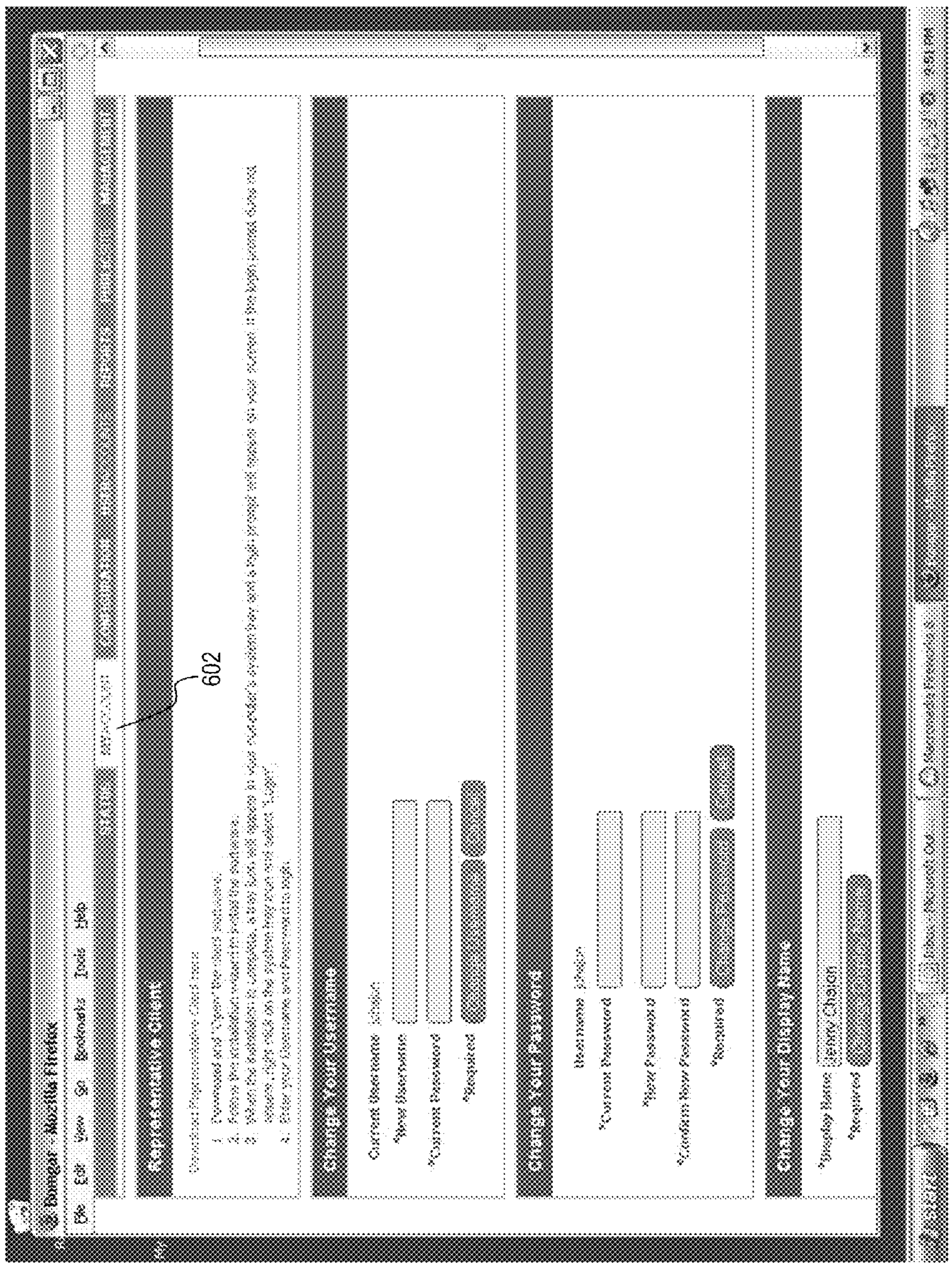

The representative can download the representative client software 121 onto the representative system 103 through the "My Account" tab 602 as seen in FIG. 6B. The representative can also change his or her username, password and display name.

Figure 6C:
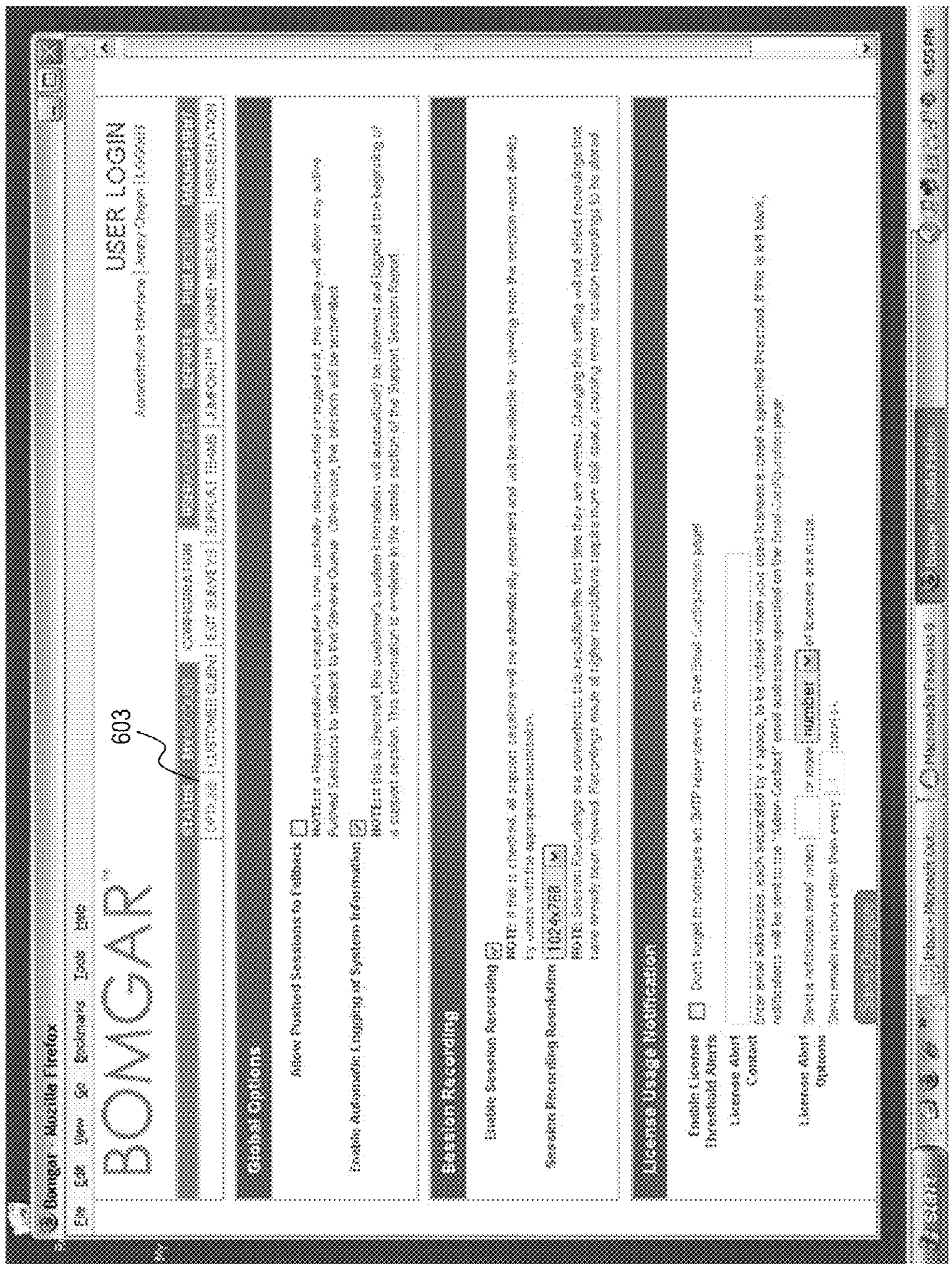

From the "Options" tab 603 of FIG. 6C, the administrator can configure settings across all representative accounts. If a representative pushes a session to a remote computer and then loses the connection, that session can either be terminated or put into the general queue for another representative to resume. At the beginning of the session, a report of the remote computer's system information can be logged for later view in the session report. Sessions can be recorded in, for example, Flash video format at several different screen sizes. The administrator can also select to be automatically alerted if license usage should exceed a certain number or percent of representatives logged in at the same time.

Figure 6D:
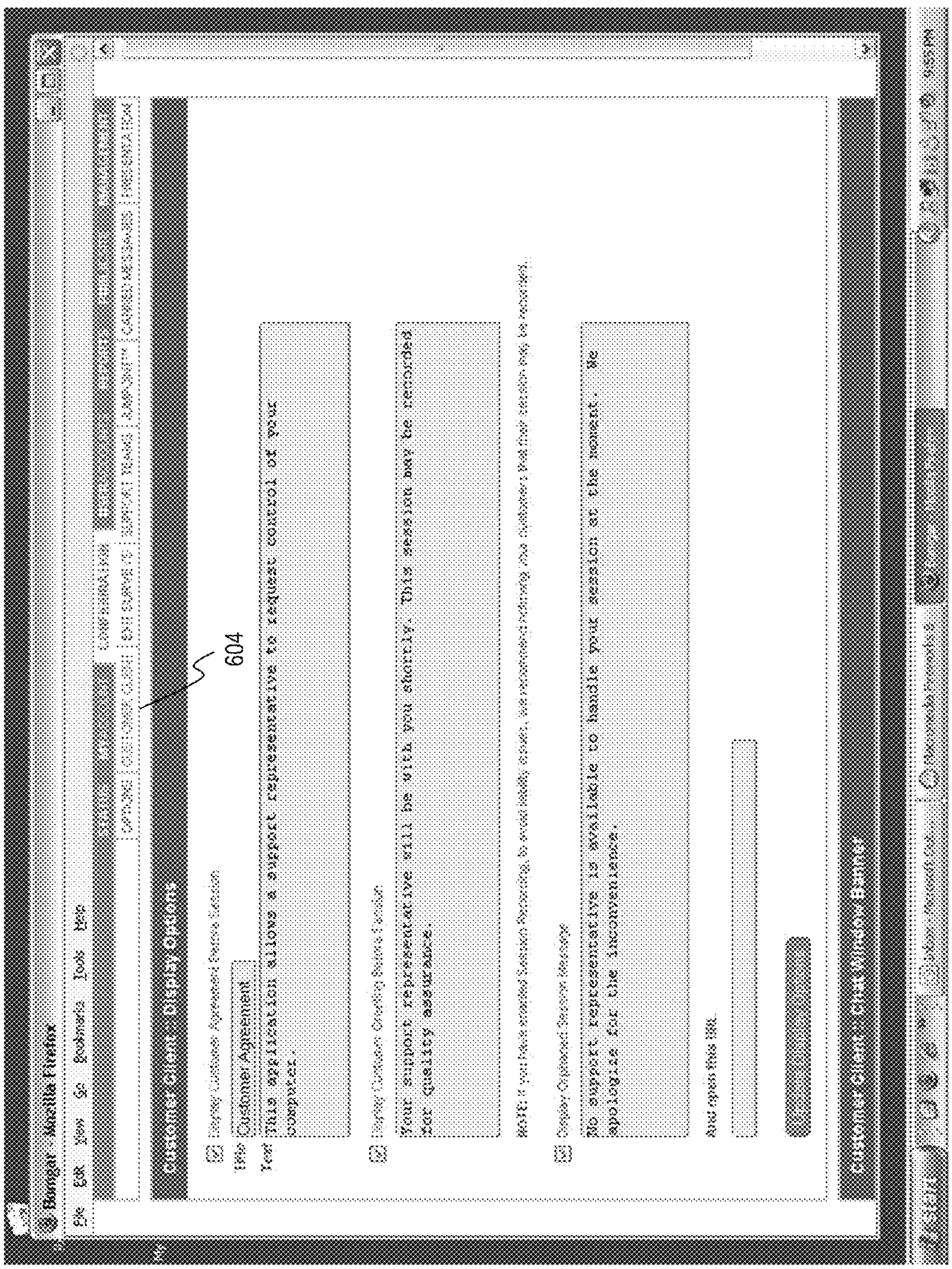
Figure 6E:
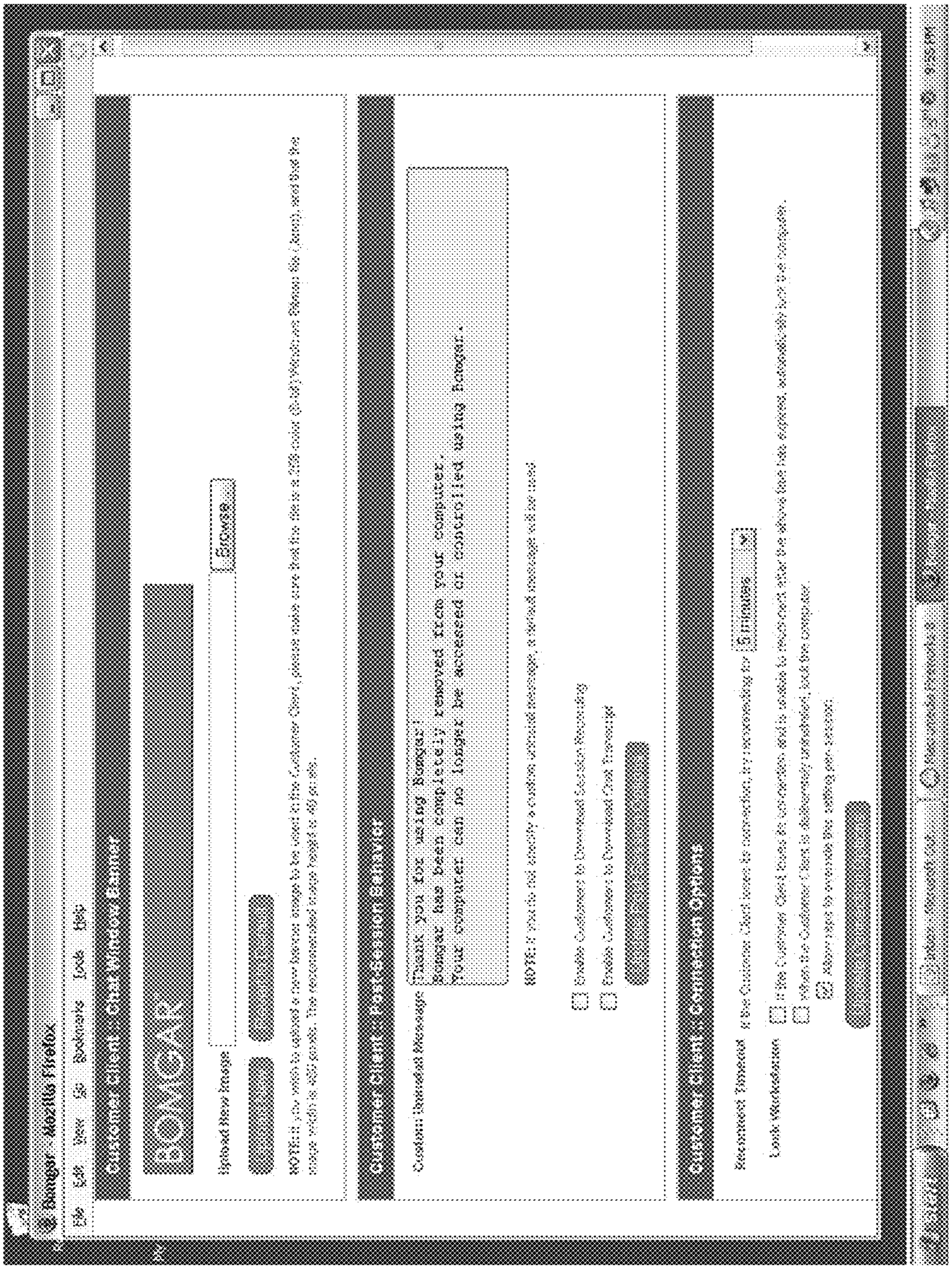

FIGS. 6D-6E demonstrate the functions associated with the "Customer Client" tab 604. The administrator can introduce support sessions by displaying a customer agreement or a customer greeting. Should a customer request support when no representative is logged into the appliance 101, an orphaned session message can alert the customer to retry at a different time, and if defined, the URL option can then direct the user to the designated site. The administrator can also upload a banner to be displayed at the top of the user's chat window. At the end of the session, the remote client automatically uninstalls from the user's computer. The administrator can create a custom message or use the default uninstall message. Once the session is complete, the administrator can give the user the option of downloading the session recording or the chat transcript. The administrator can also configure security settings should the remote client loses its connection.

Figure 6F:
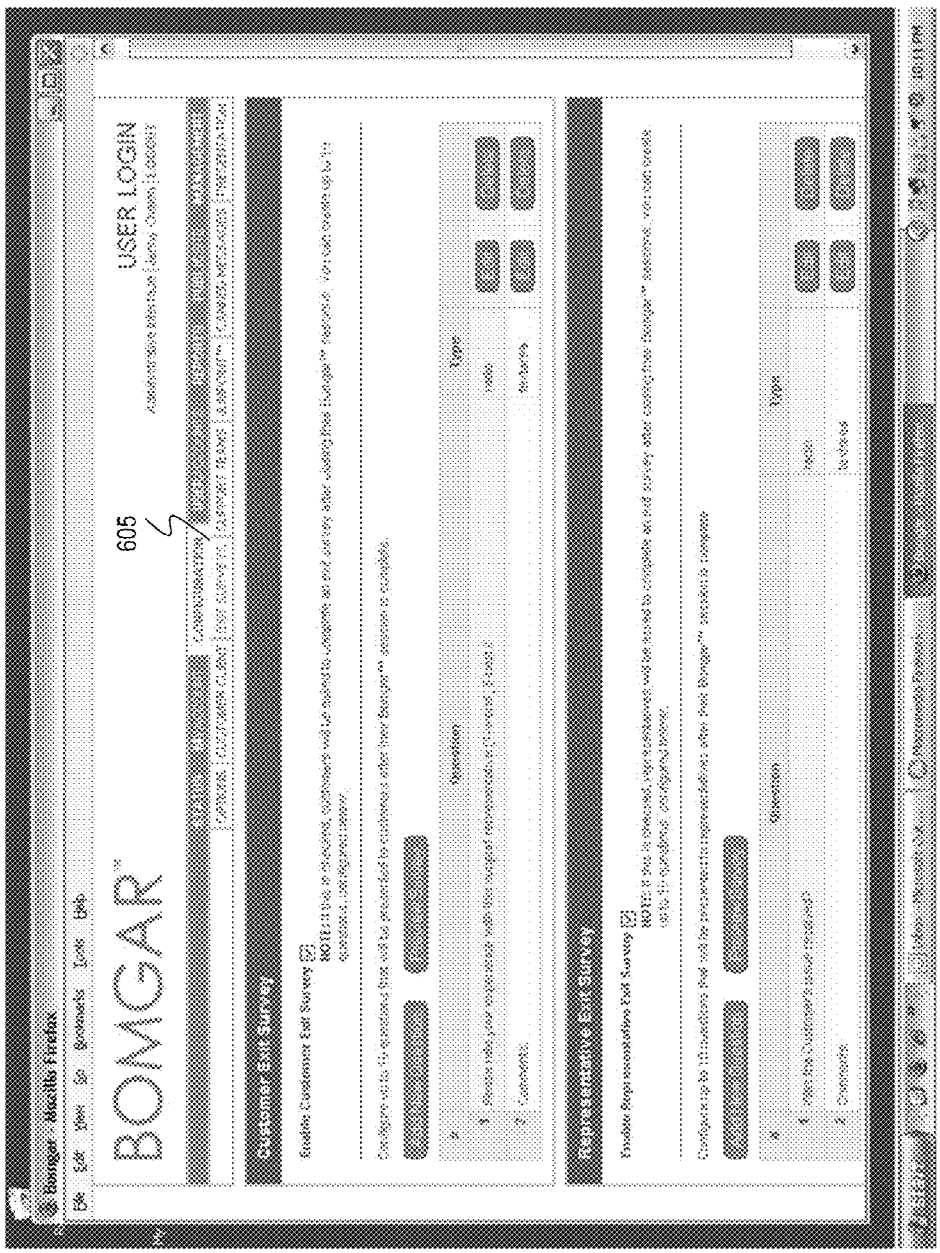
Figure 6G:
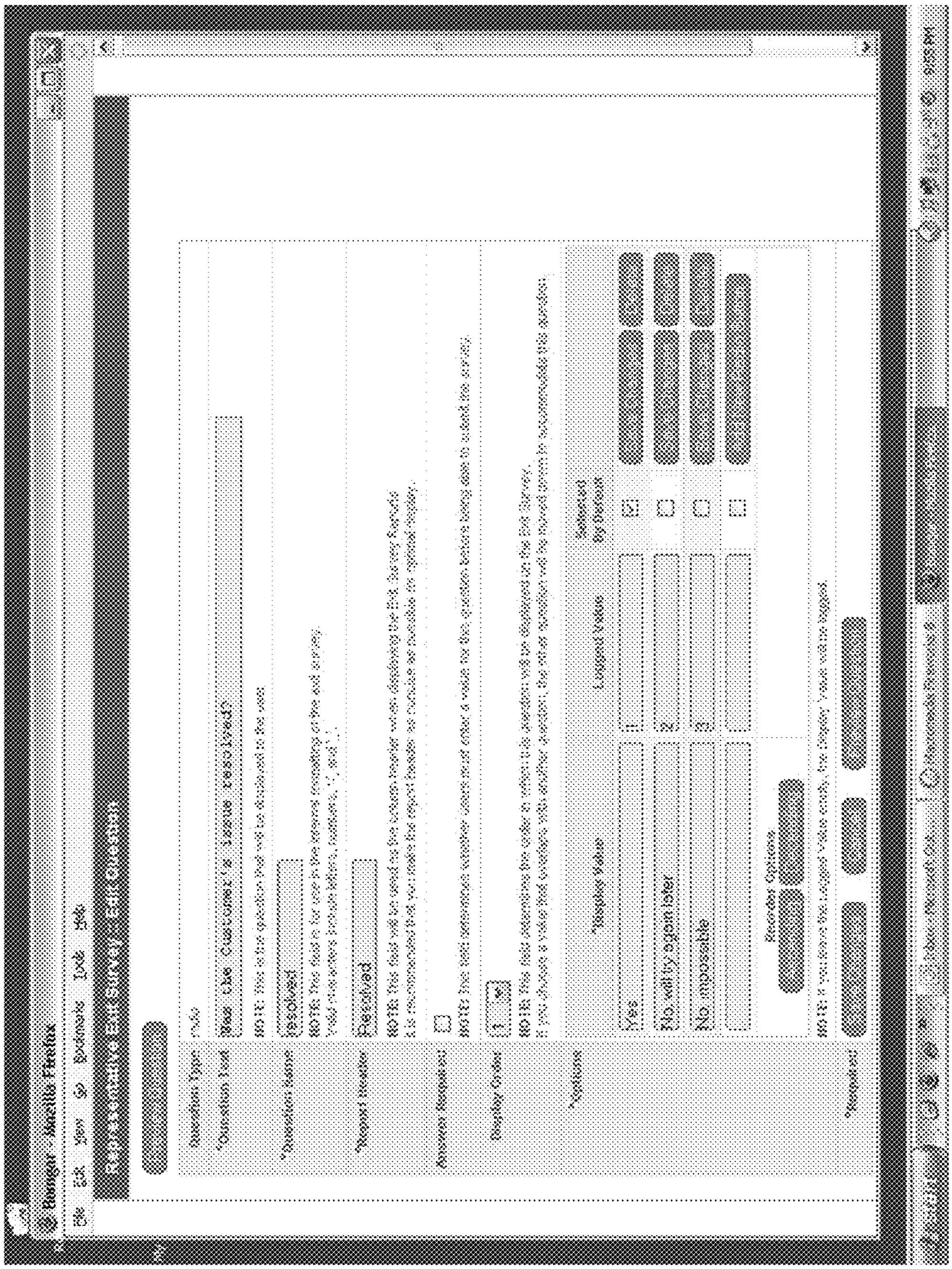

The administrator can choose to implement an exit survey to monitor customer satisfaction through the "Exit Surveys" tab 605 of screen 600*f* (FIG. 6F). According to one embodiment, surveys can be given to both customers and representatives. The administrator can completely configure the survey questions, as shown in FIG. 6G. The administrator can also require representatives to answer certain questions before closing the support session.

In one embodiment, support representatives can be categorized into teams, which aids in assigning the most appropriate representative (e.g., most knowledgeable representative for the particular customer's issue) to a customer. This may be implemented by the administrator through the "Support Teams" tab 606 of FIGS. 6H-6J. Clicking on the "Add New team" button pulls representatives into a specific team, as shown in FIG. 6I. The "Manage Support Areas" button, seen in FIG. 6J, adds keywords that will queue customers in that specific team queue. For example, keywords can include "spell-check," "font," "language settings," "margins," etc. In this manner, whenever a customer requests support for changing his or her language settings, the customer can automatically be placed in the "Word" team. The administrator can later add or remove individual members from a team with "Edit Team" or remove the team entirely by clicking on "Delete Team". Removing a member or an entire team will not delete those representative accounts, only the team with which they are associated.

Figure 6H:
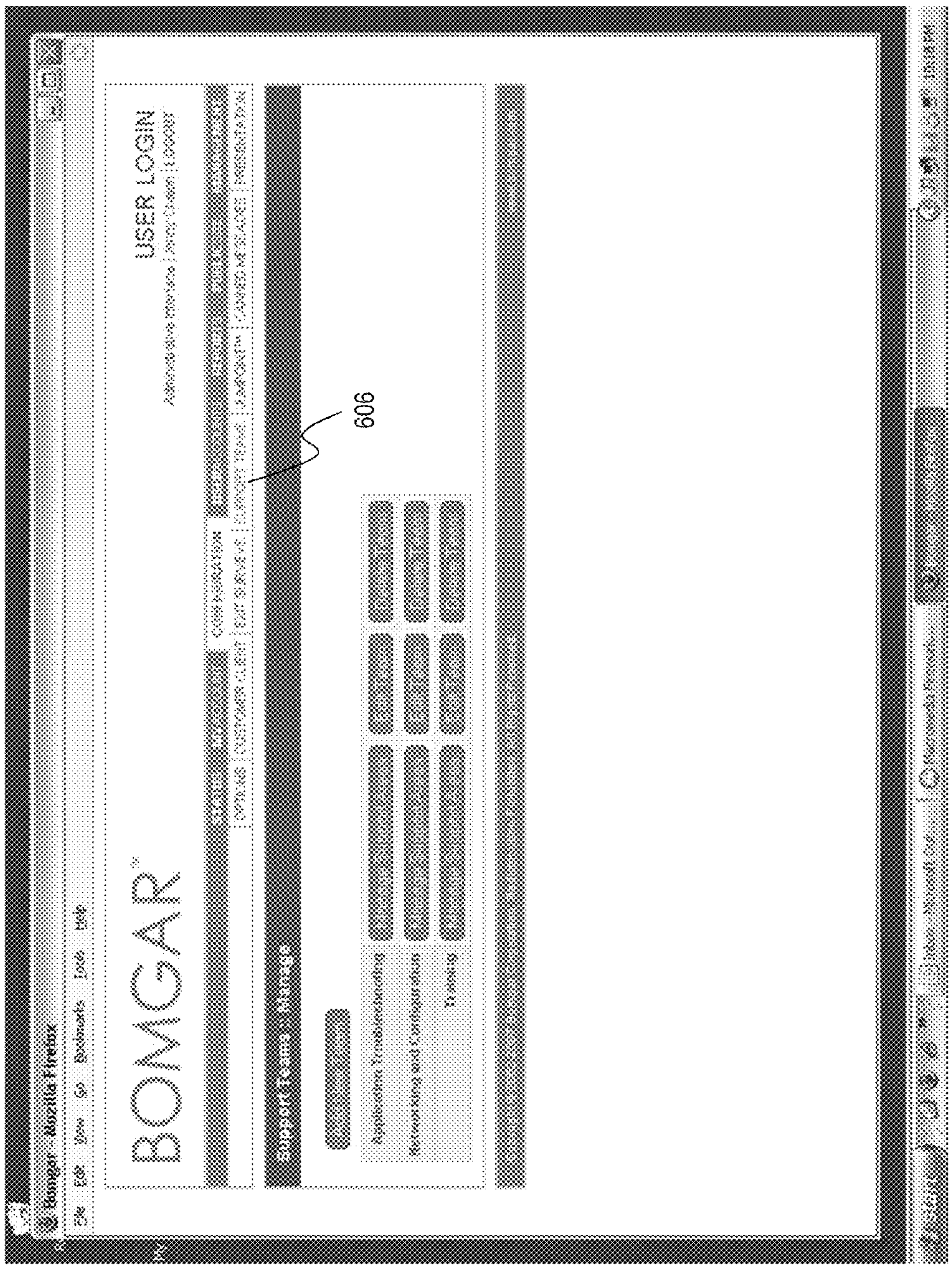
Figure 6I:
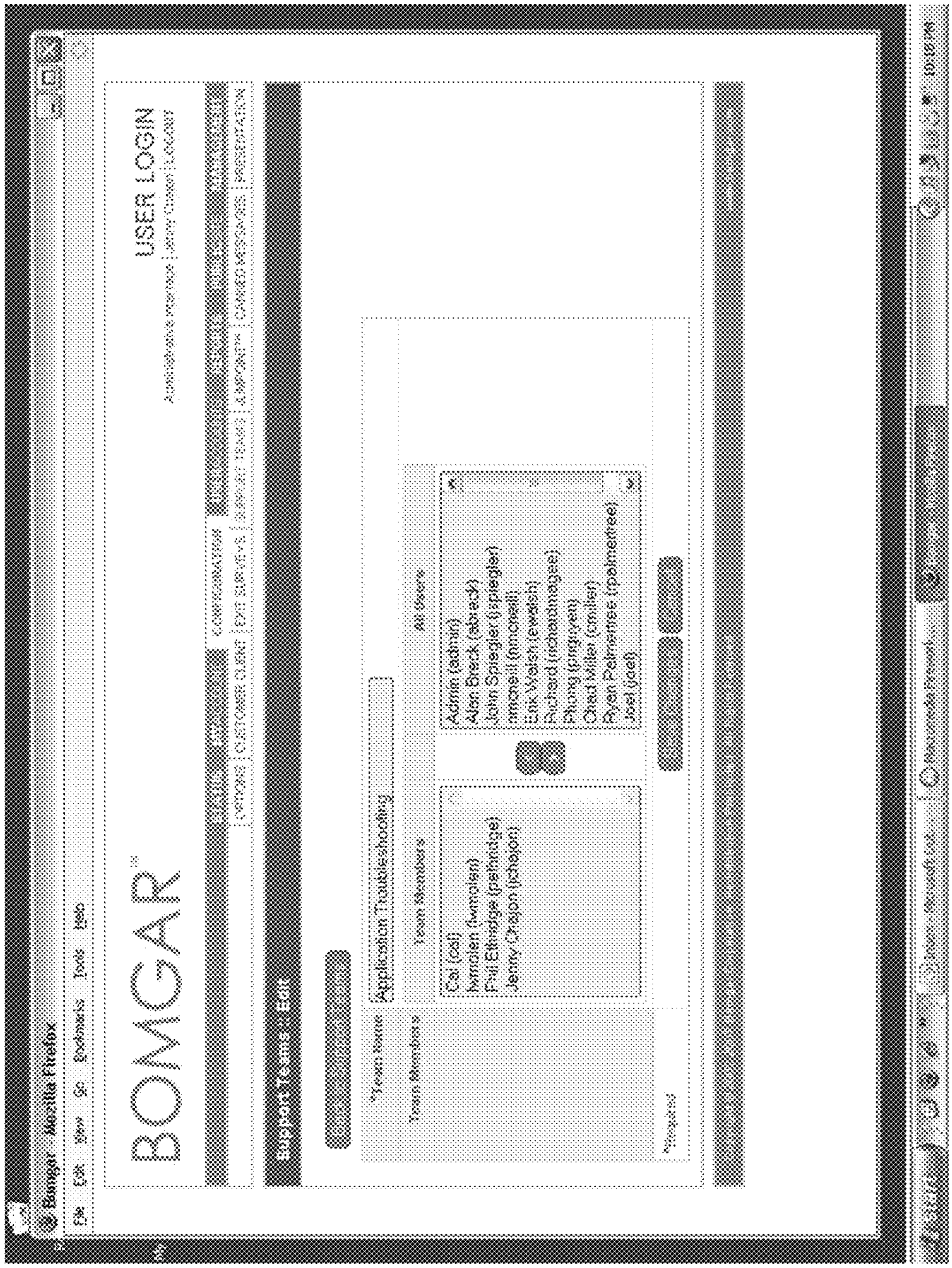
Figure 6J:
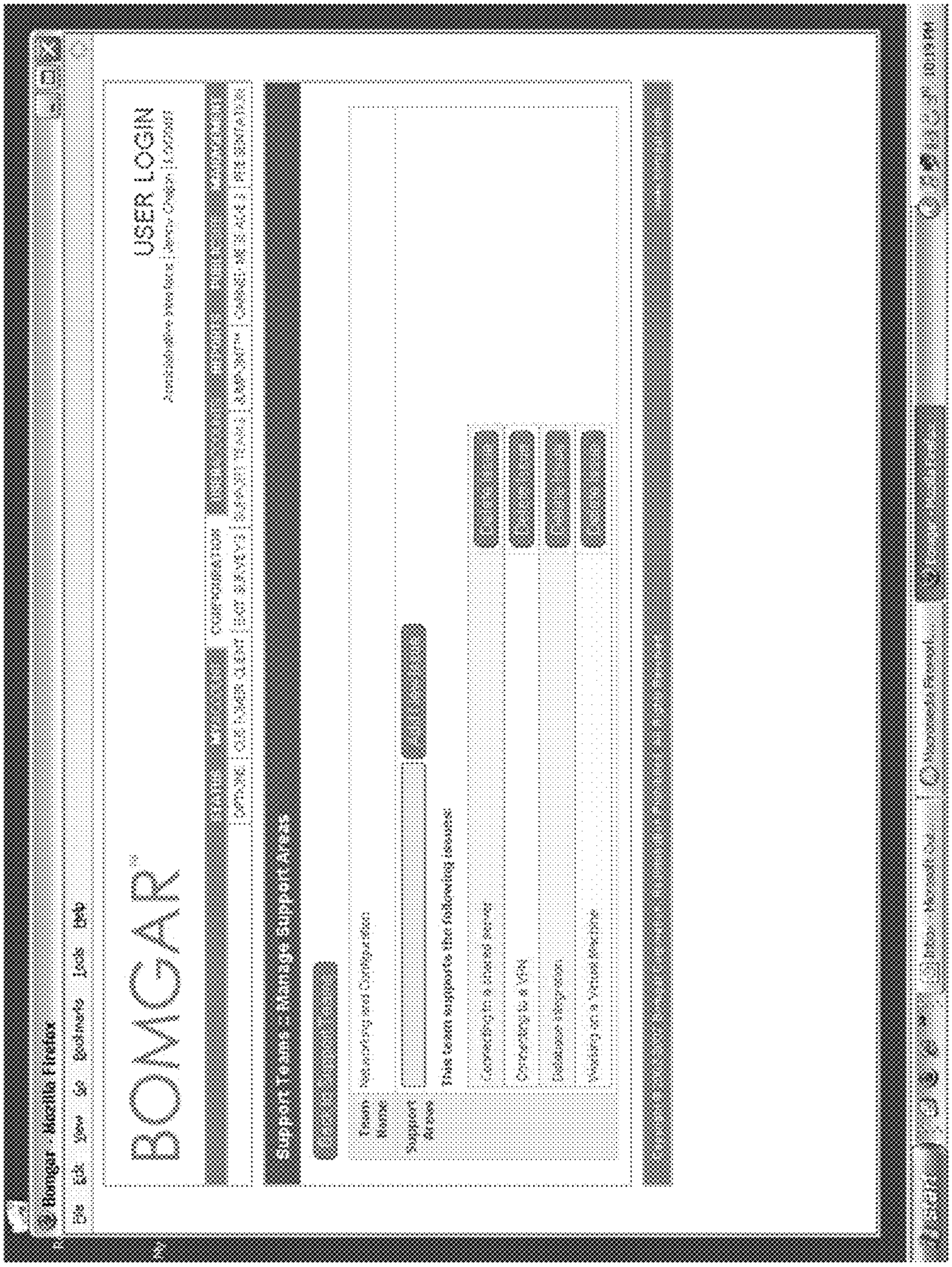
Figure 6K:
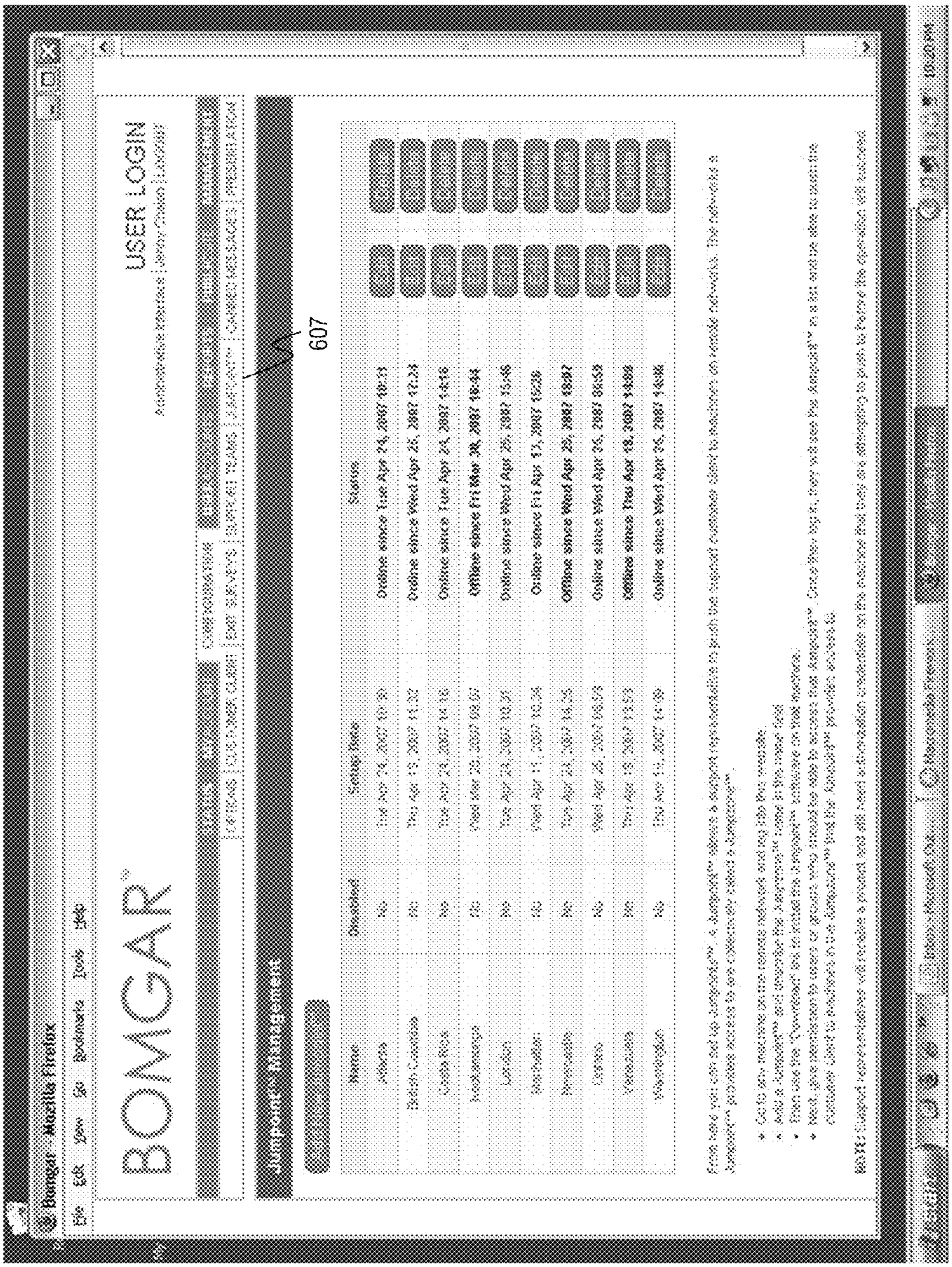
Figure 6L:
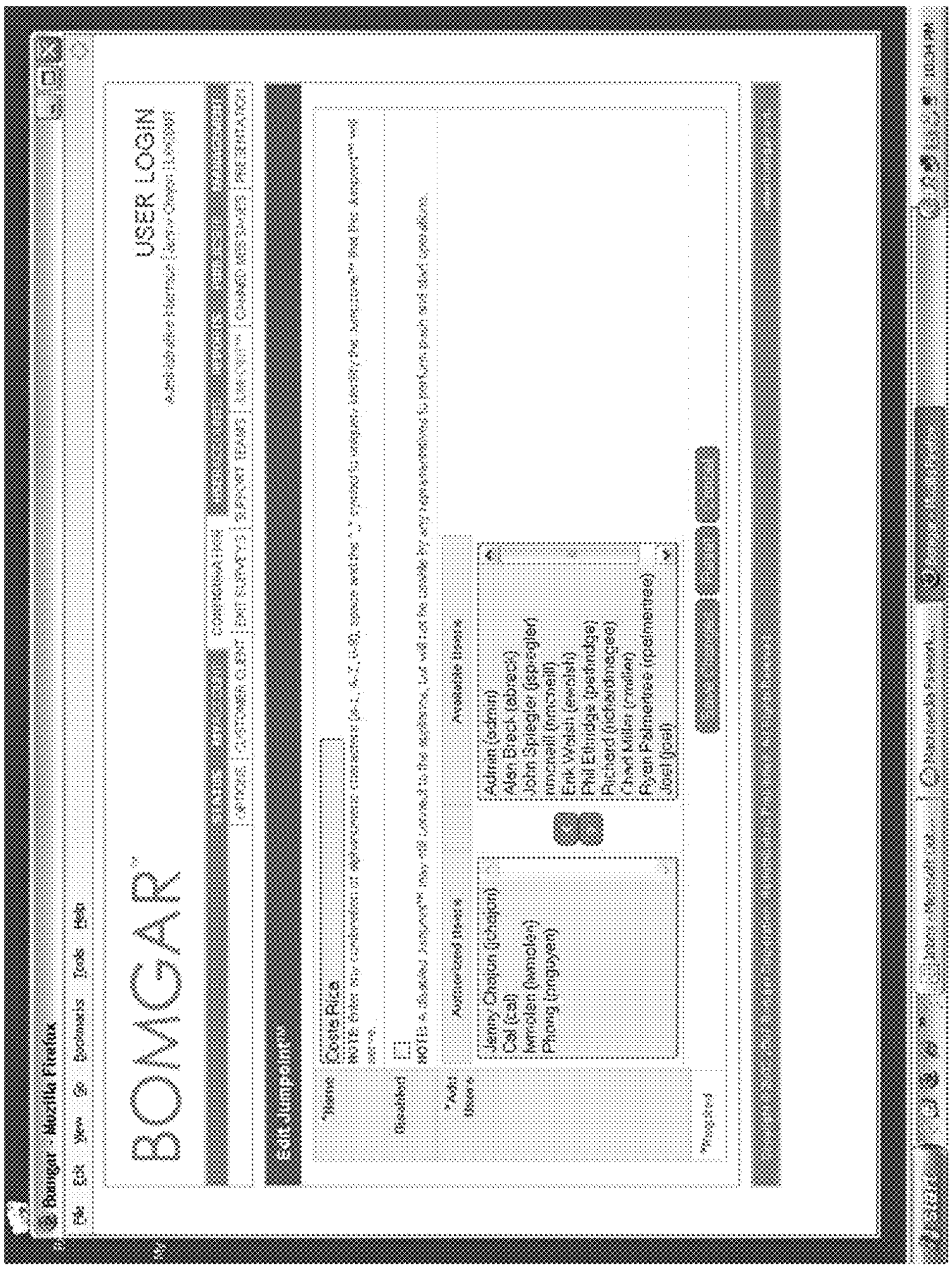

The Jumpoint™ technology, configured from the "Jumpoint™" tab 607 of FIGS. 6K-6L, enables a representative to support both attended and unattended computers on a remote network with no pre-installed software client. The administrator should download a Jumpoint™ agent onto any single machine on the remote network to which access is required. Alternatively, Jumpoint™ can be a hardware or virtual appliance product which then require a hardware .virtual appliance deployed instead of a software install. This computer or appliance will serve as the gateway for Jumpoint™ sessions with other computers on the remote network (also known as Jumpzone™). The administrator can then give permission to users or groups who should be able to access that Jumpzone™, allowing an enabled representative to start a support session with any computer on that network, provided that the representative has authorization credentials on the machine he or she is attempting to access.

Figure 6M:
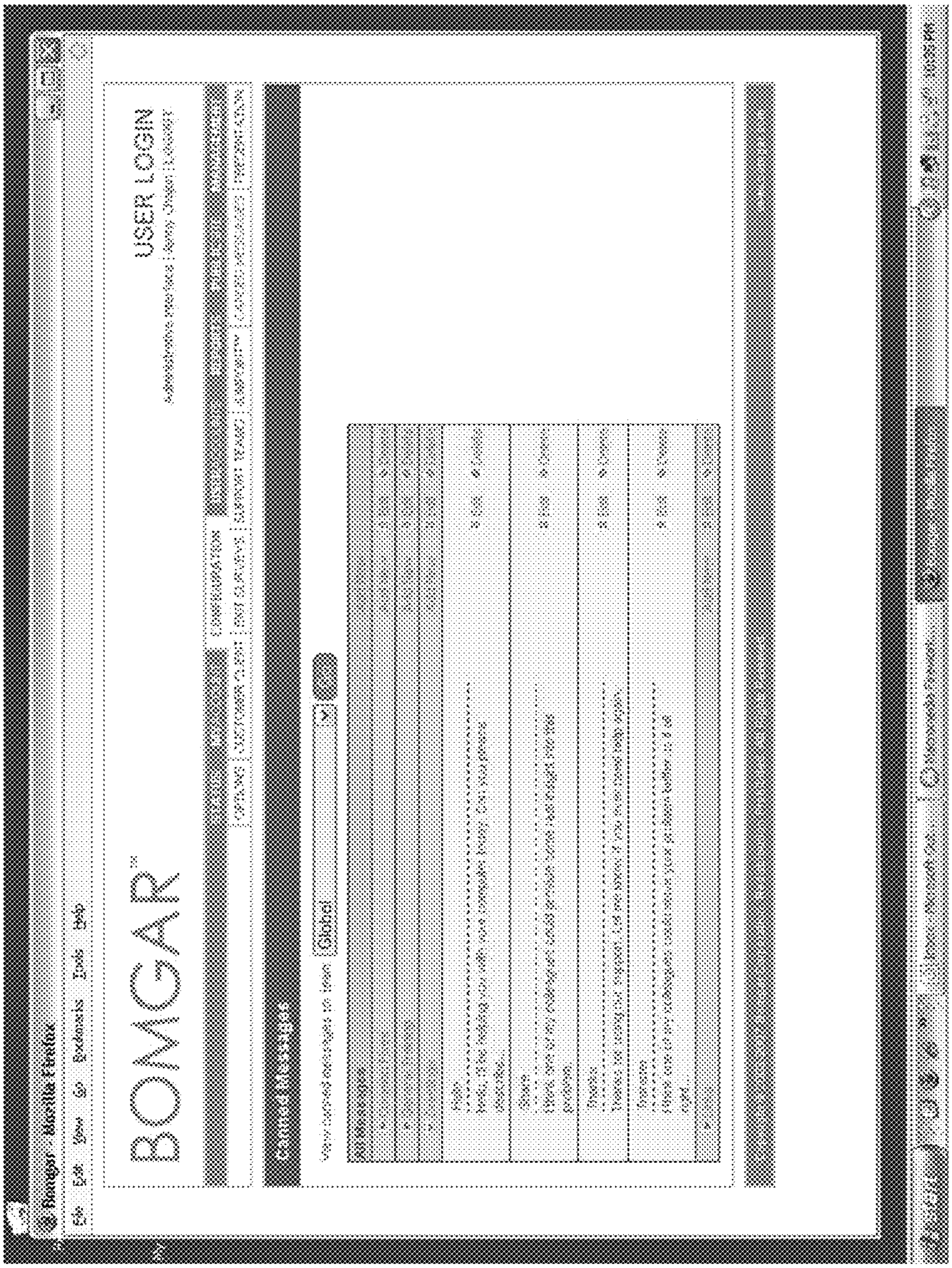
Figure 6N:
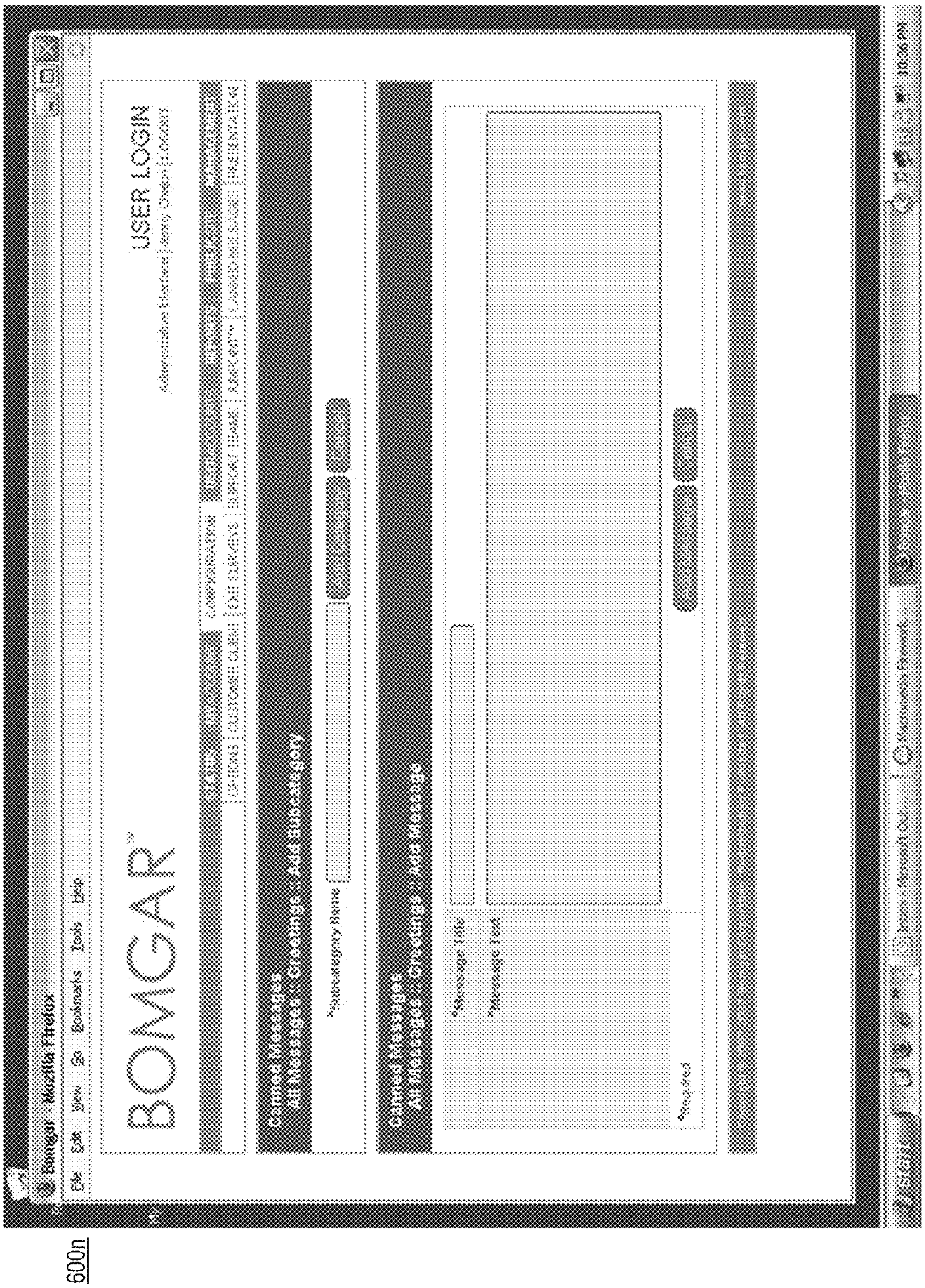

By entering the "Canned Messages" tab 608 of FIGS. 6M-6N, administrators can create predetermined messages to be used in chat sessions during support. From the dropdown menu, the "Global" entry can be selected to view messages that are available for all representatives, or a team name can be selected to view messages that are available only for members of that team. Selecting the "Add New" button adds a subcategory or a new message. "Delete" removes either the message or the entire category. By selecting the subcategory field, the administrator can view the messages therein.

Figure 6O:
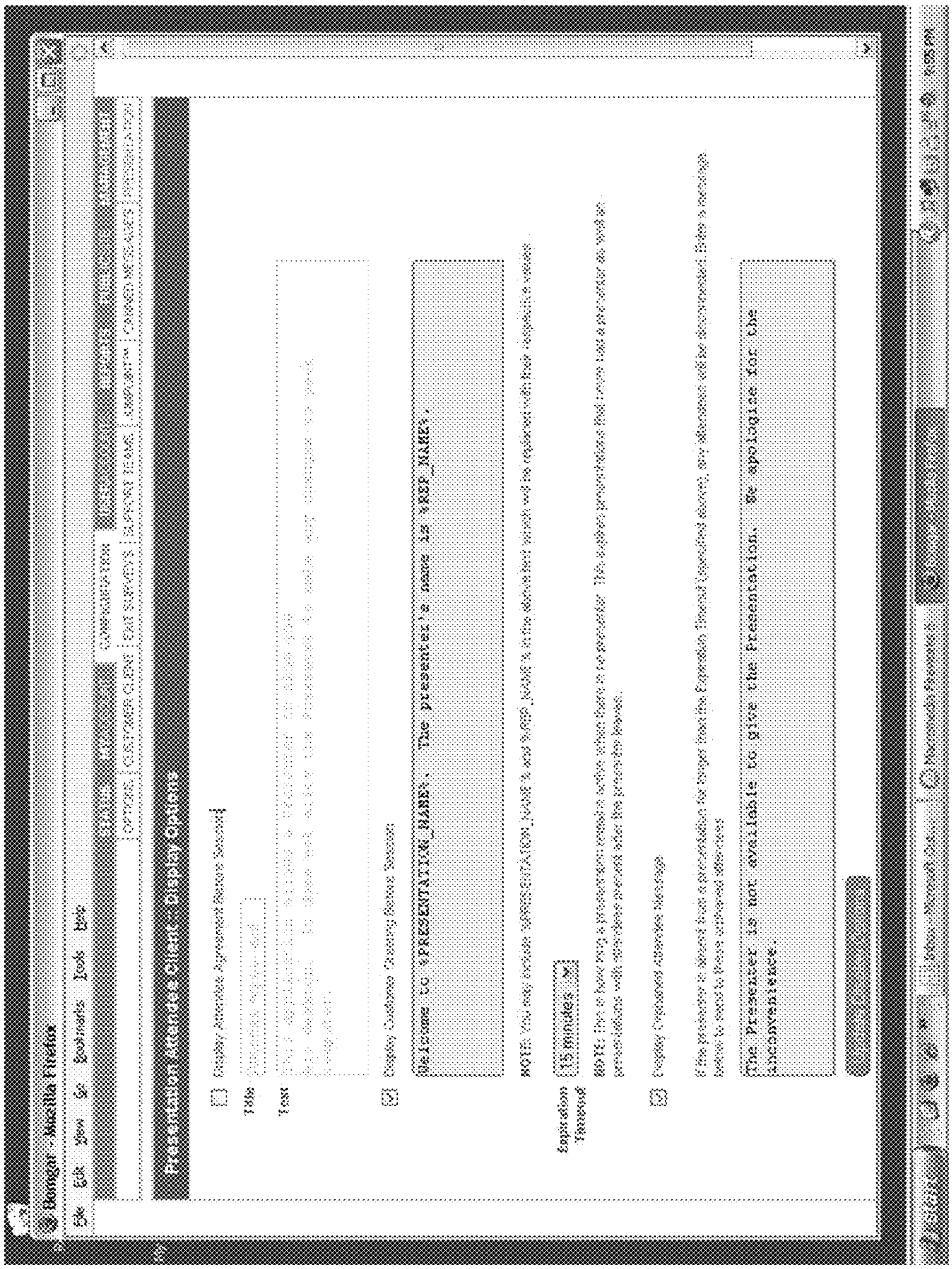
Figure 6P:
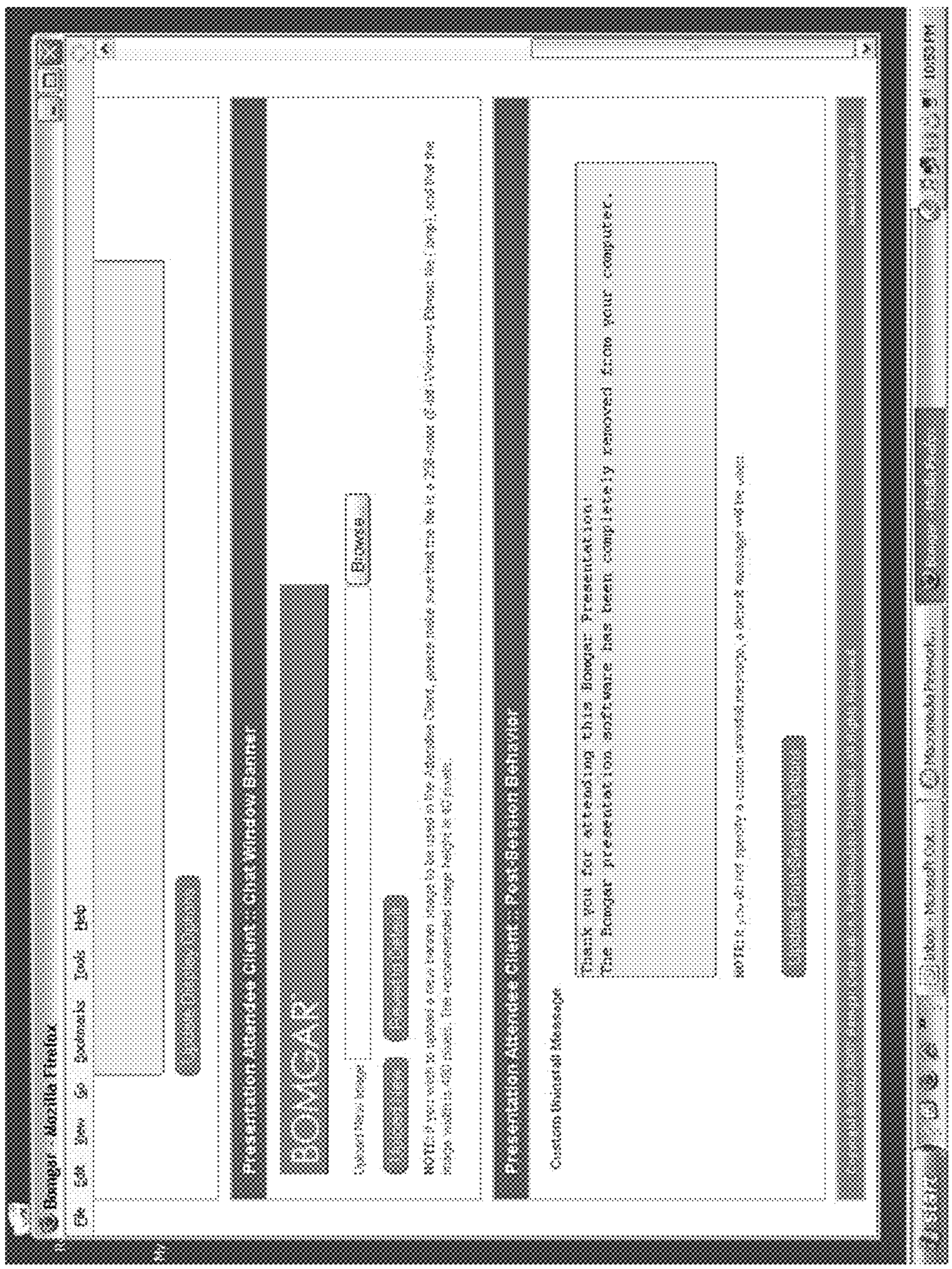

FIGS. 6O and 6P show screens 600*o* and 600*p*, which provide the "Presentation" tab 609. Through this tab 609, the administrator can introduce presentations by displaying a customer agreement or a customer greeting. Should a customer enter a presentation when the presenting representative is not logged into the appliance 101, an expiration timeout determines the length of time the attendee will be allowed to wait before the attendee is logged out and an orphaned session message is displayed. The administrator can also upload a banner to be displayed at the top of the attendee's chat window. At the end of the session, the remote client automatically uninstalls from the attendee's computer. The administrator can create a custom message or use the default uninstall message.

Figure 6Q:
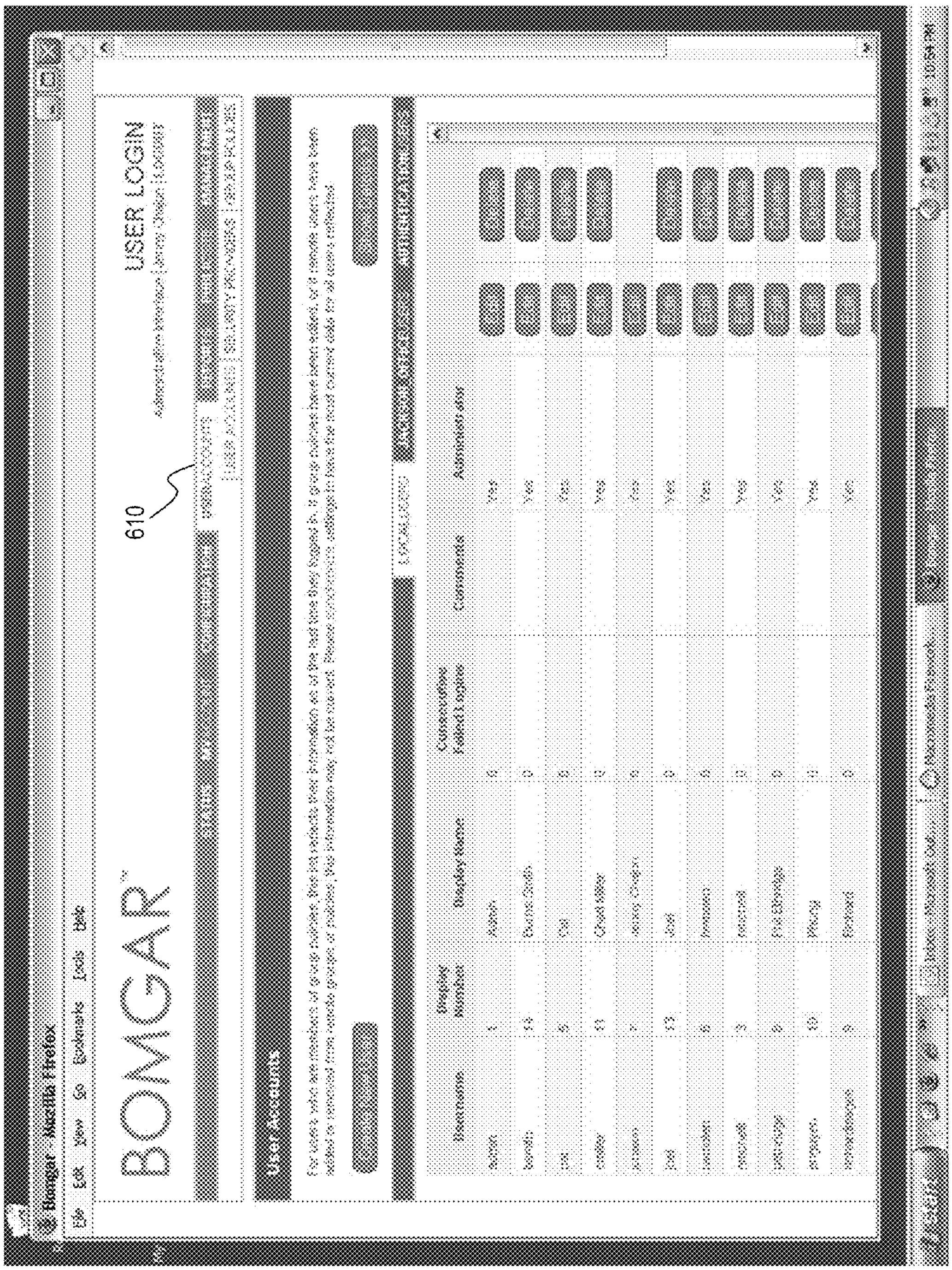
Figure 6R:
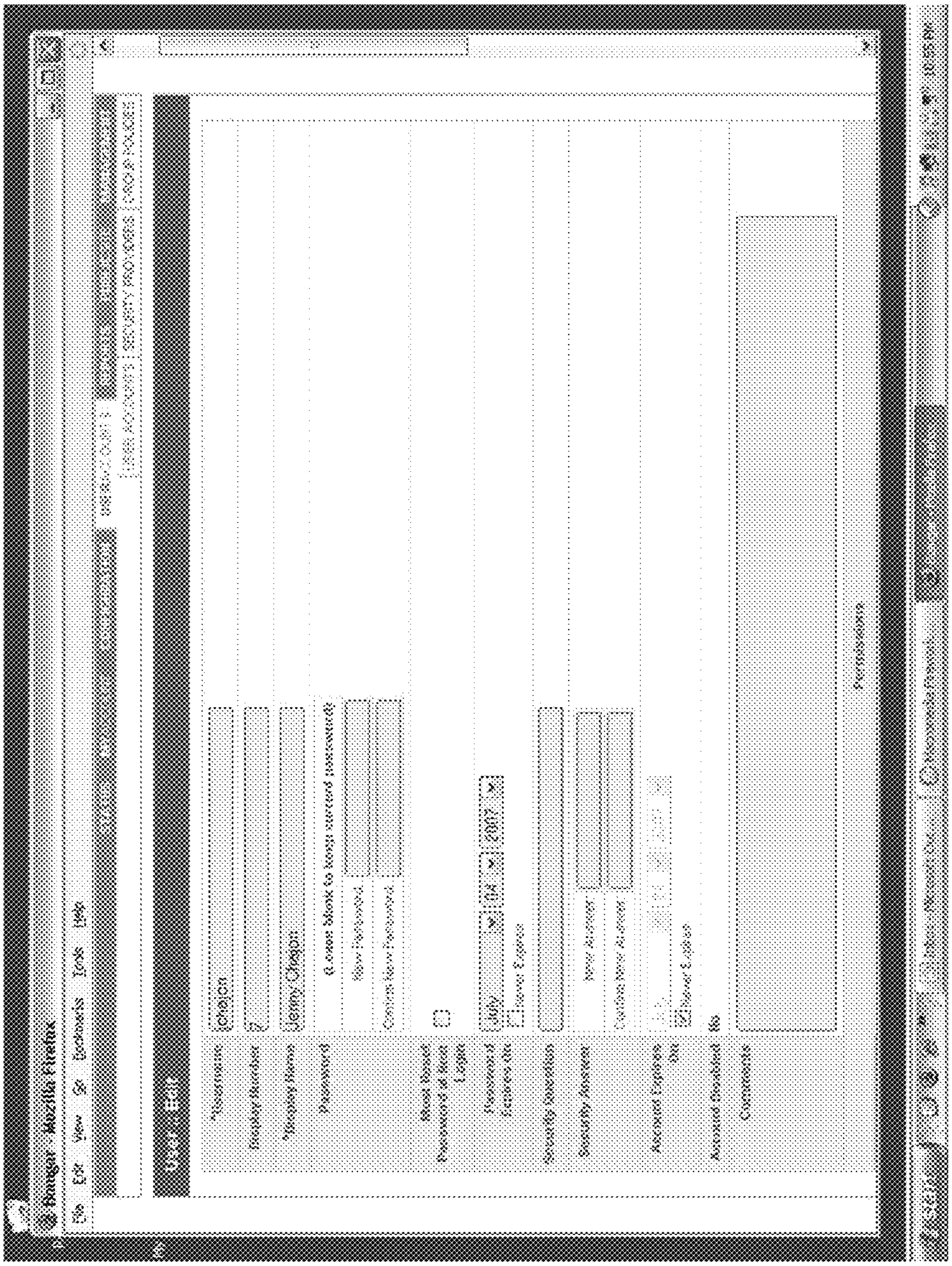
Figure 6S:
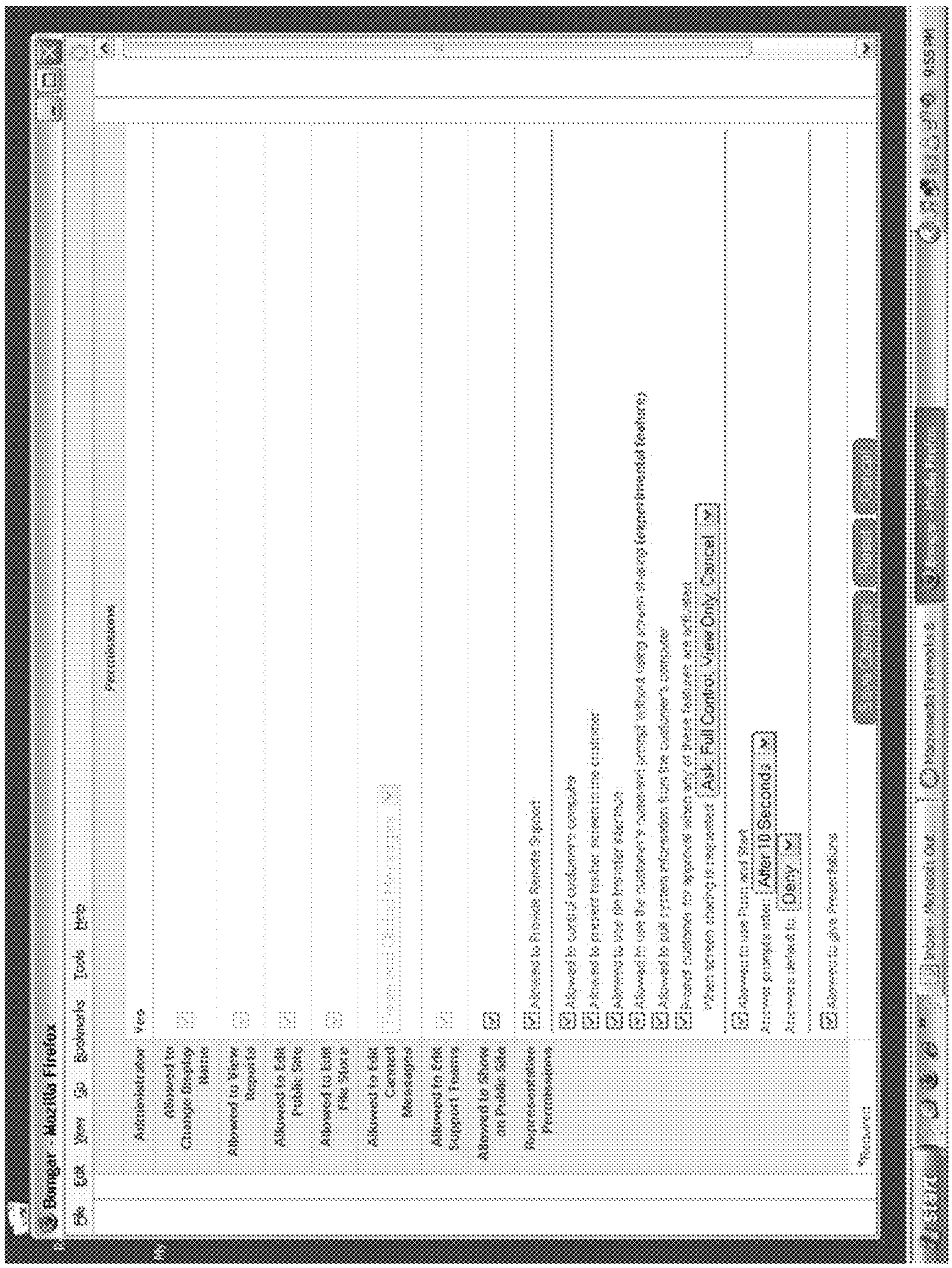
Figure 6T:
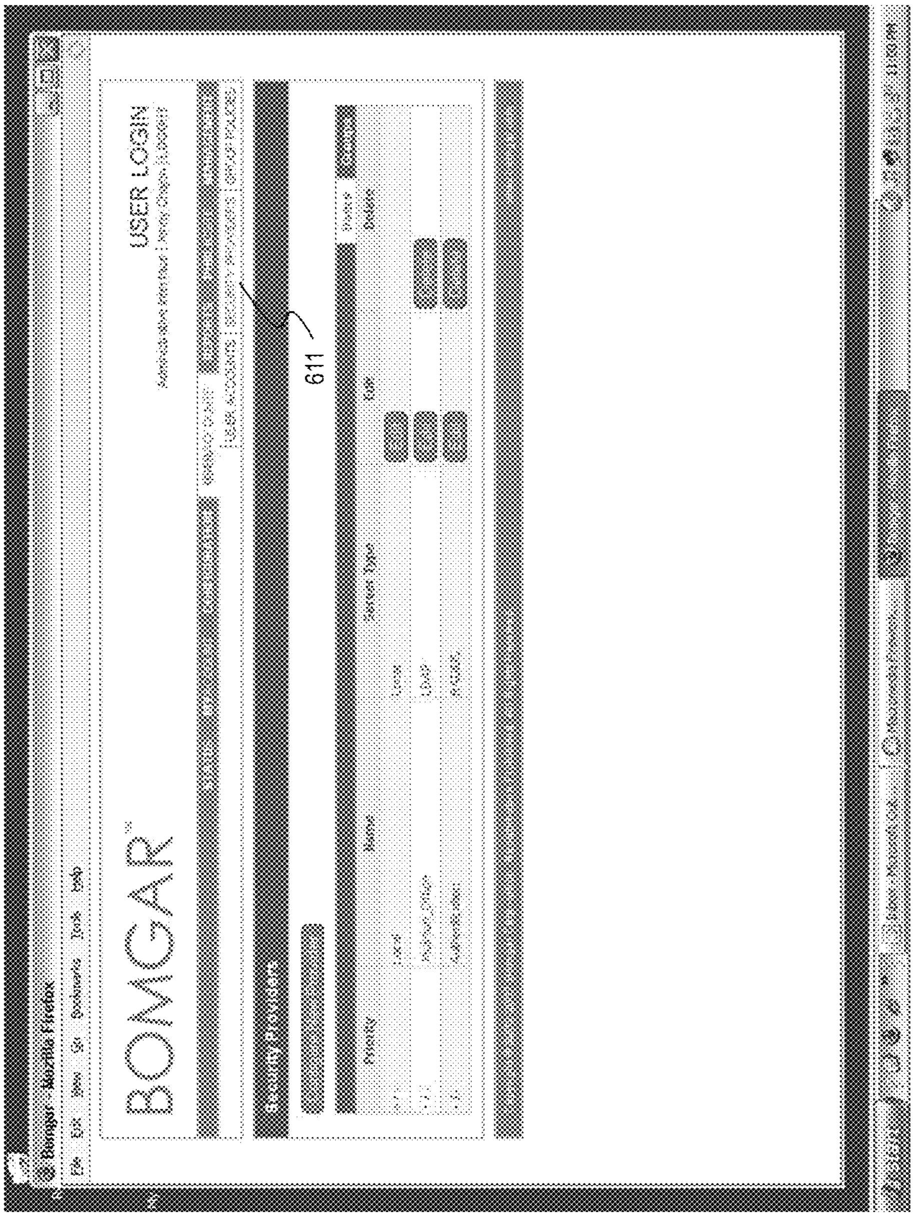
Figure 6U:
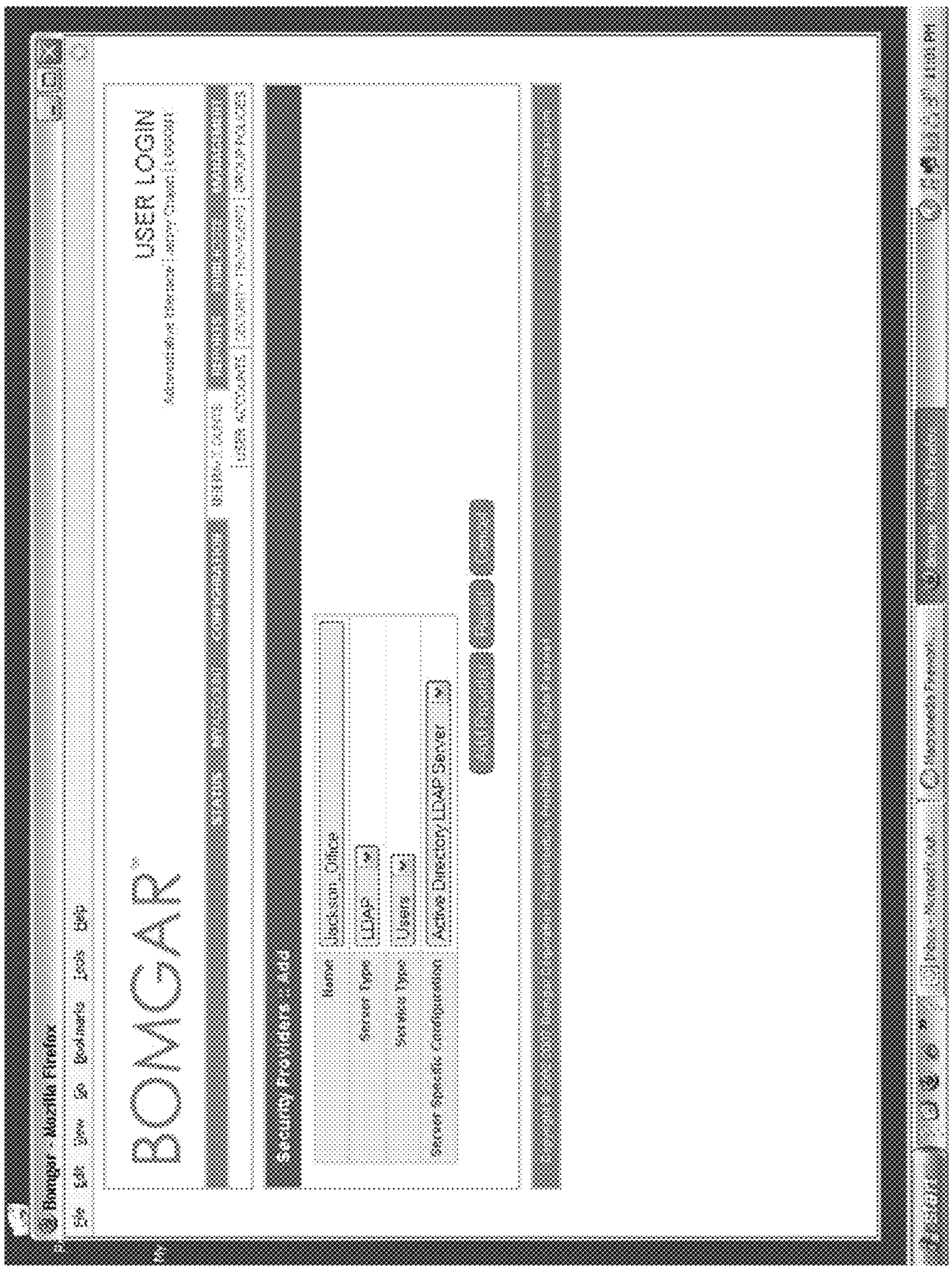
Figure 6V:
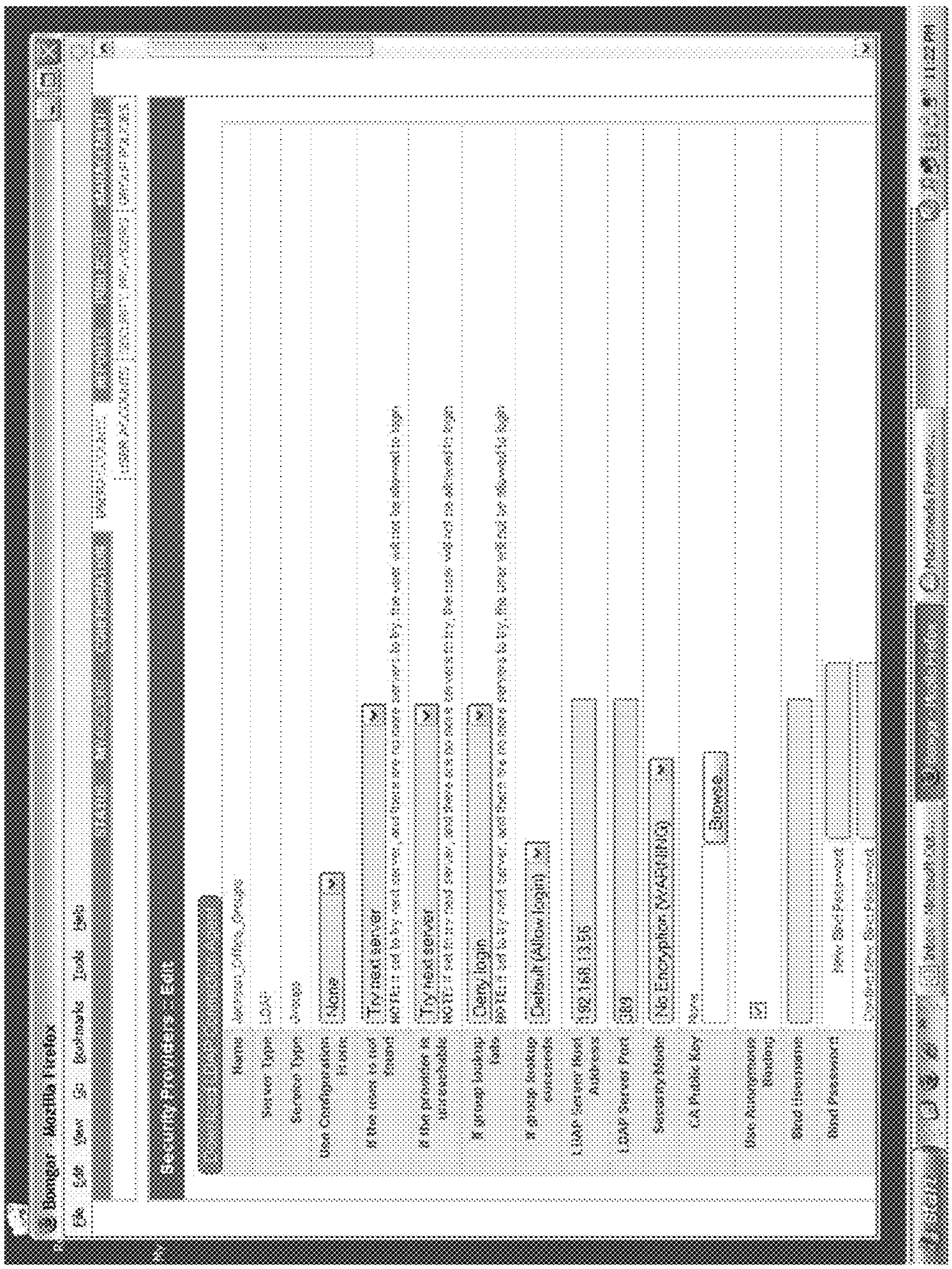
Figure 6W:
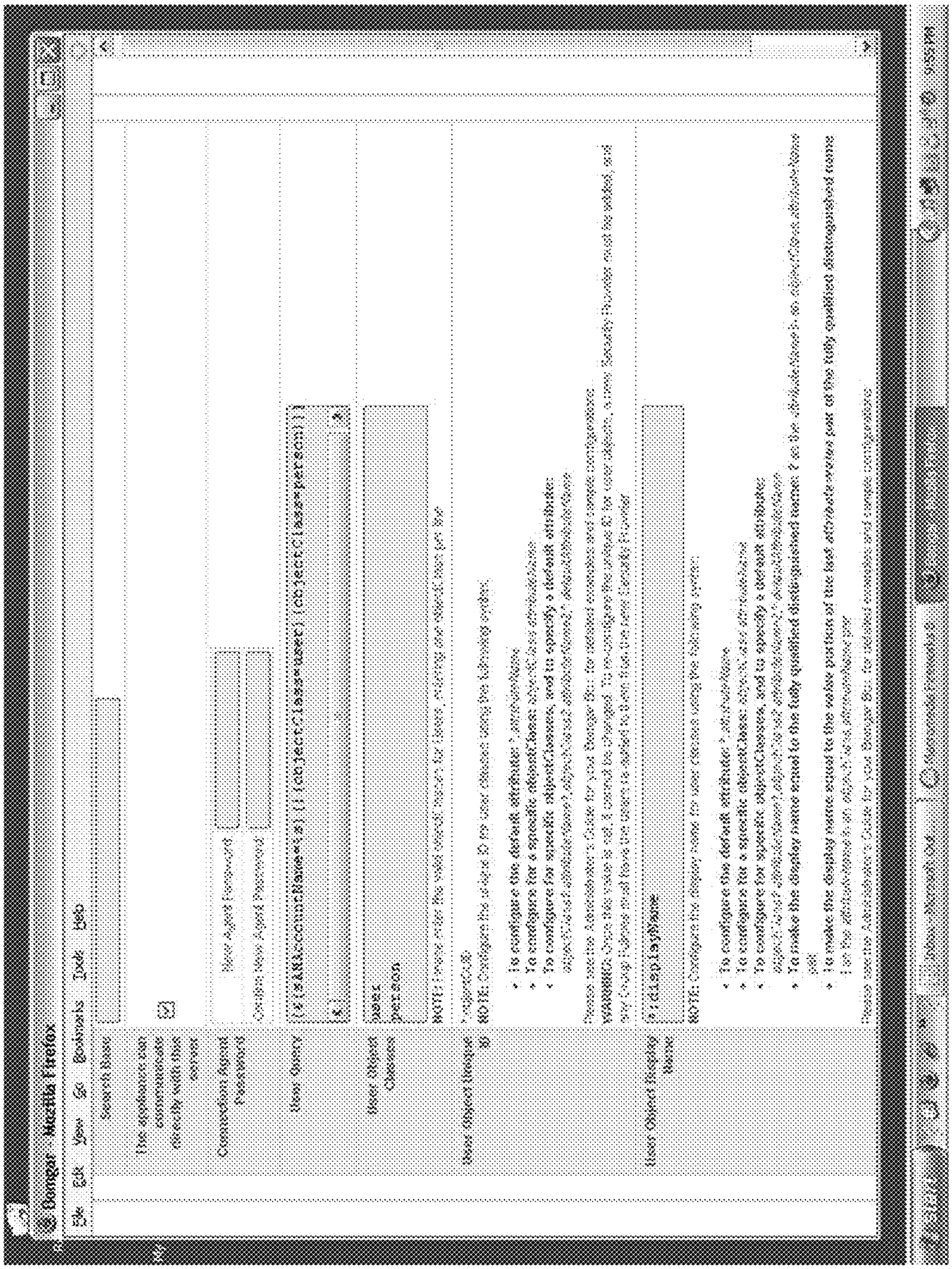
Figure 6X:
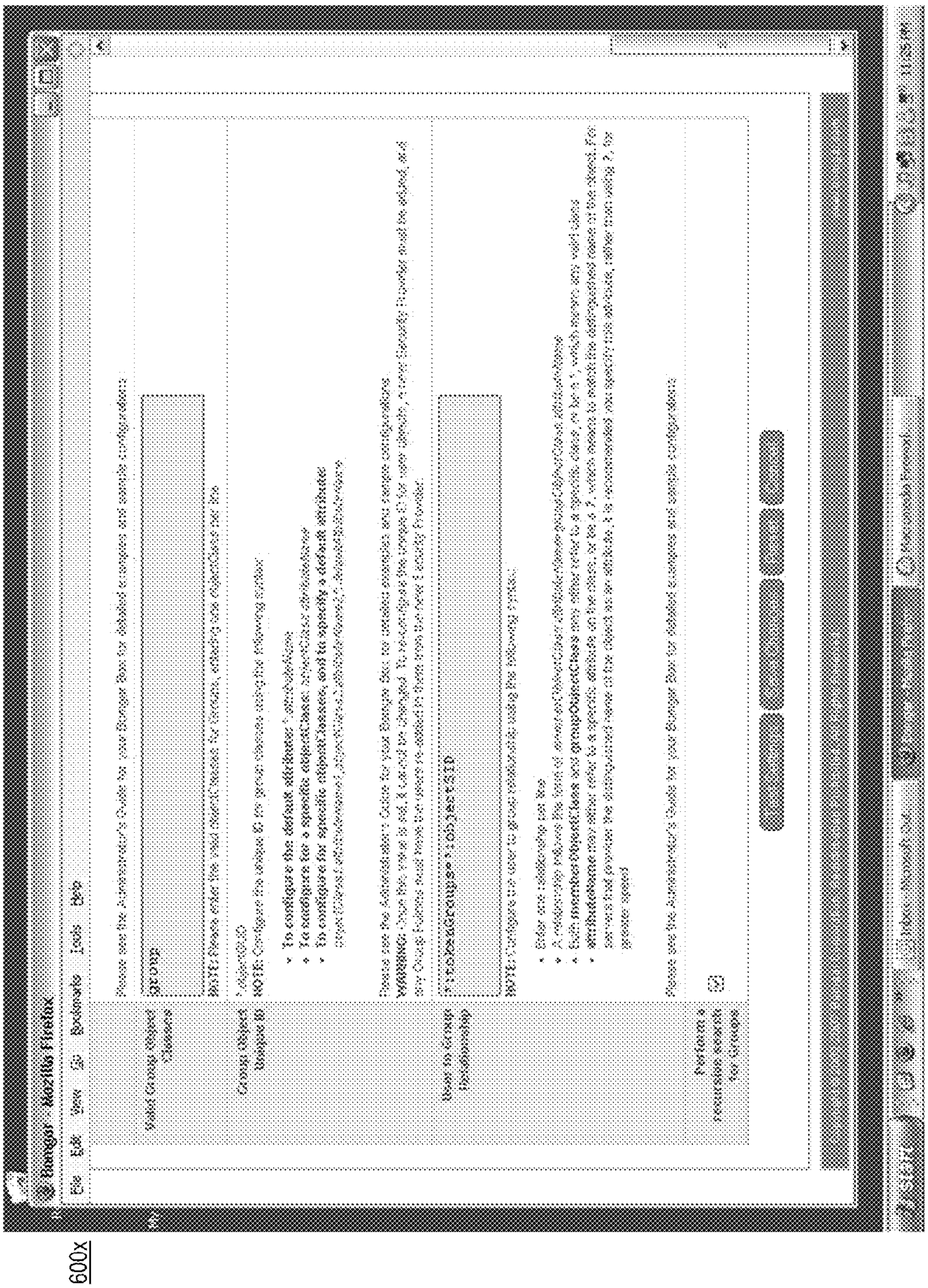
Figure 6Y:
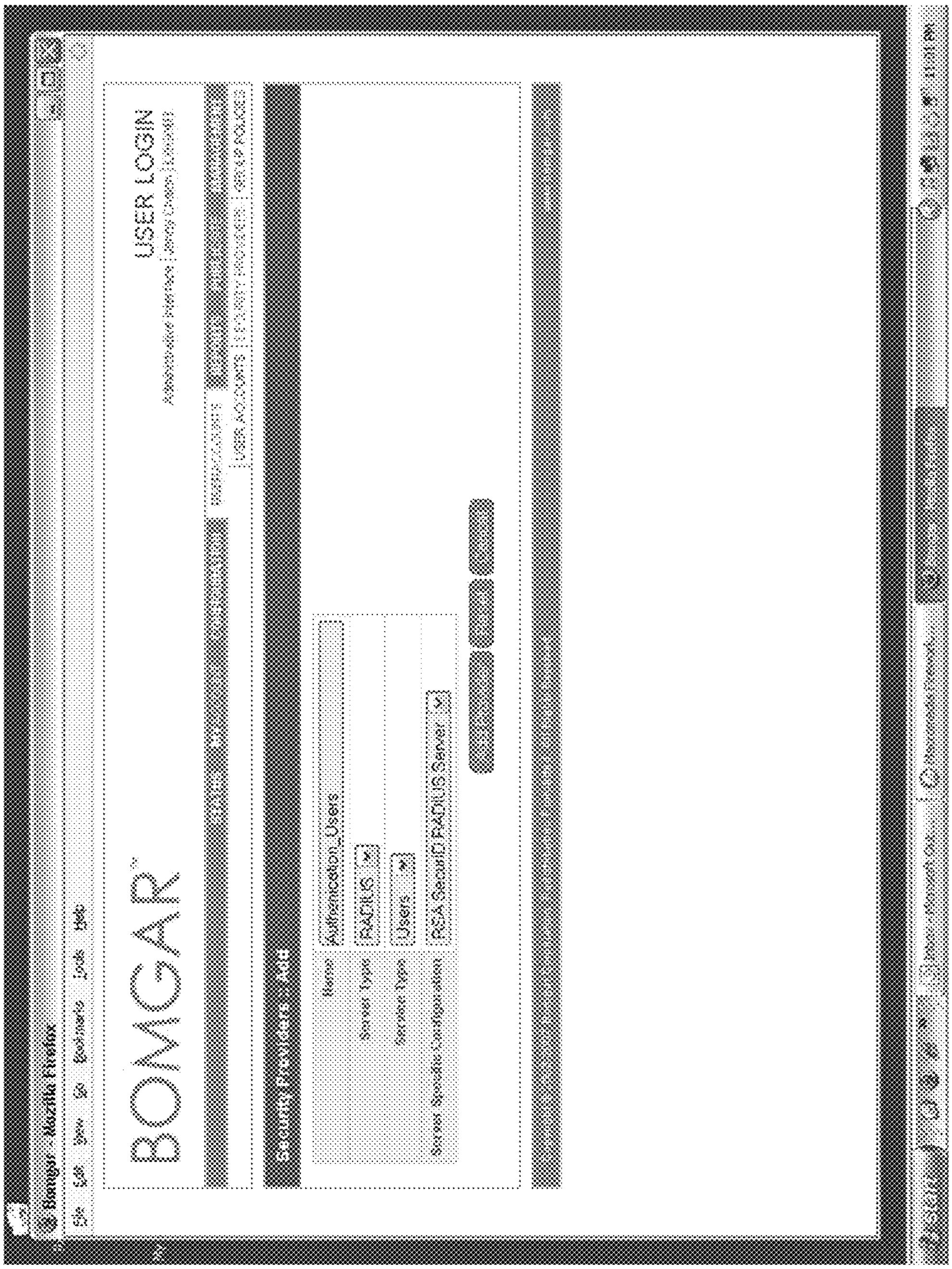
Figure 6Z:
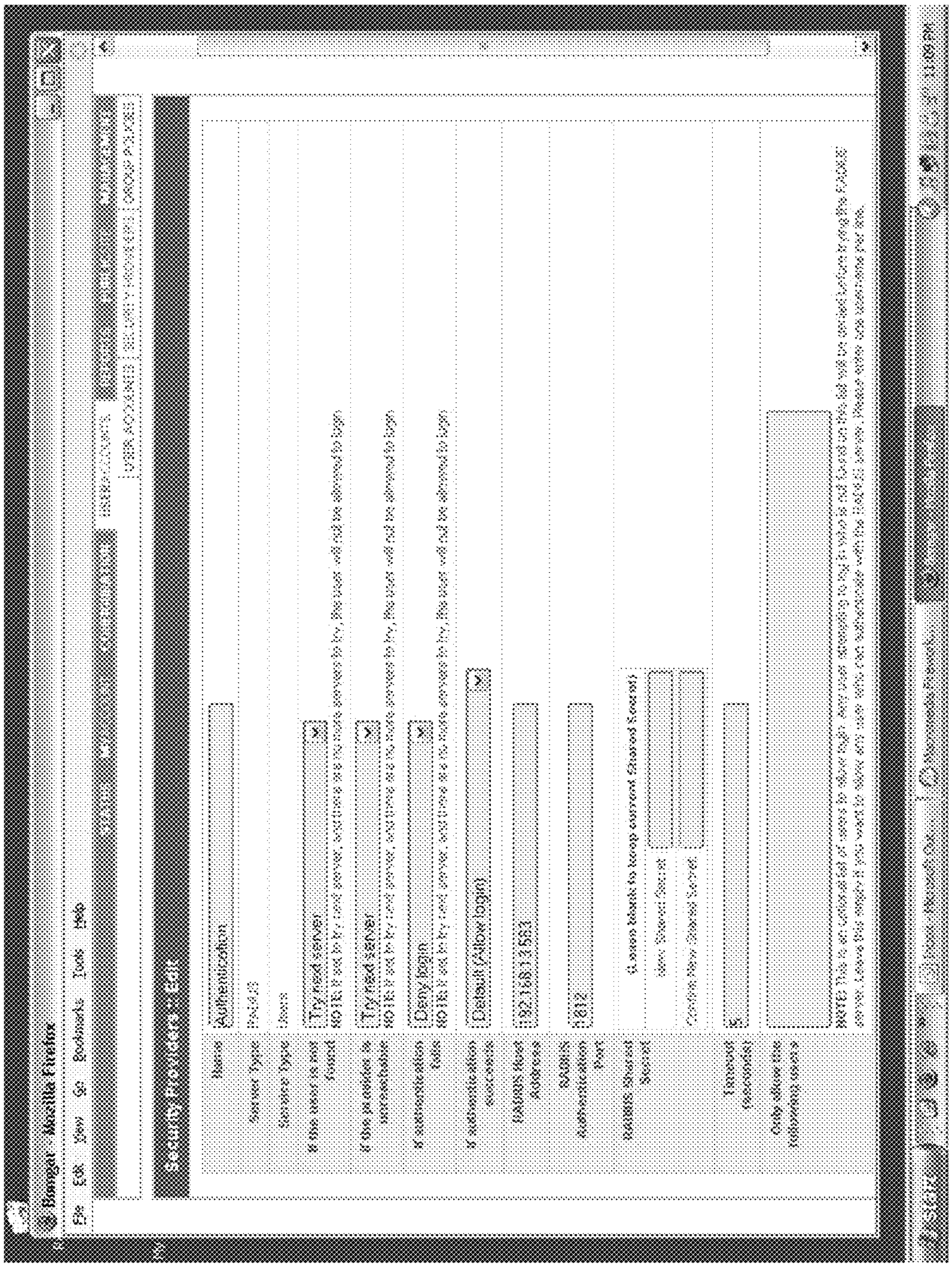
Figure 6A:
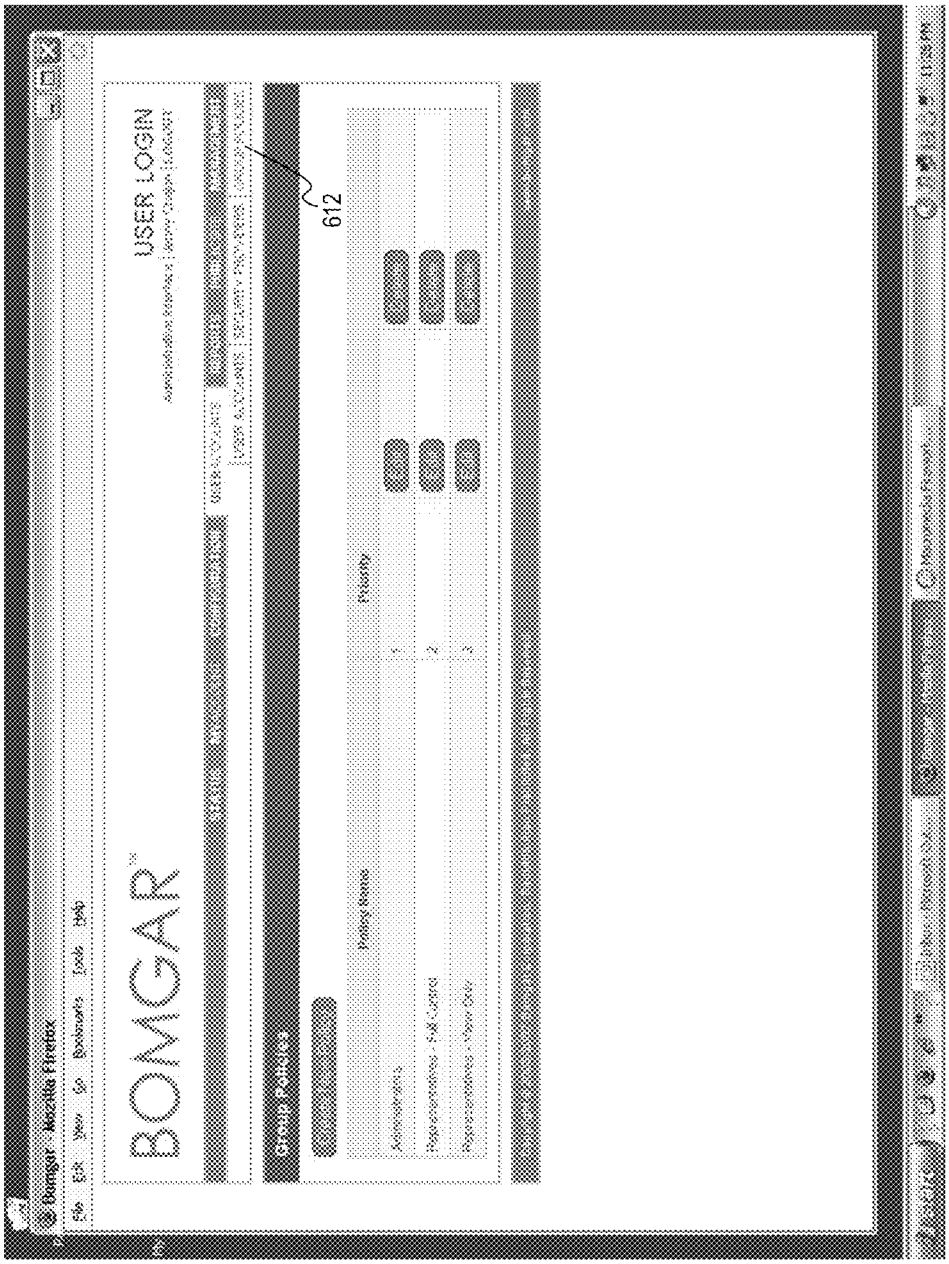
Figure 6B:
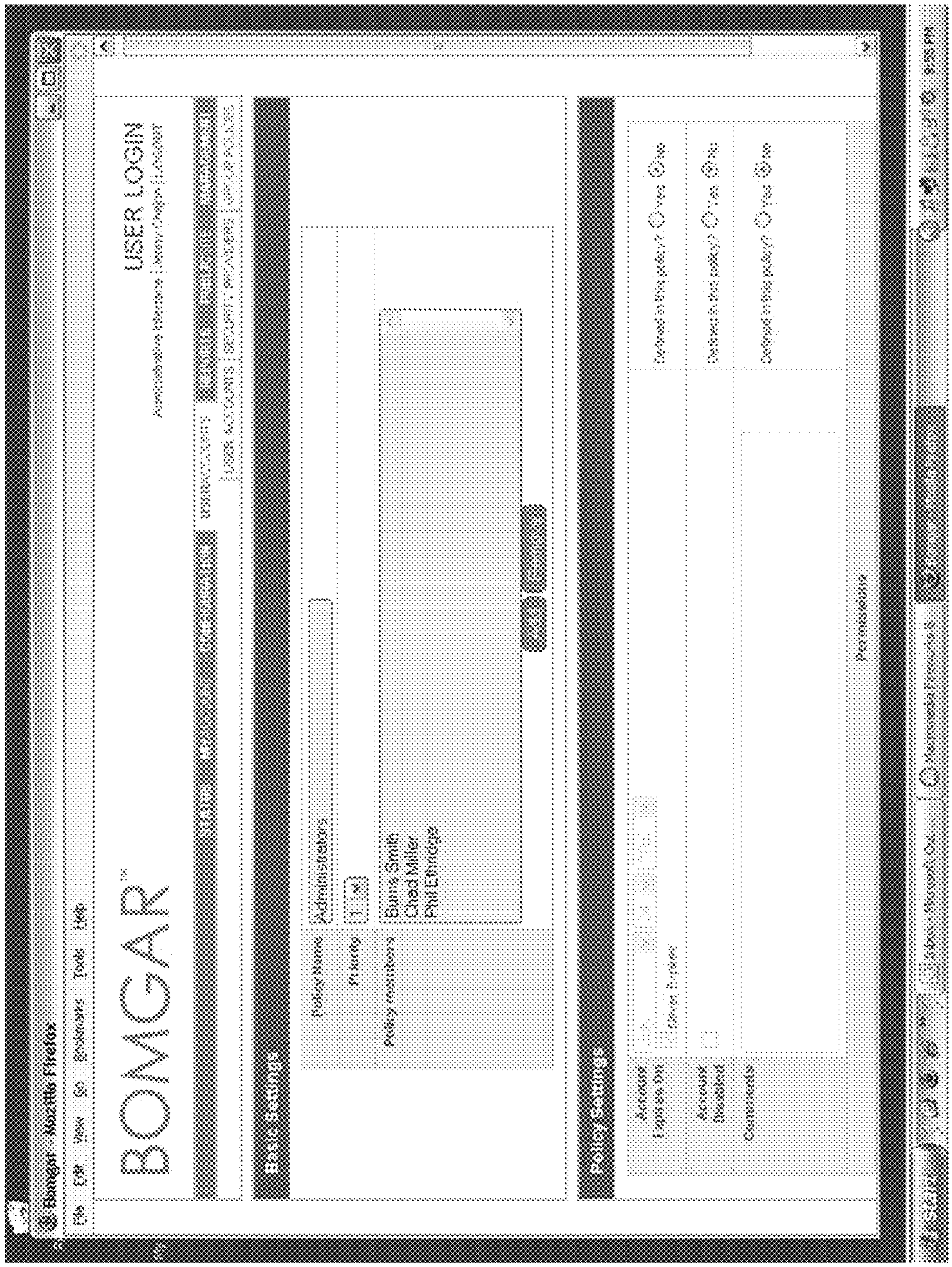
Figure 6C:
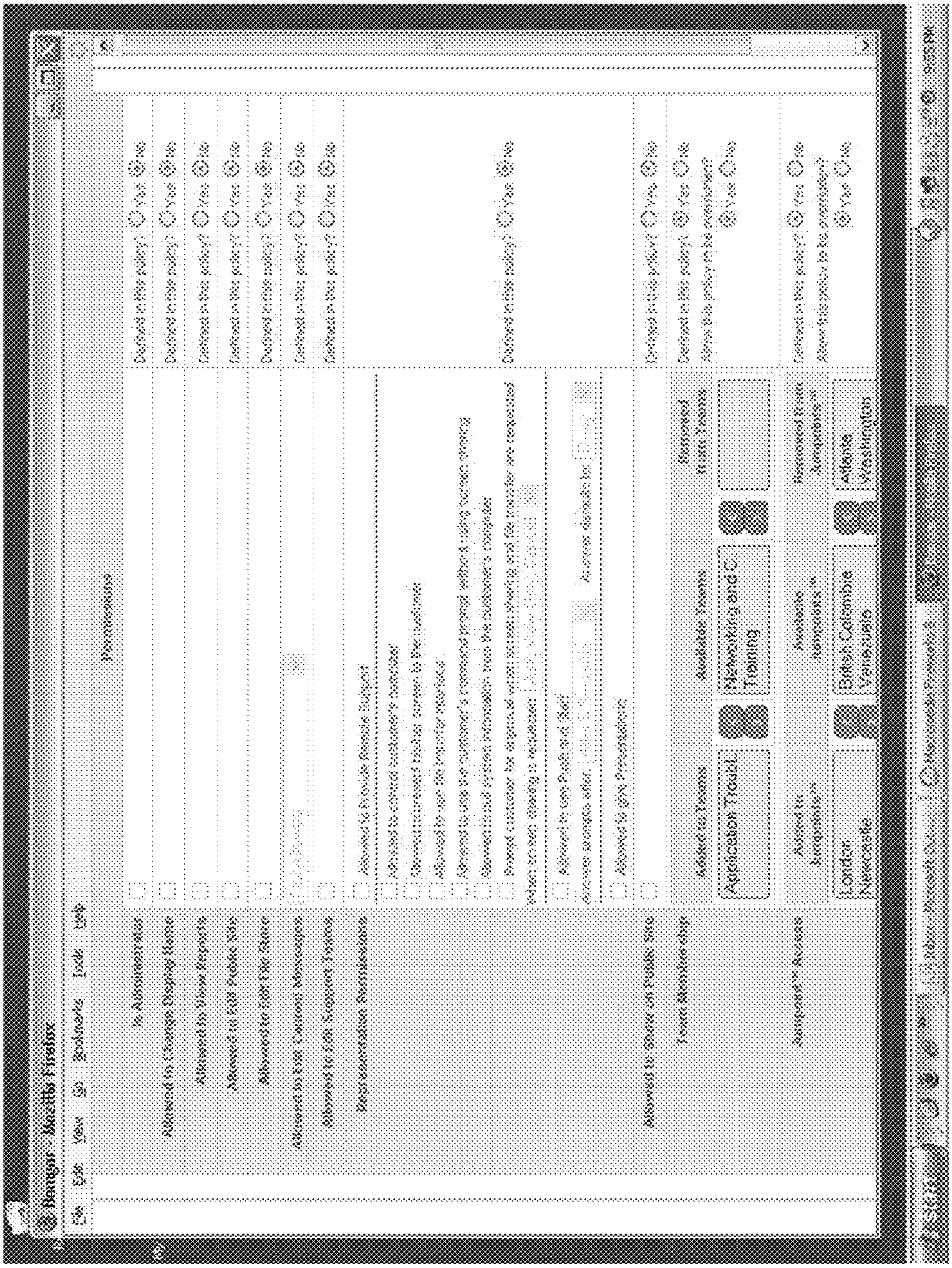
Figure 6D:
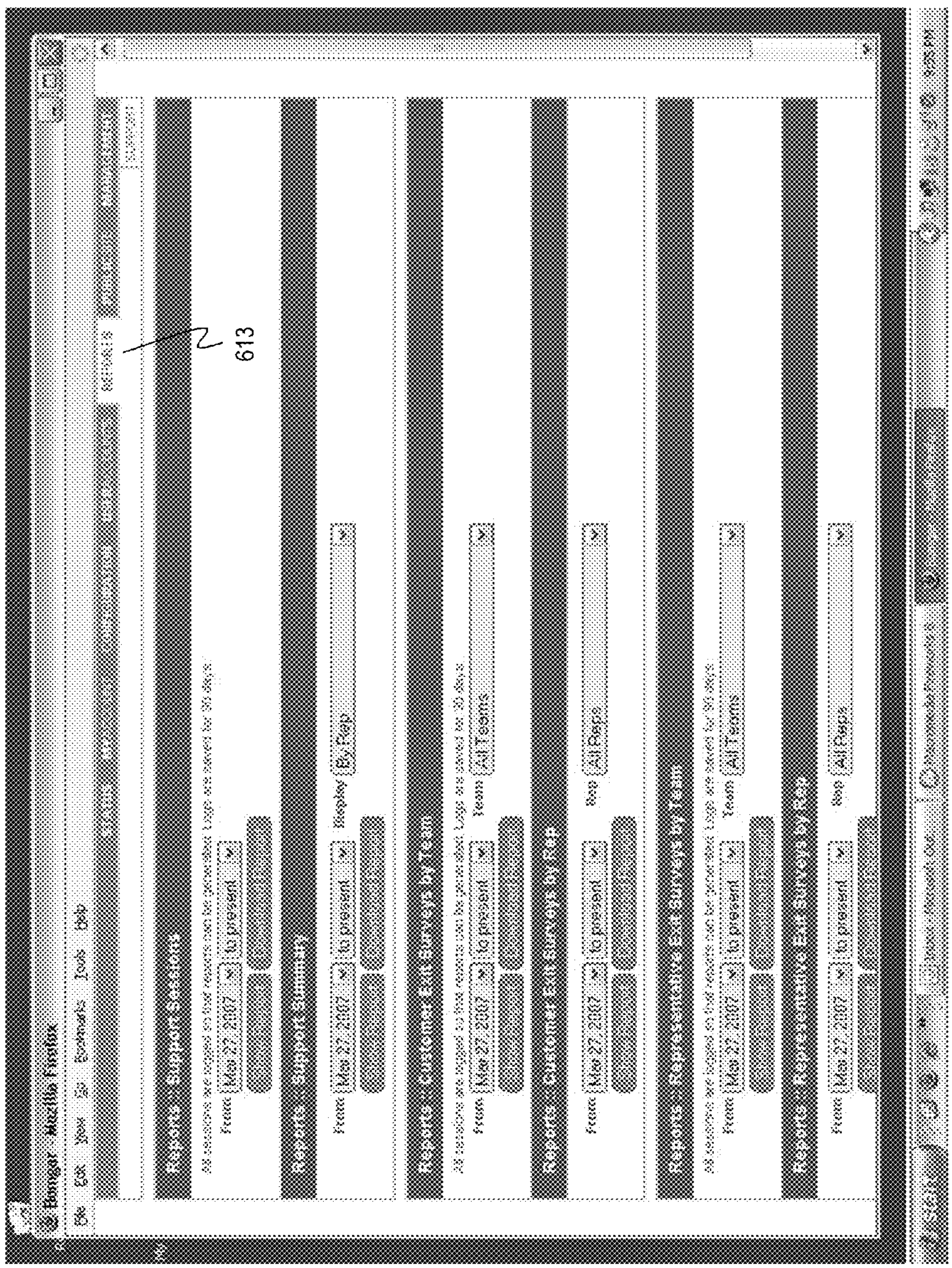
Figure 6E:
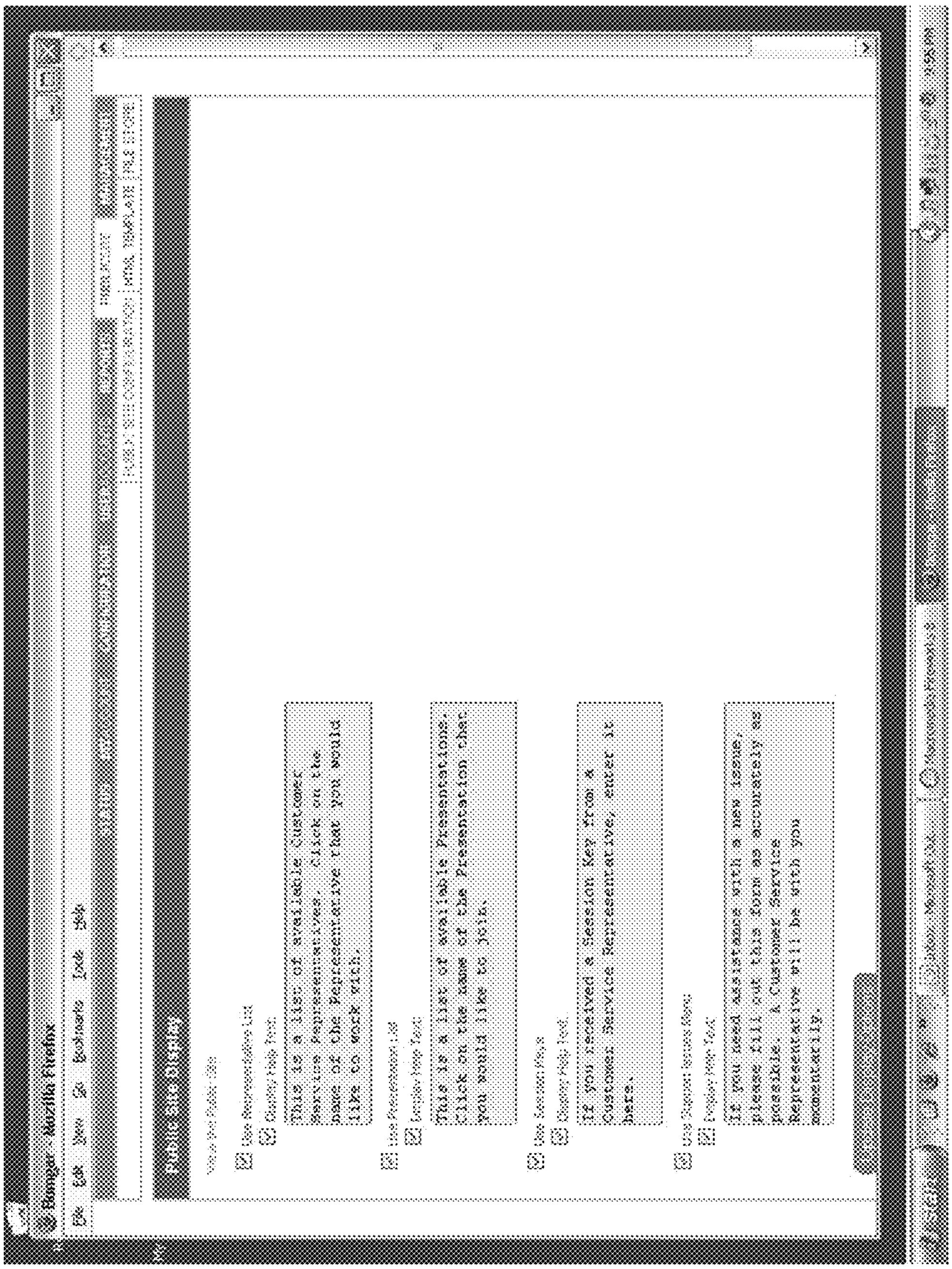
Figure 6F:
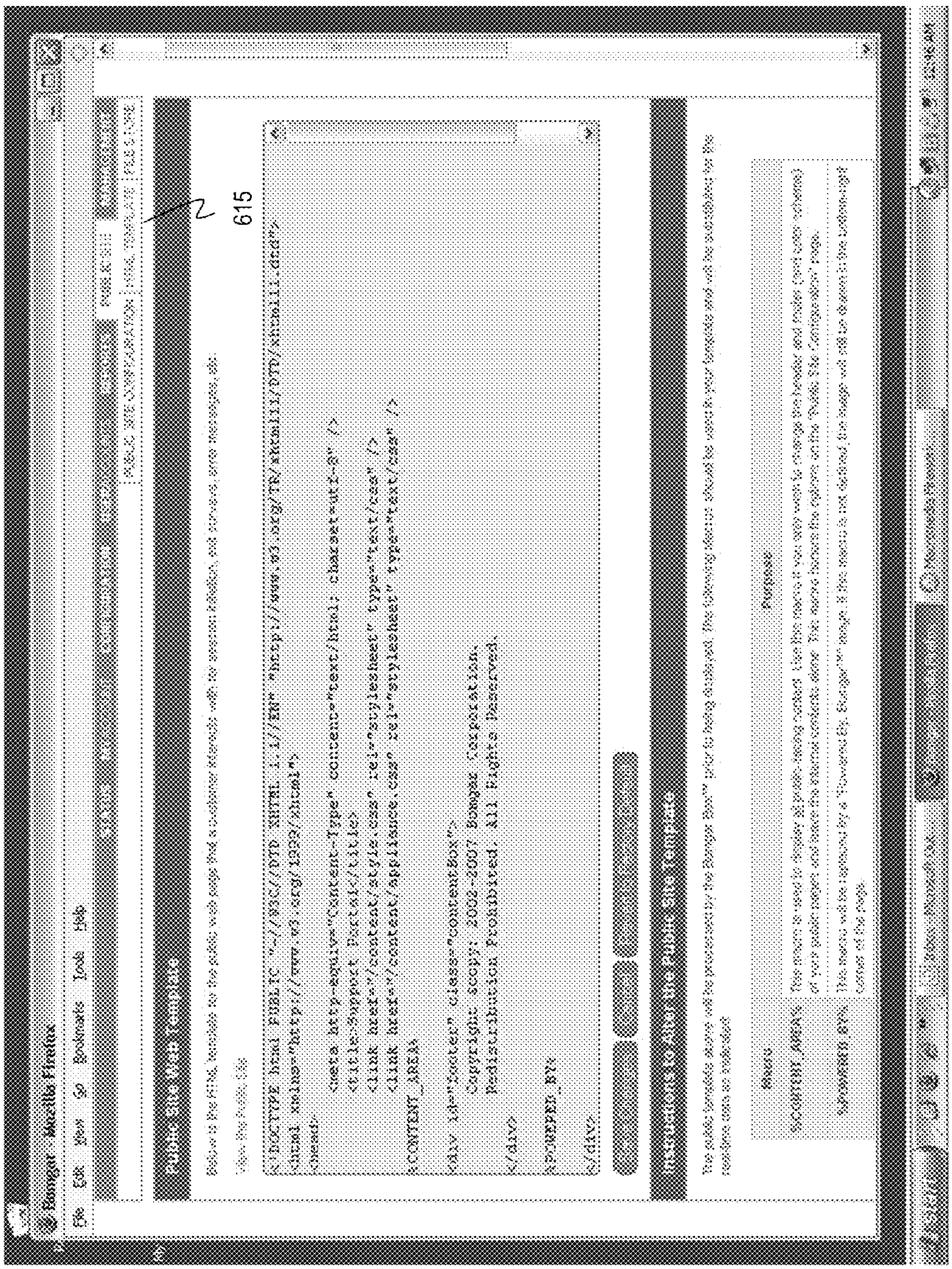
Figure 6G:
Figure 6H:
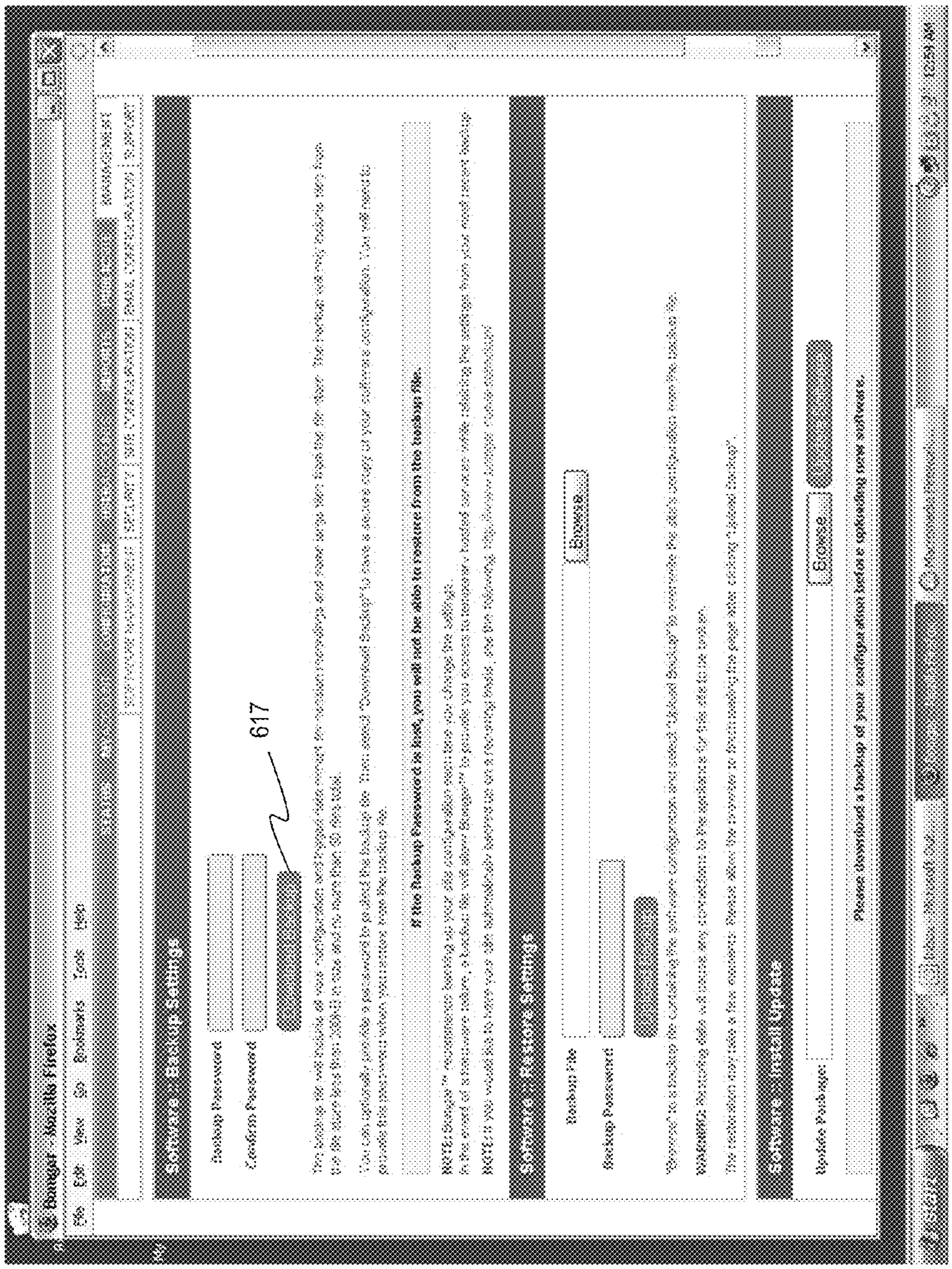
Figure 6I:
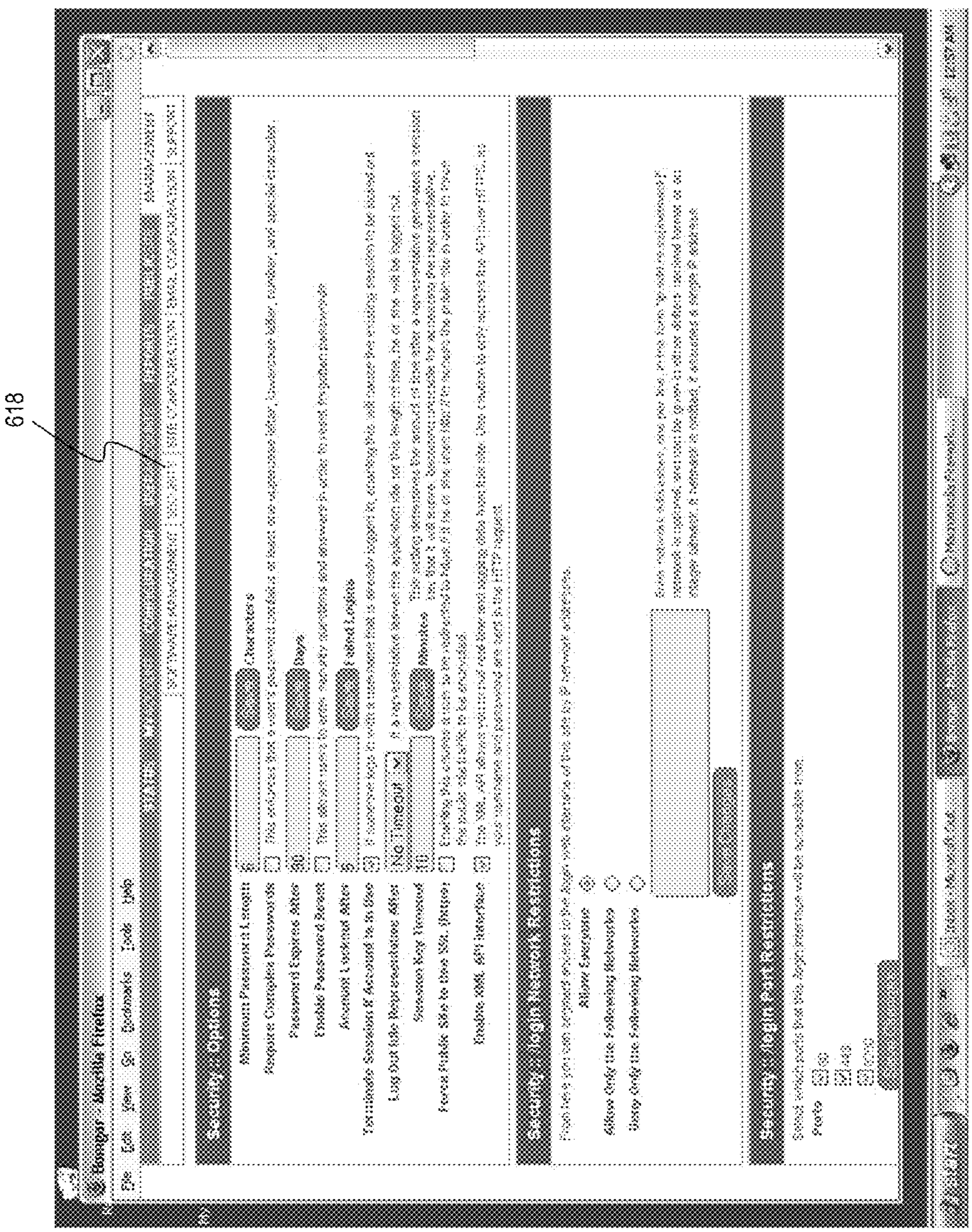
Figure 6J:
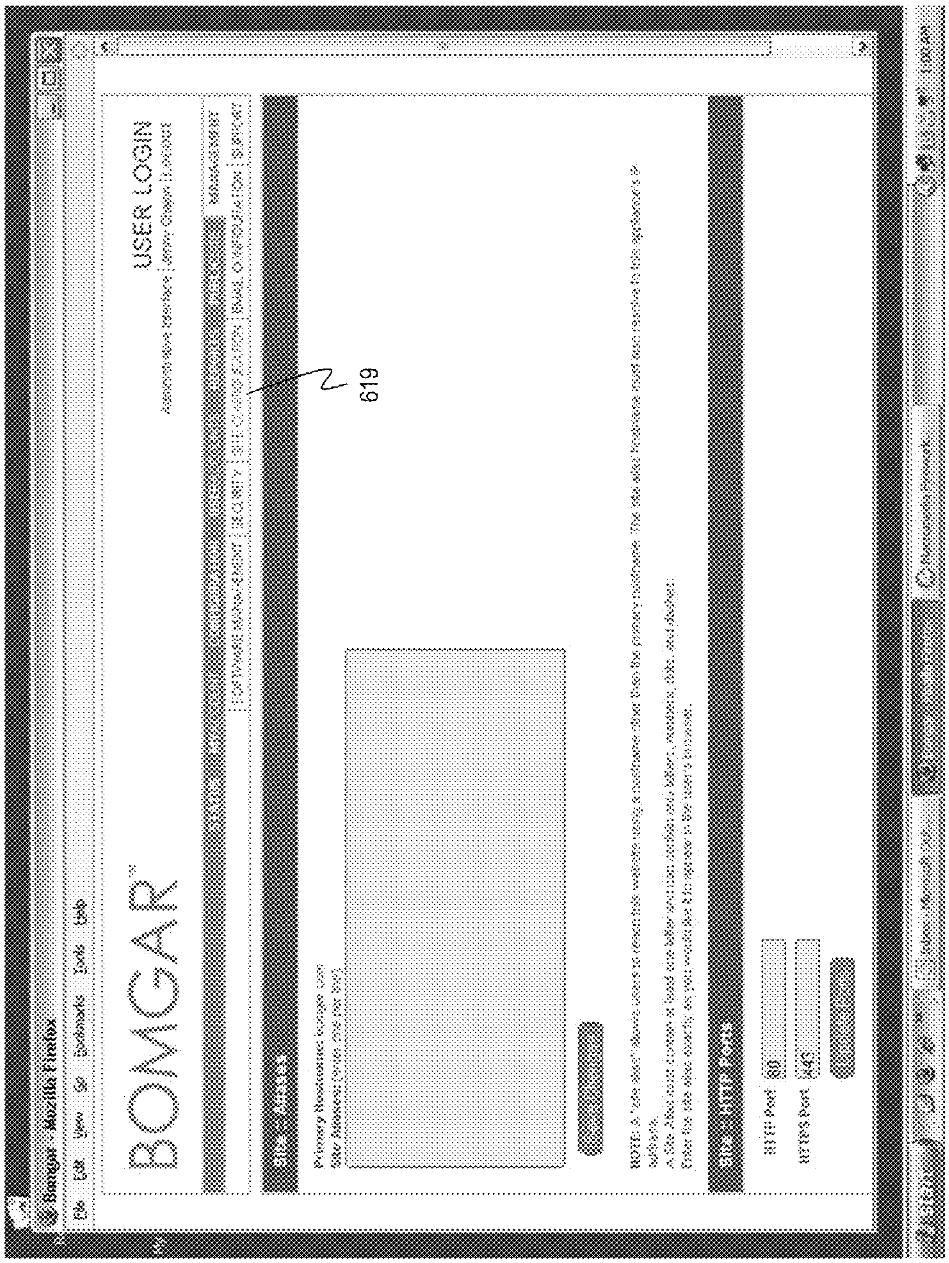
Figure 6K:
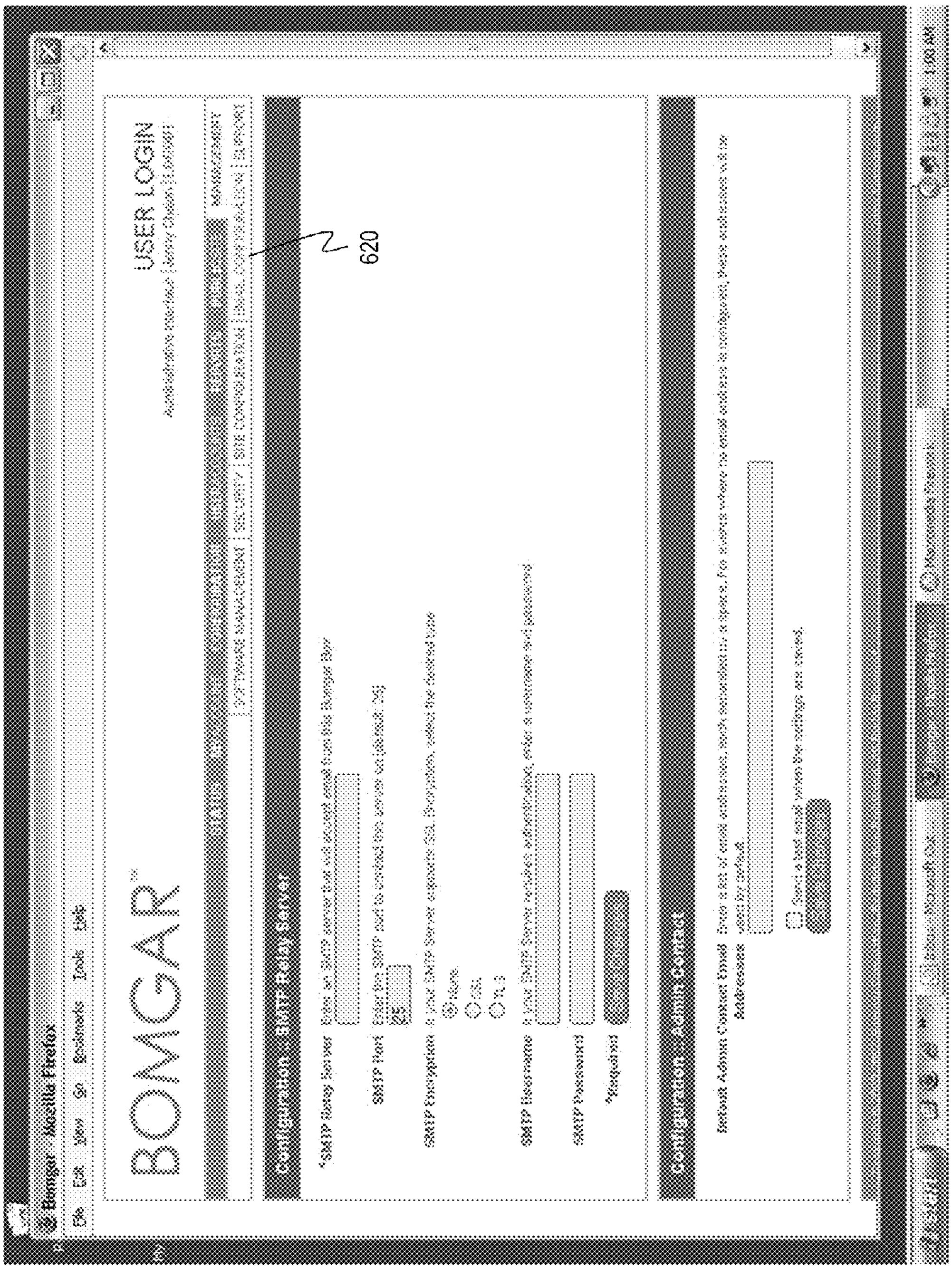
Figure 6L:
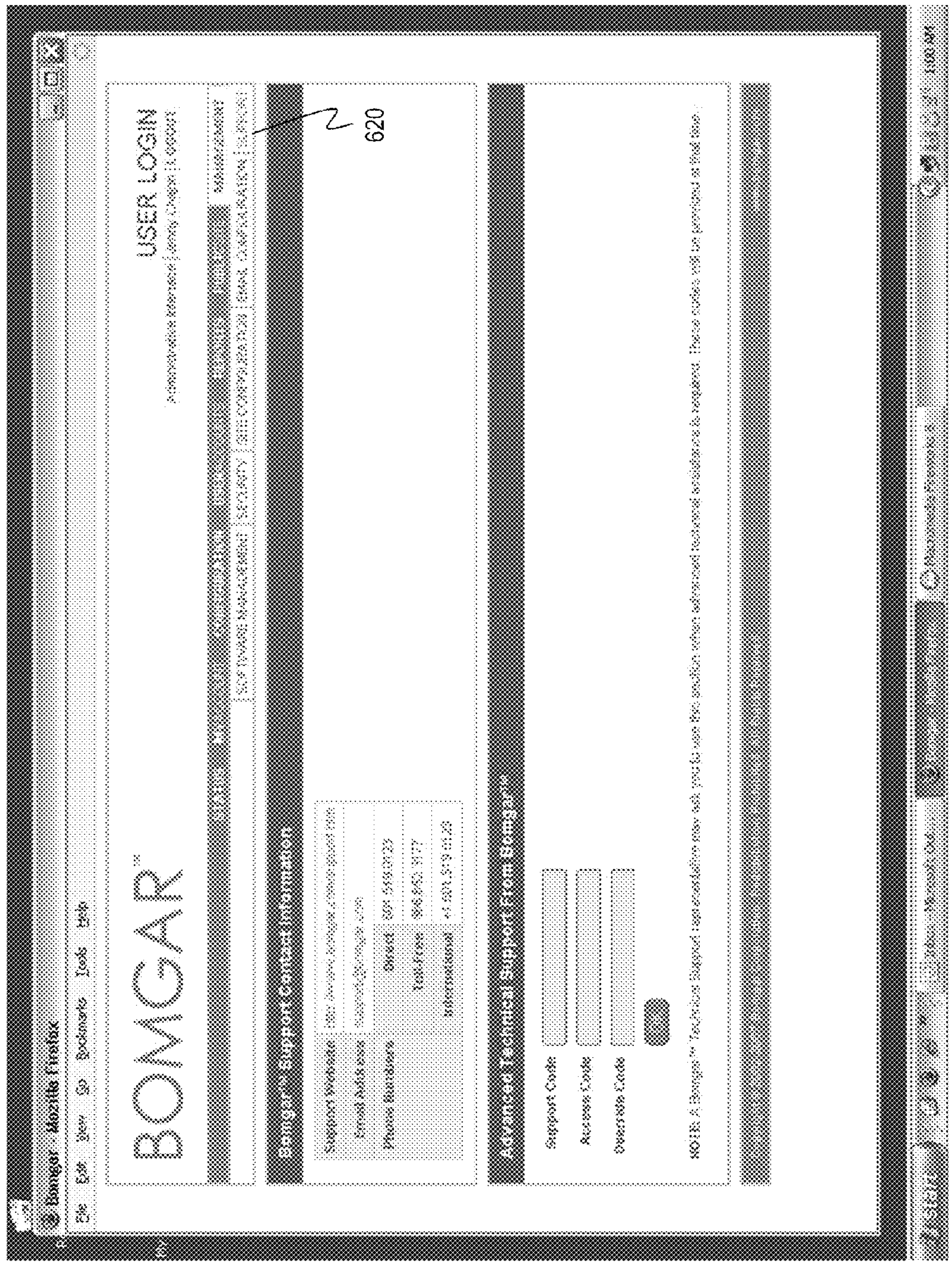

A "User Accounts" tab 610 of FIG. 6Q-6S provides information about all users for whom the administrator has created accounts on the appliance 101. Selecting (e.g., by clicking or other input means) a column heading reorganizes accounts. A "Show All" button permits display of addition information, while "Shrink" enables the administrator to go back to the normal view. The "Edit" section enables the administrator to change individual account settings, and "Delete" removes representatives from the system.

A "Create New User" button allows the administrator to add more representatives to the system. The administrator can then type a username and a display name for the new support representative. Thereafter, the administrator can specify the level to which the representative is allowed to control the system; "Is Administrator" is checked to enable the representative to have administrative rights.

From the "Security Providers" tab 611 of screens 600*t*-600*z* (FIGS. 6T-6Z), the administrator can enable LDAP (Lightweight Directory Access Protocol) and RADIUS (Remote Authentication Dial-In User Service) support to pull account information from authentication servers. This allows representatives to authenticate against an existing directory without the administrator having to create an account for each representative manually. RSA and other multi-factor authentication mechanisms via RADIUS provide an additional level of security. After the security providers are set up, the administrator can arrange these servers in order of priority and can also edit the settings to determine the course of action should the server not locate an account.

The "Group Policies" tab 612 of FIGS. 6AA-6CC allows the administrator to set up groups of representatives who will share common privileges. The administrator can select the representatives who are to be assigned to each group and then determine which privileges are assigned to the group and which should be set individually. If administrators can enable LDAP (Lightweight Directory Access Protocol) support to pull account information from an active directory (not shown). This associates the support representative usernames and passwords with users' logins. an authentication server is being used, representatives and groups can be imported from the server to simplify this process. The administrator can also designate the support teams to which representatives in this group should be added and Jumpoints™ to which these representatives should be granted access. For management purposes, the recommended order of priority is to define policies for more specific user groups as higher priority (preventing override) and to move down from there, setting broader groups as lower priority.

Additionally, the administrators can generate activity reports, with a full chat transcript, files transferred, permissions granted, and a Flash video recording, along with other details such as system information, session duration and local and remote computer names and IP addresses. Additionally, the administrator can view or download reports of customer or representative exit surveys based on date range, support team or support representative. By way of example, reports can be viewed online or downloaded into a .csv (Comma Separated Value) file. This capability is depicted in FIG. 6DD via the "Reports" tab 613.

In one embodiment, the customers' support request page is the public site of the network appliance 101. From the "Public Site Configuration" tab 614 of FIG. 6EE, the administrator can select which options are available for customers to request support or view a presentation and can also create a help message to aid the customer in determining the best option for initiating that session.

The administrator can further customize the public site's HTML code to be consistent with the rest of the website via the "HTML Template" tab 615 of FIG. 6FF. The administrator can also return the public site to its original state by clicking the "Revert to Factory Default" button at the bottom of the coding window.

The "File Store" tab 616 of FIG. 6GG enables the convenient sharing of files over the network. The administrator may use the online file store to save files that representatives may frequently need during support sessions. The administrator can also save images to reference them in the public site when modification of the graphical content is desired.

The administrator can also download backups from the "Software Management" tab 617 depicted in FIG. 6HH. The "Download Backup" button saves a secure copy of the software configuration. The administrator is encouraged to back up the appliance configuration each time the appliance's setting is changed. In the event of a hardware failure, a backup file will allow access to temporary hosted services while retaining the settings from the most recent backup of the appliance 101. An "Update Software" function can also be used to upload new software packages. In one embodiment, this function provides for automatically upgrading all software licenses on the appliance 101.

According to one embodiment, the administrator can set rules regarding passwords as well as set the number of times an incorrect password can be entered before the representative is locked out through the "Security" tab 618 of FIG. 6II. If a support representative tries to log in with a username already in use, a checked "Terminate Session" box disconnects the previous representative in order to allow the new representative to log in. The administrator can set the time after which an inactive representative will be logged out.

A "Session Key Timeout" field sets a length of time for which a session key remains valid. If the remote customer does not use the session key within the time allotted, the customer cannot connect to the representative, the key will expire and the representative will need to create a new session key. Additional security can be obtained with "Force Public Site to Use SSL (https)", for example. Using HTTPS (Hypertext Transfer Protocol over Secure Socket Layer) forces the Internet connection to use SSL (Secure Socket Layer) encryption, thereby preventing unauthorized users from accessing the appliance 101 accounts. The administrator can choose to allow integration with the appliance 101 reporting API. The administrator can also determine which IP networks can have access to the appliance 101 and can set the ports through which the appliance 101 can be accessed.

The "Site Aliases" field on the "Site Configuration" tab 619 of screen 600*jj* (shown in FIG. 6JJ) allows multiple DNS (Domain Name System) names to resolve to the same appliance 101. To support this capability, it is assumed that there is an available A-record that resolves to the public IP of the appliance 101 in order to add a site alias. The administrator can also select the ports through which the appliance 101 should operate.

From the "Email Configuration" tab 620 shown in FIG. 6KK, the administrator can configure the SMTP relay server and designate one or more administrative contacts so that the appliance 101 is able to send automatic email notifications.

The "Support" tab 621 shown in FIG. 6LL provides support contact information and also allows an appliance-initiated support tunnel for quick resolution of complex issues.

As described, the representatives may download the software that they are going to use to provide support to their remote customer by accessing a URL and entering their username and password that has been set up by the appliance administrator. After downloading the representative software client, the representative may log in to the representative interface. Once a username and password is entered, a notification is provided to inform the representative that he or/she is logged into the appliance URL, and the support queue will open automatically.

Figure 7A:
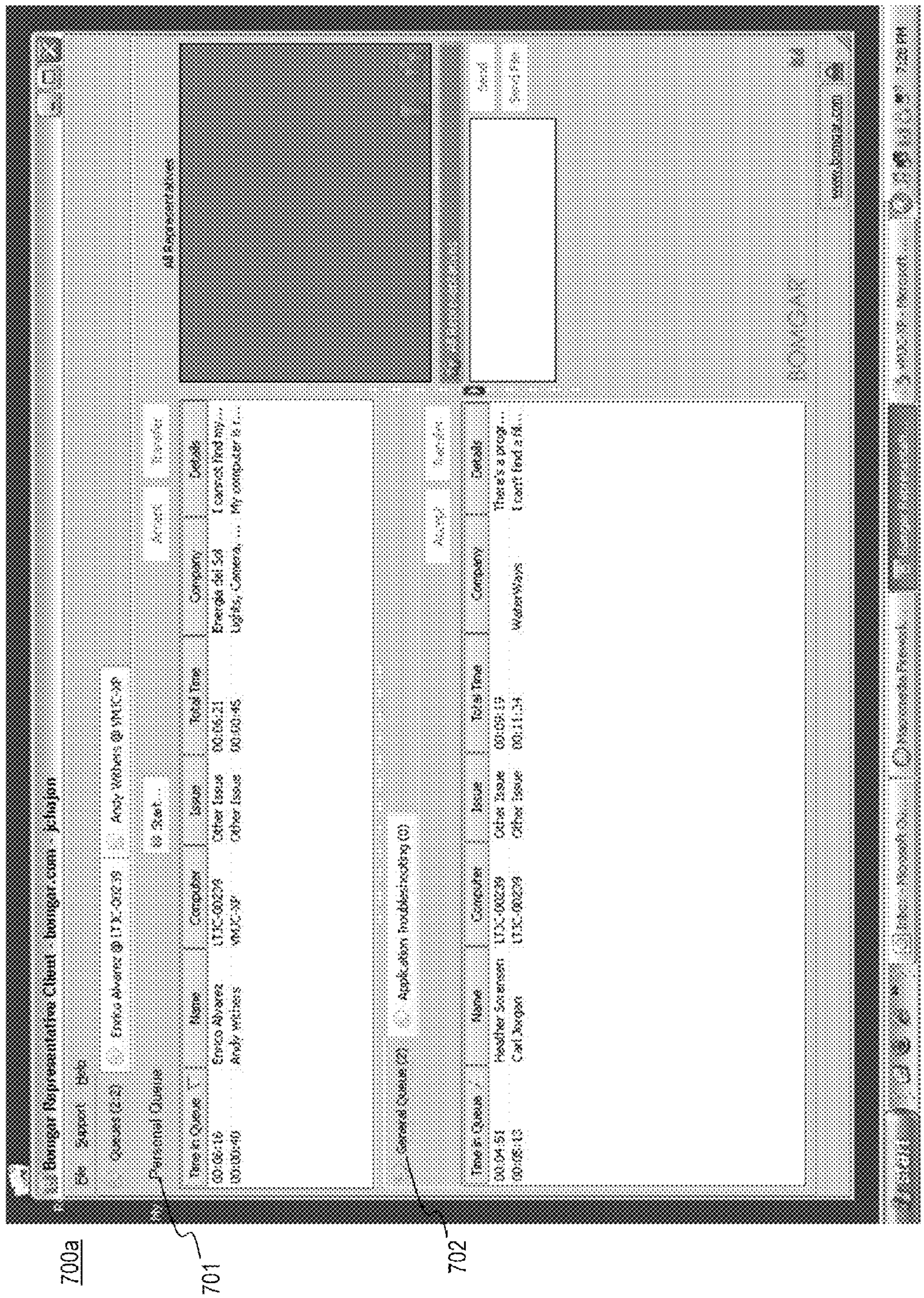
FIGS. 7A-7R are diagrams of a GUI for providing representative application functions, according to an exemplary embodiment.
Figure 7B:
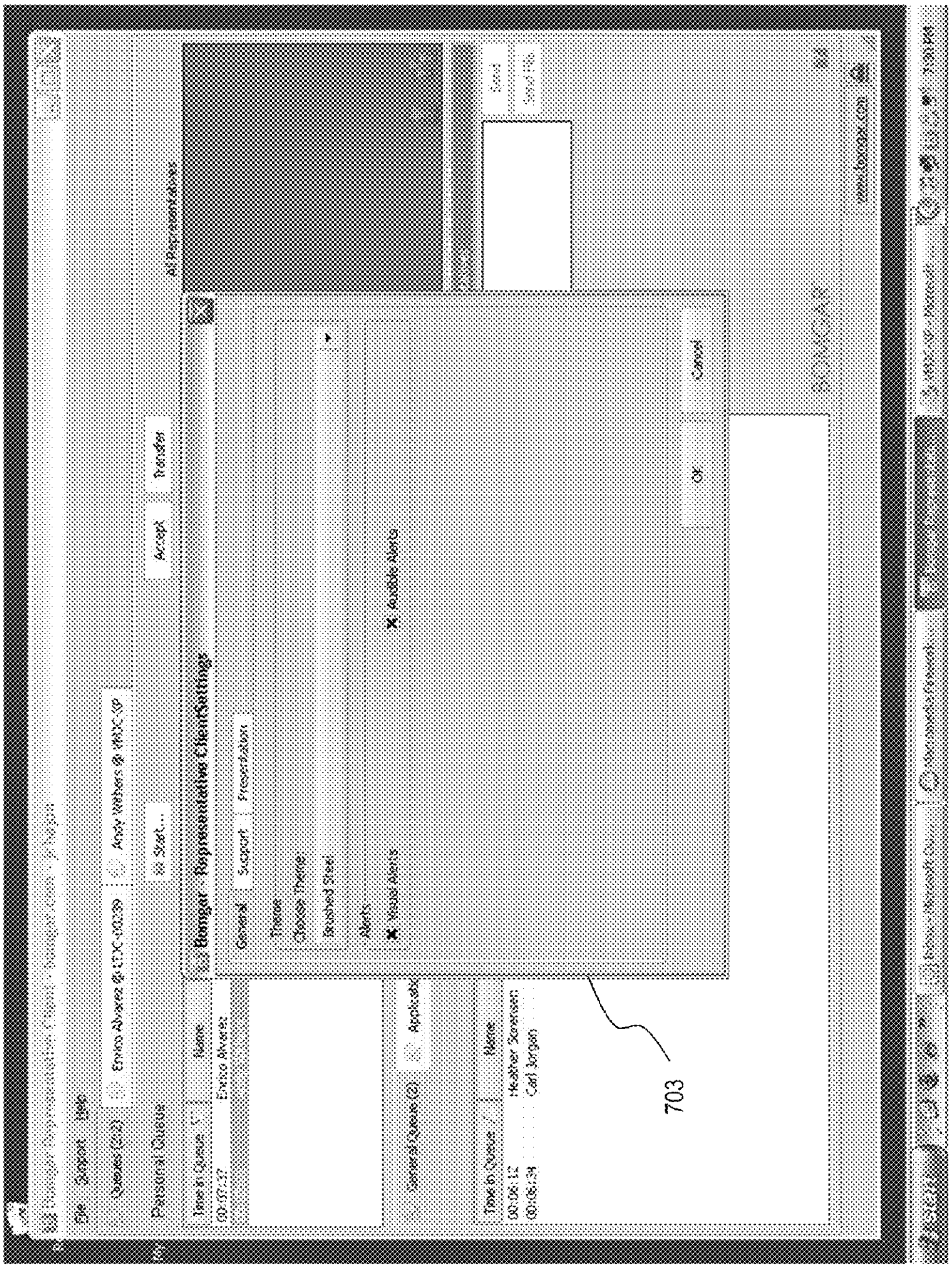
Figure 7C:
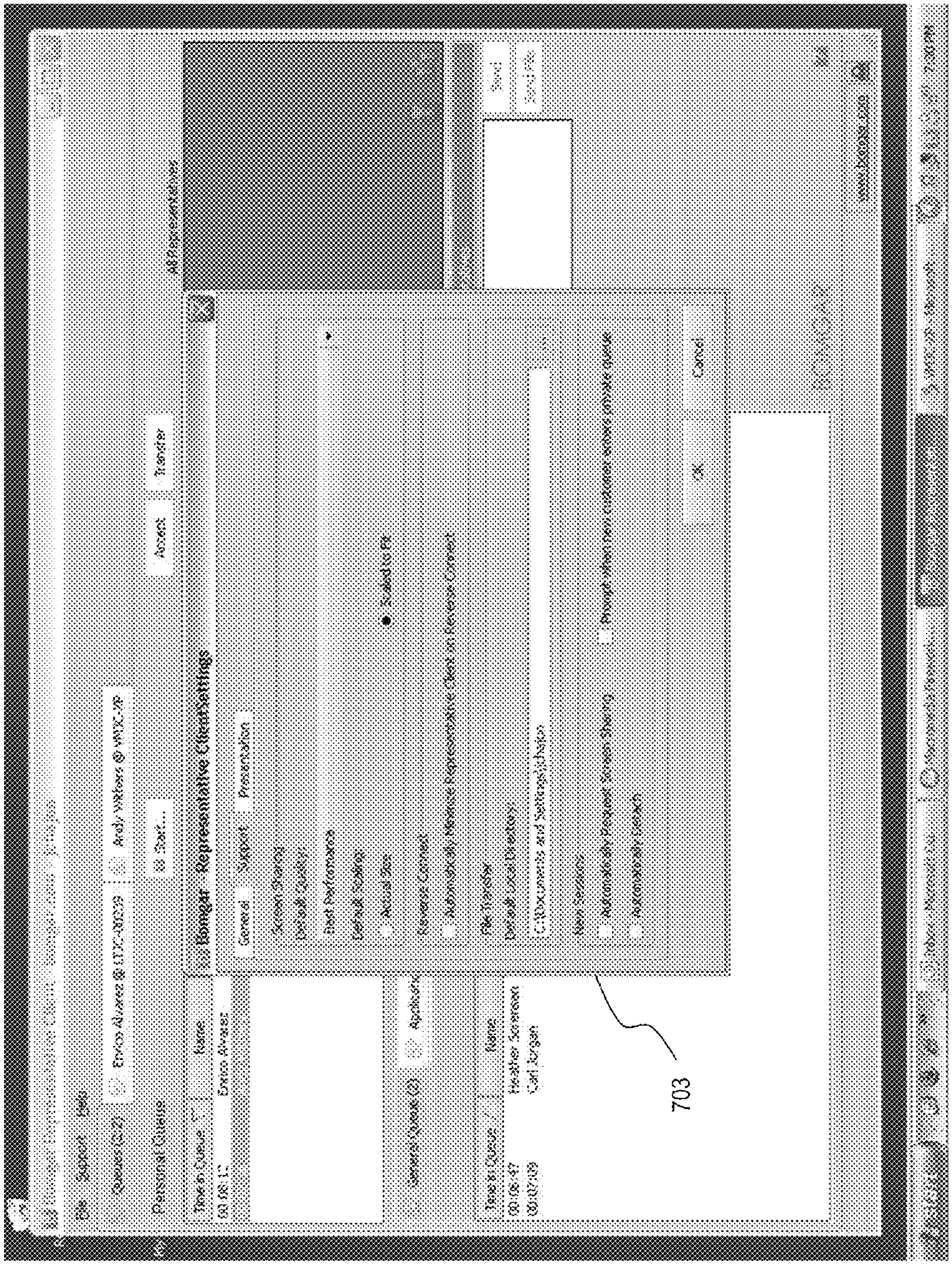
Figure 7D:
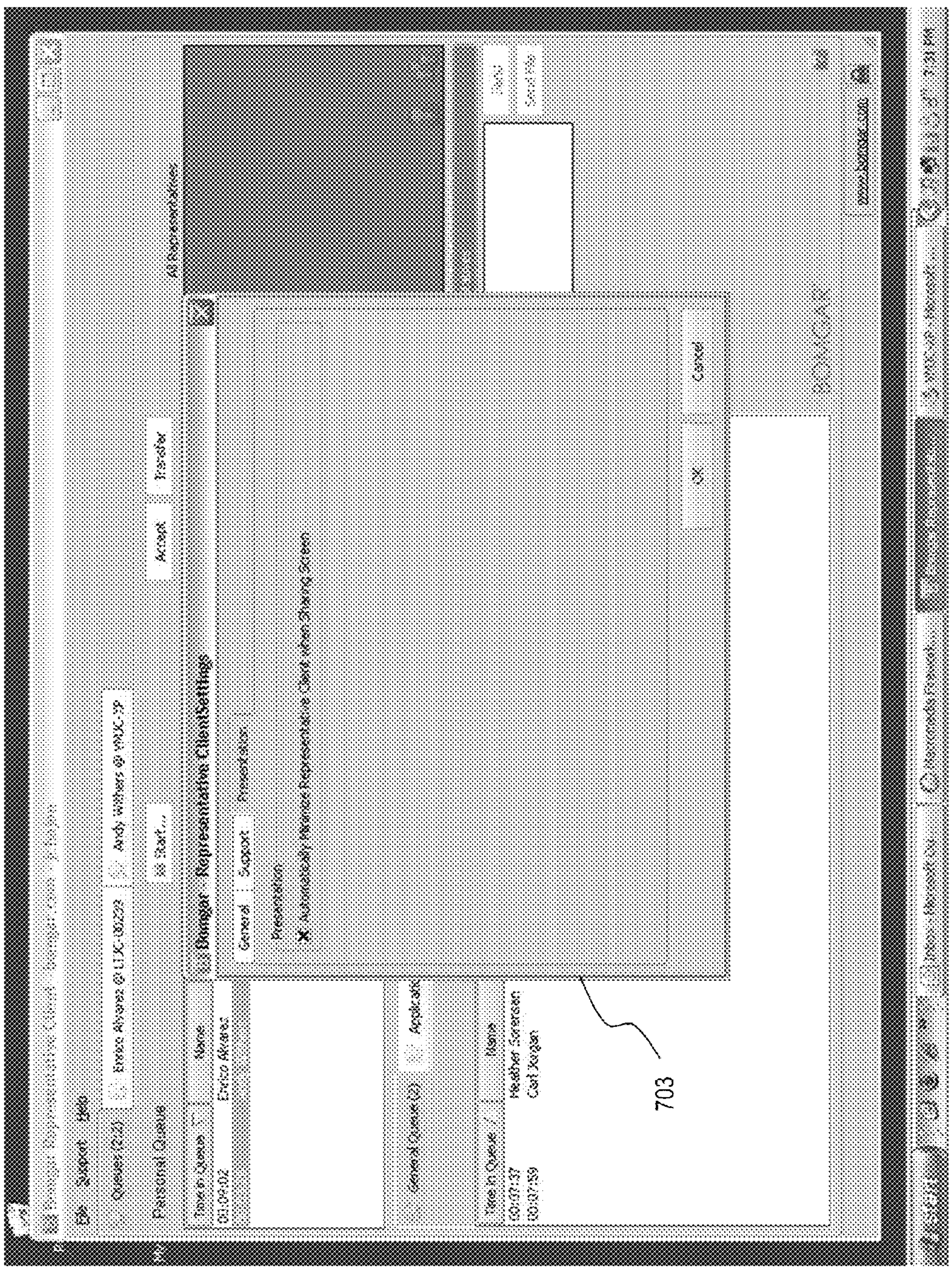
Figure 7E:
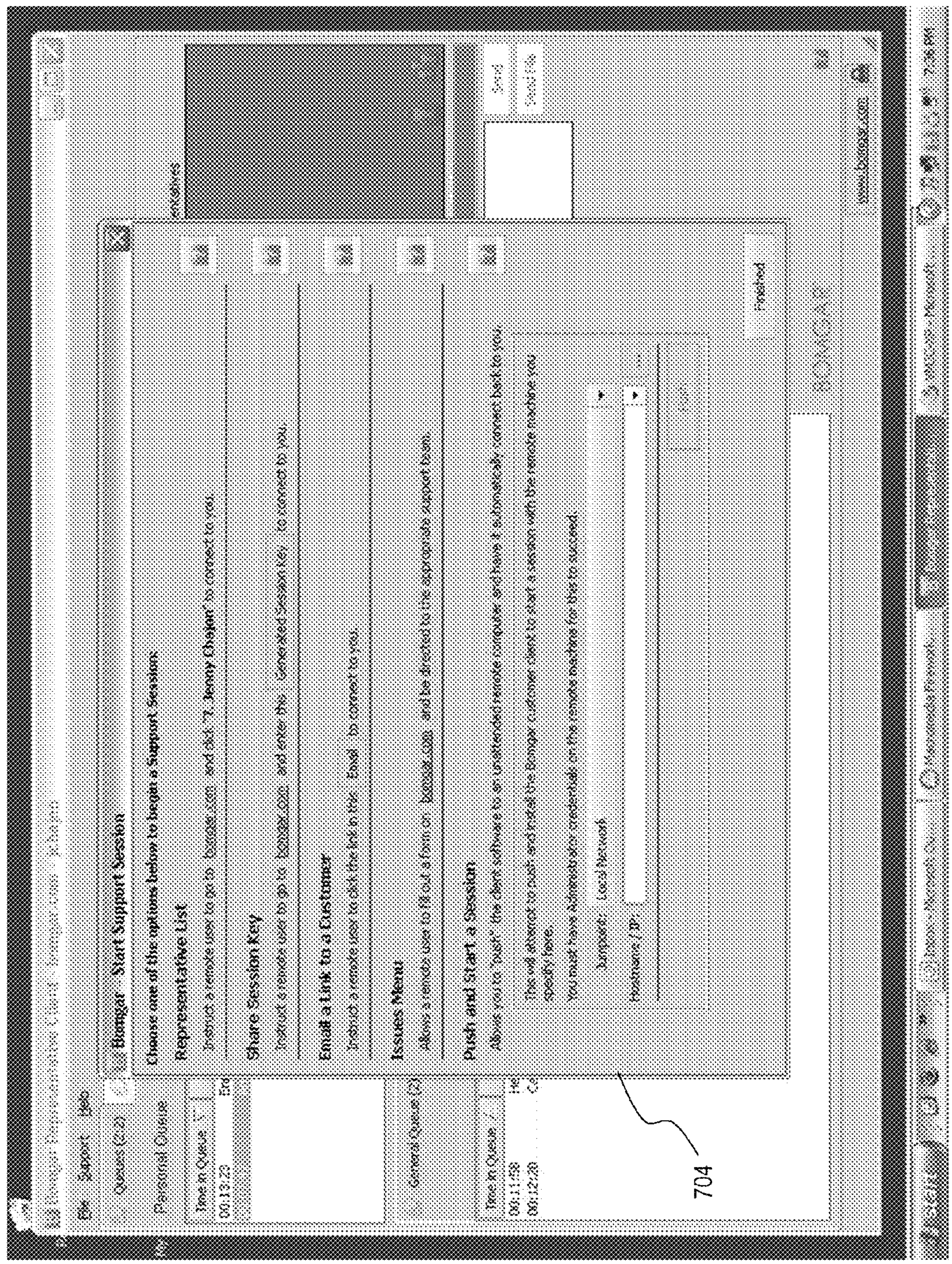
Figure 7F:
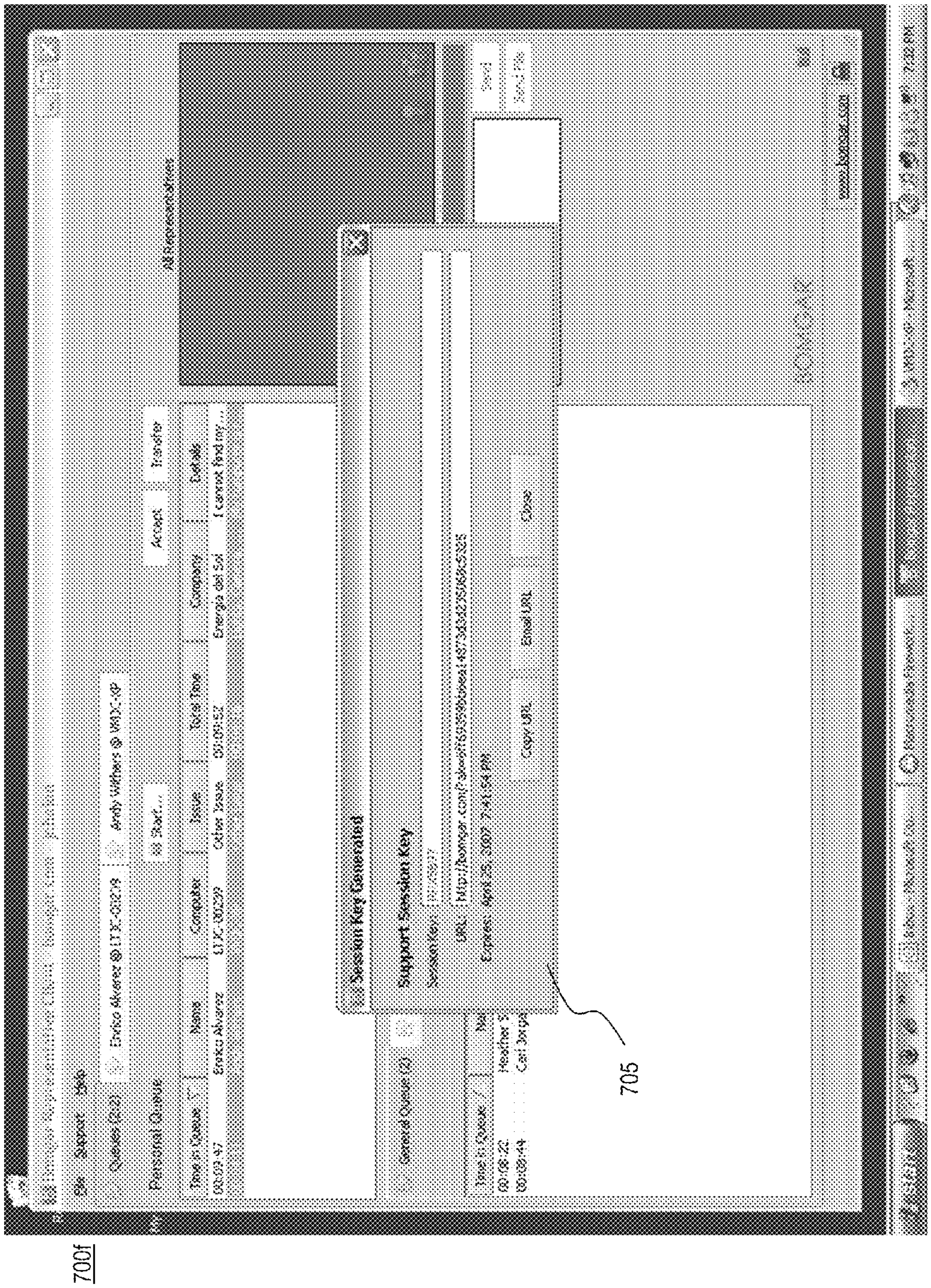
Figure 7G:
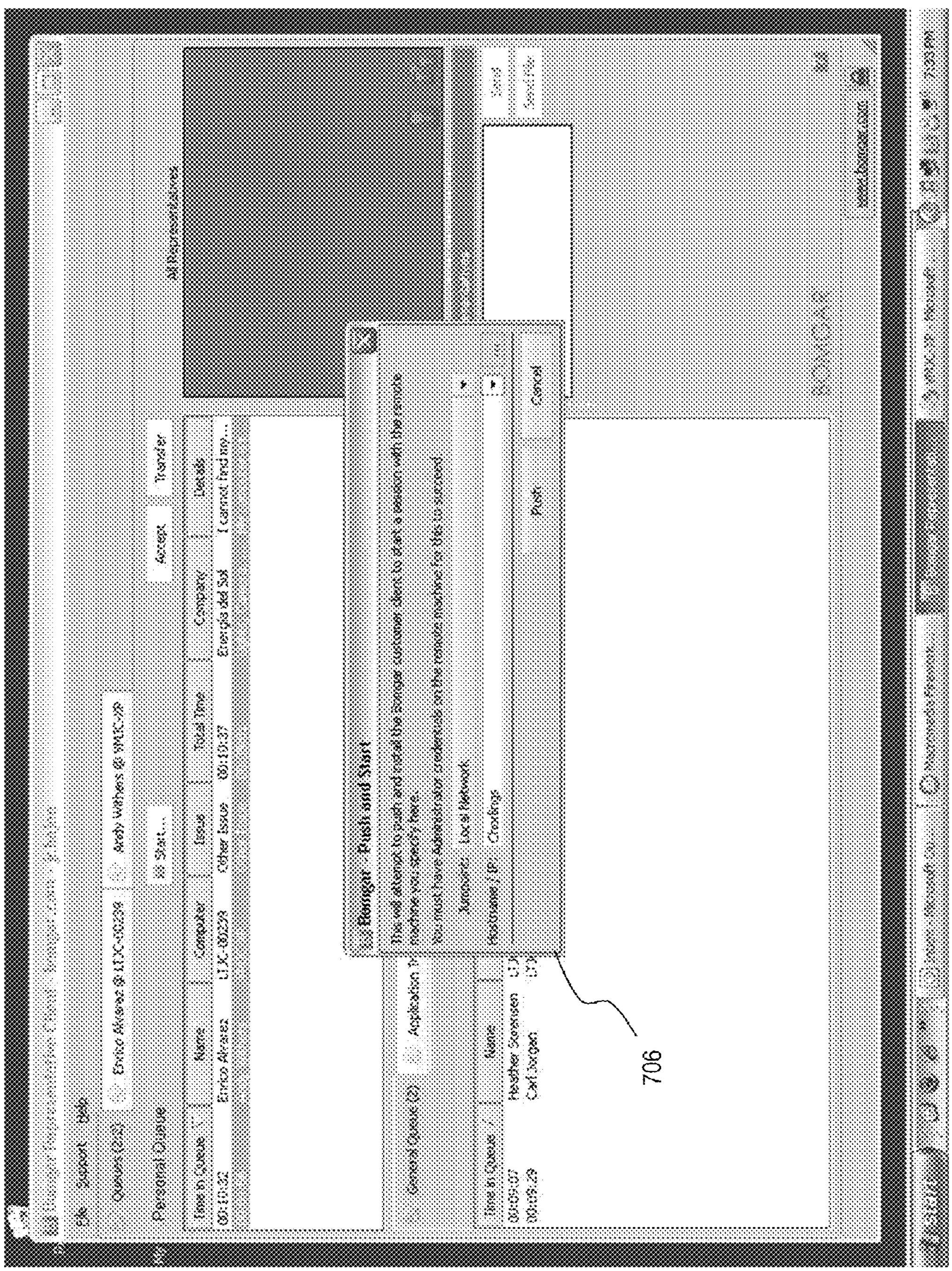
Figure 7H:
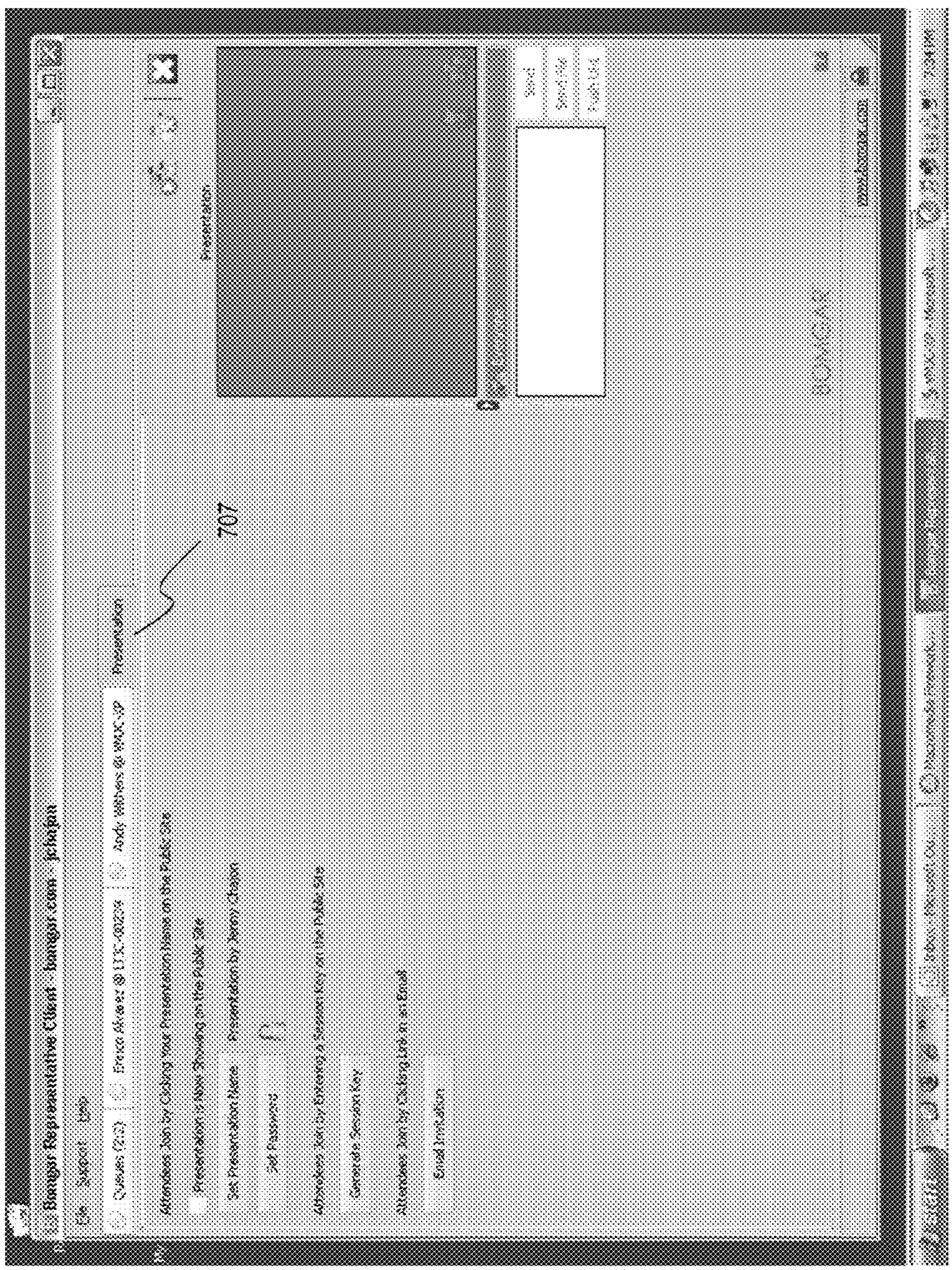
Figure 7I:
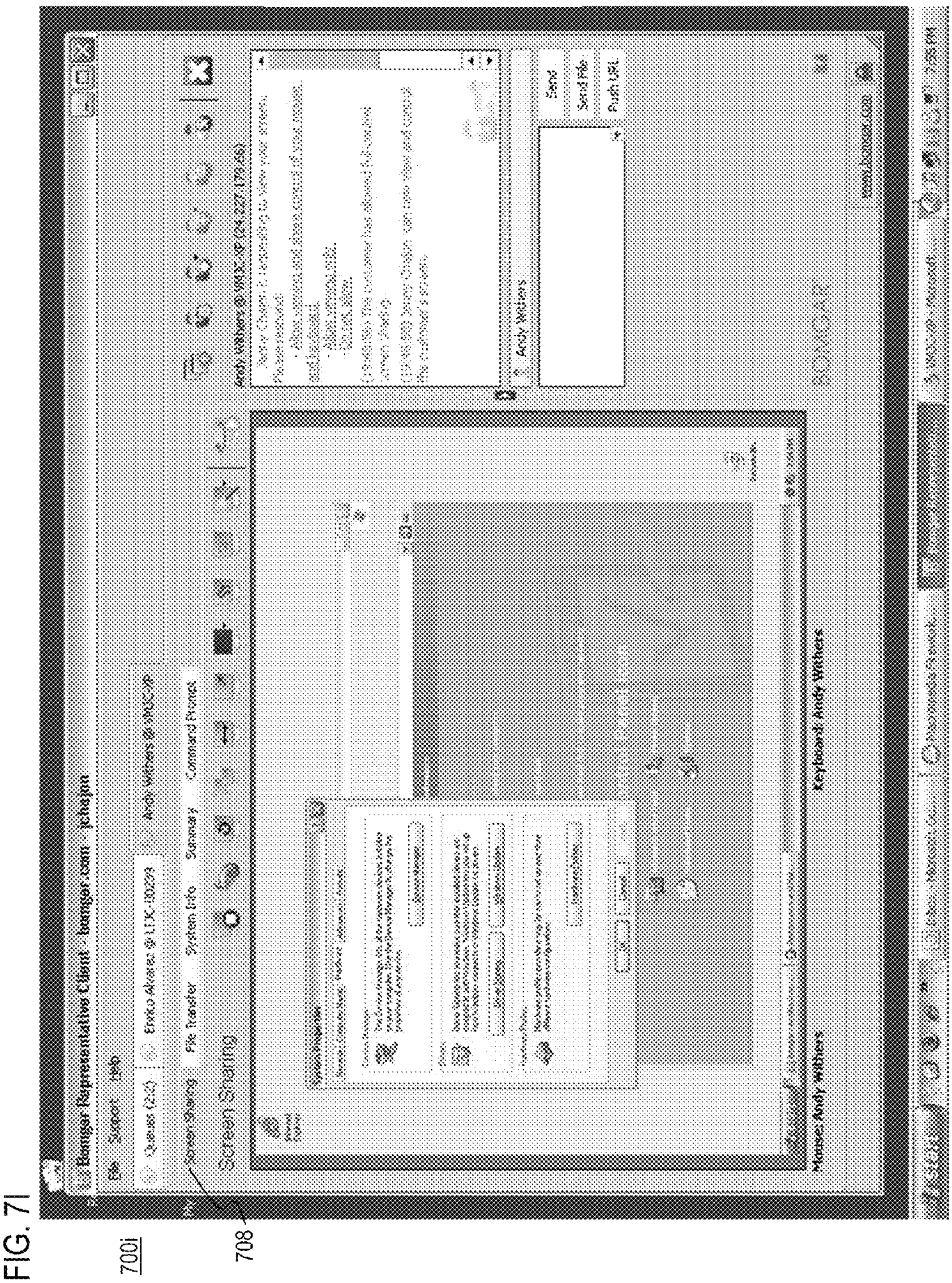
Figure 7J:
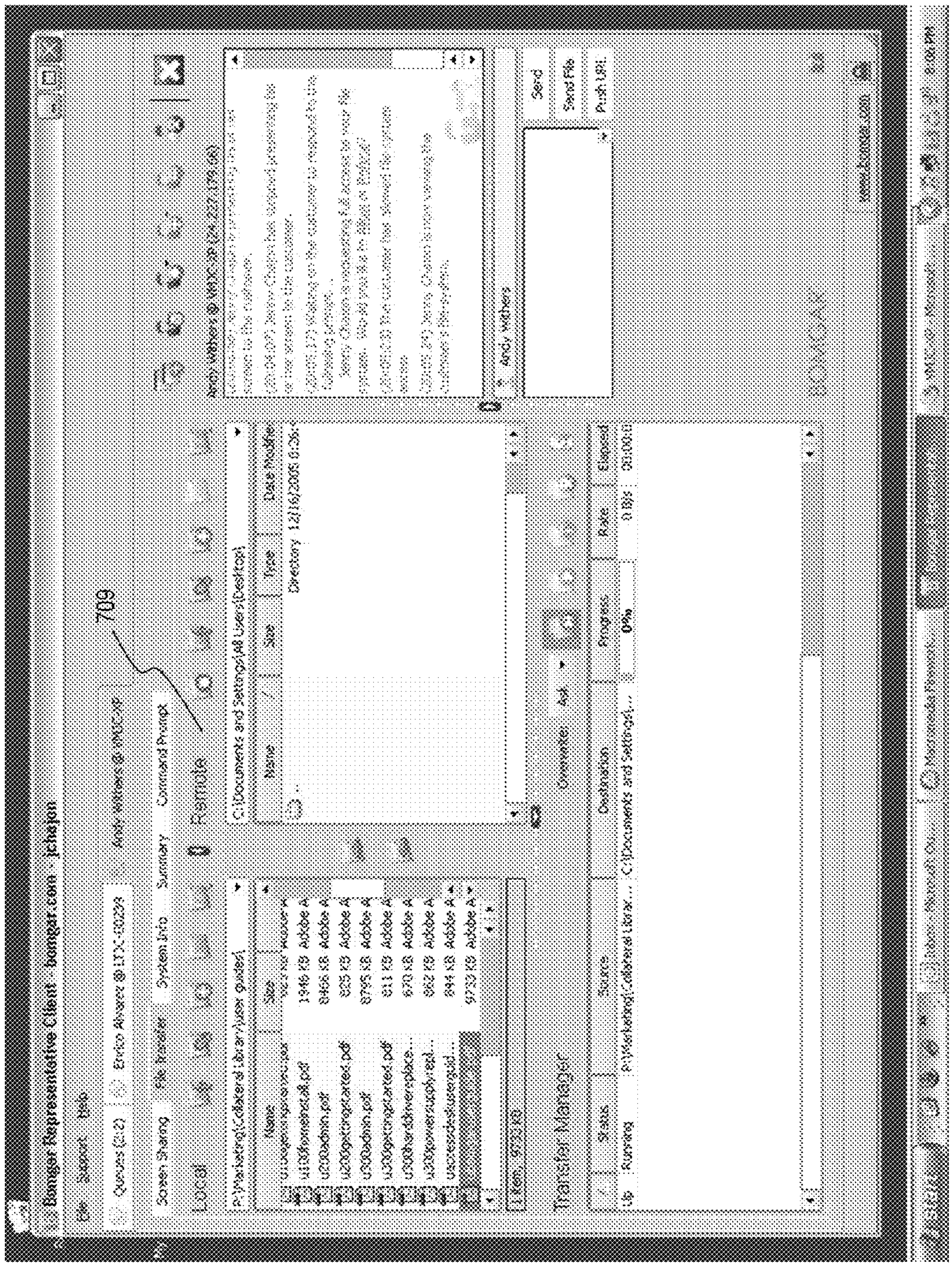
Figure 7K:
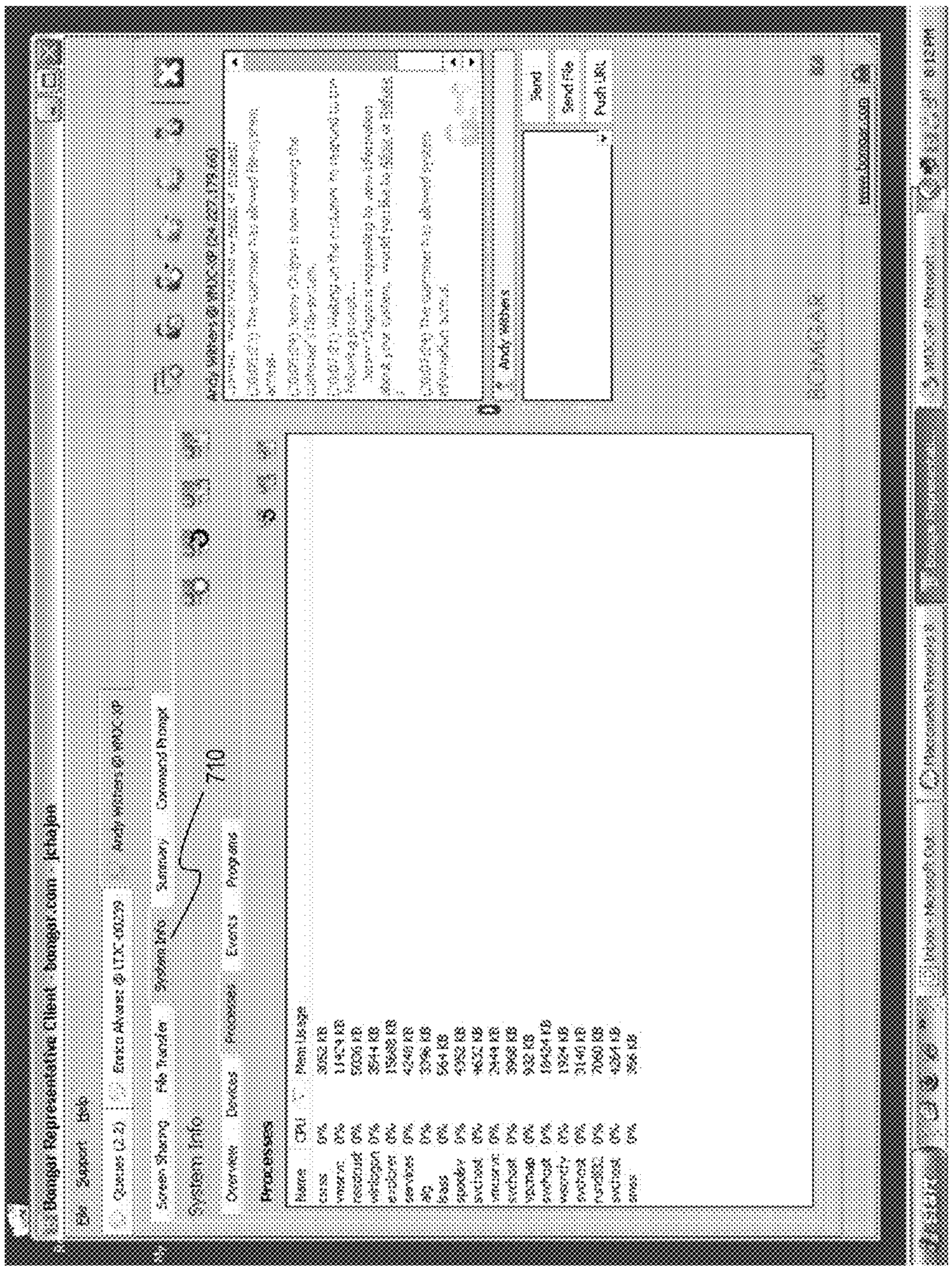
Figure 7L:
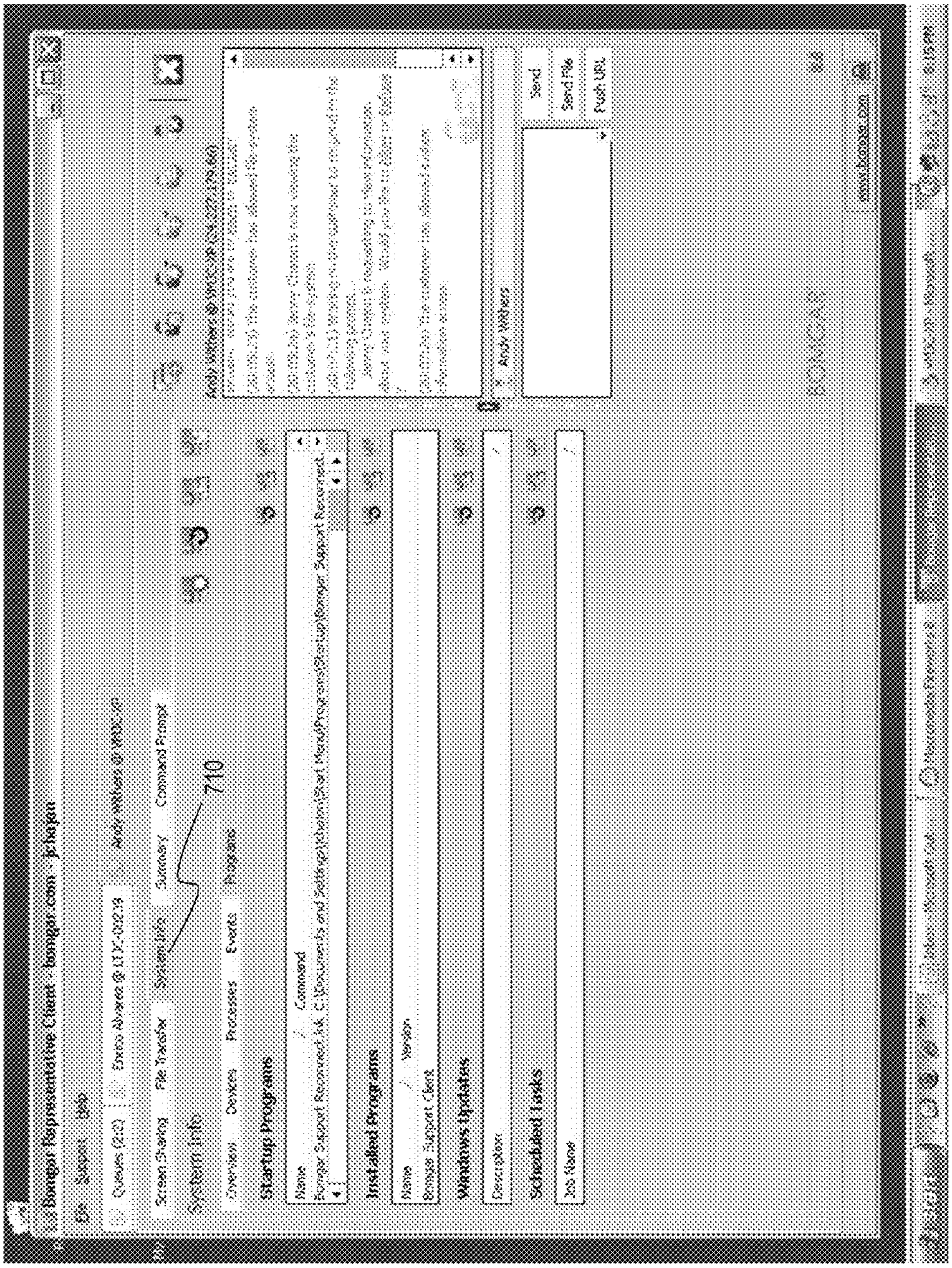
Figure 7M:
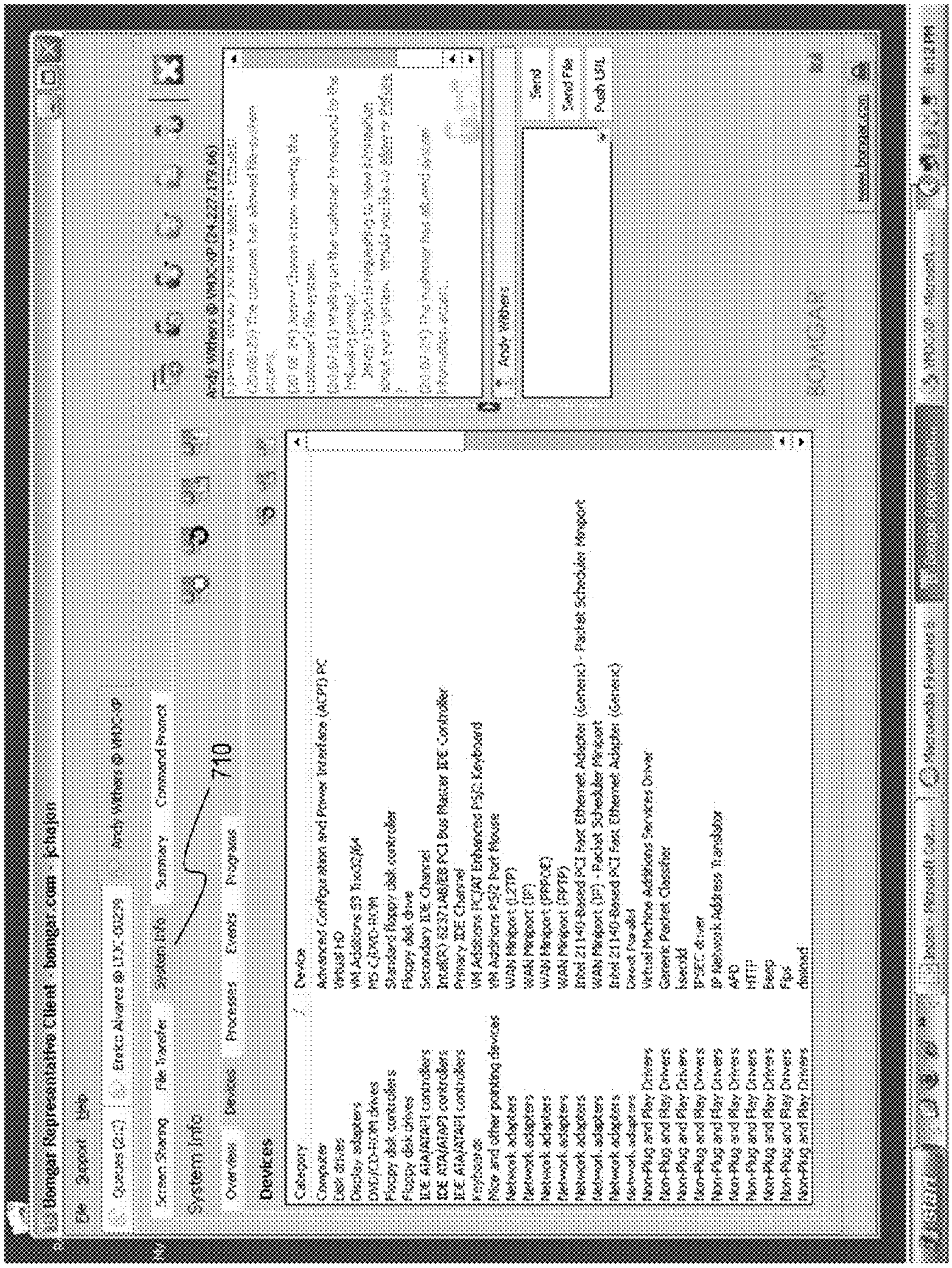
Figure 7N:
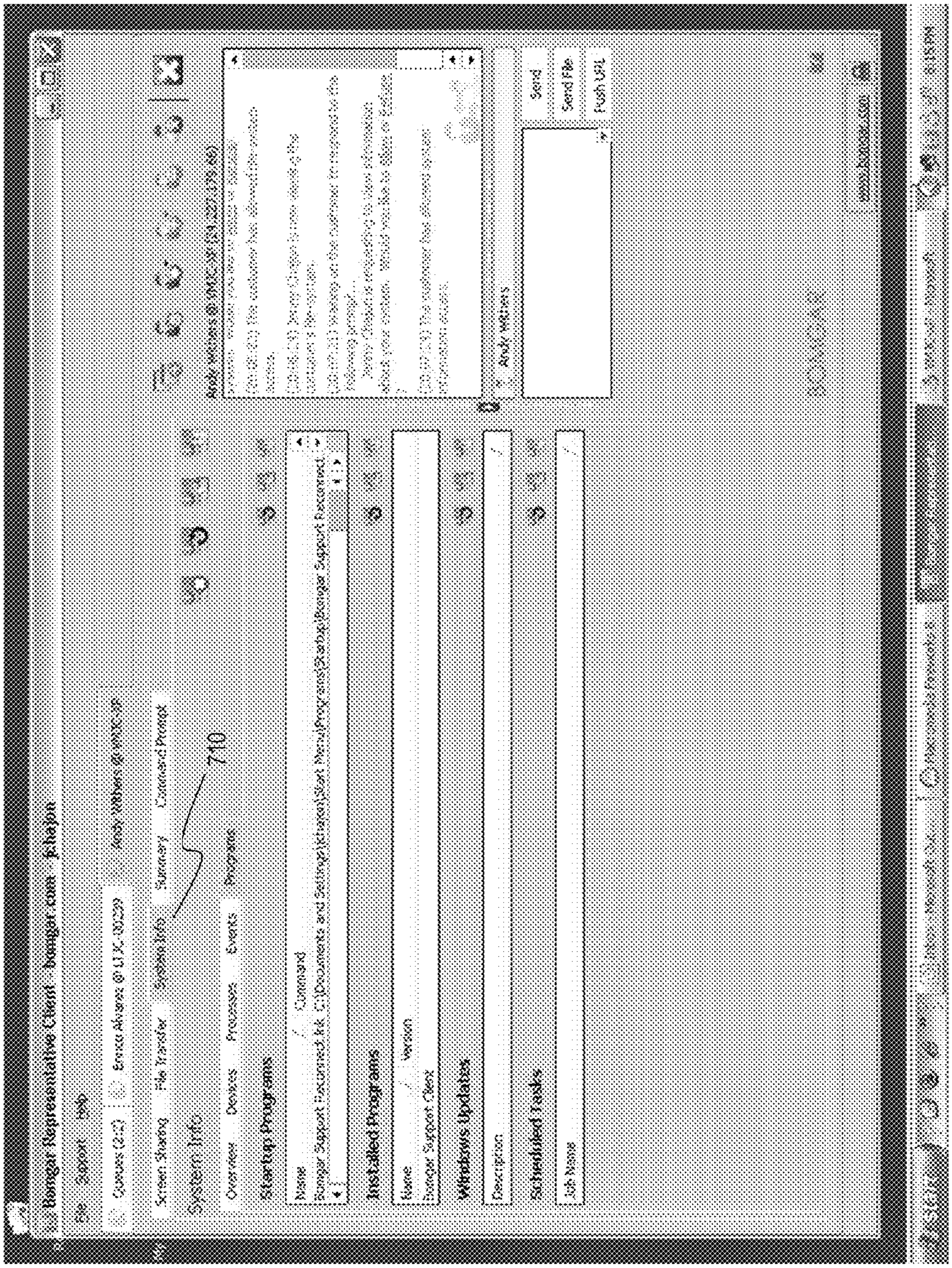
Figure 7O:
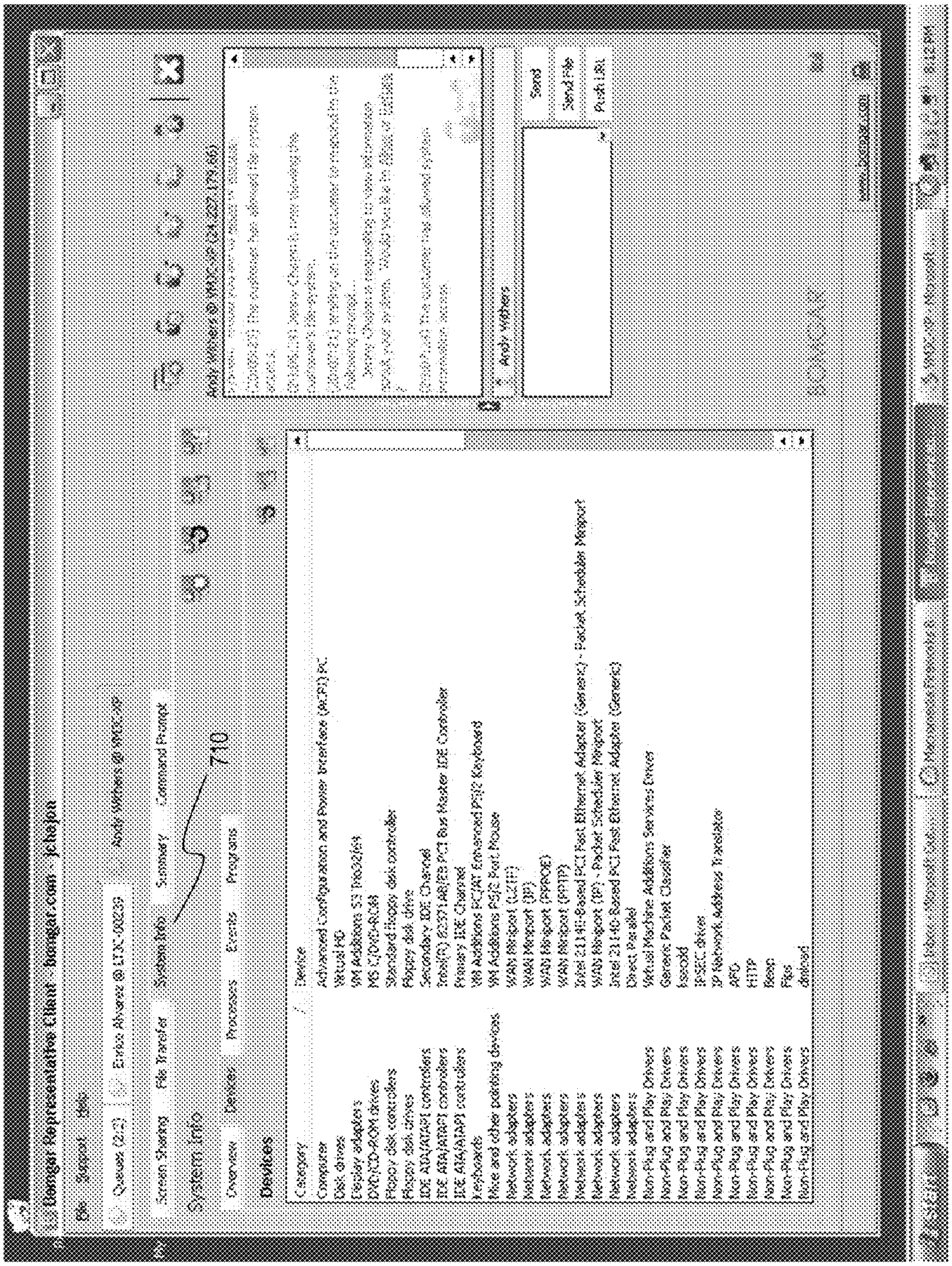
Figure 7P:
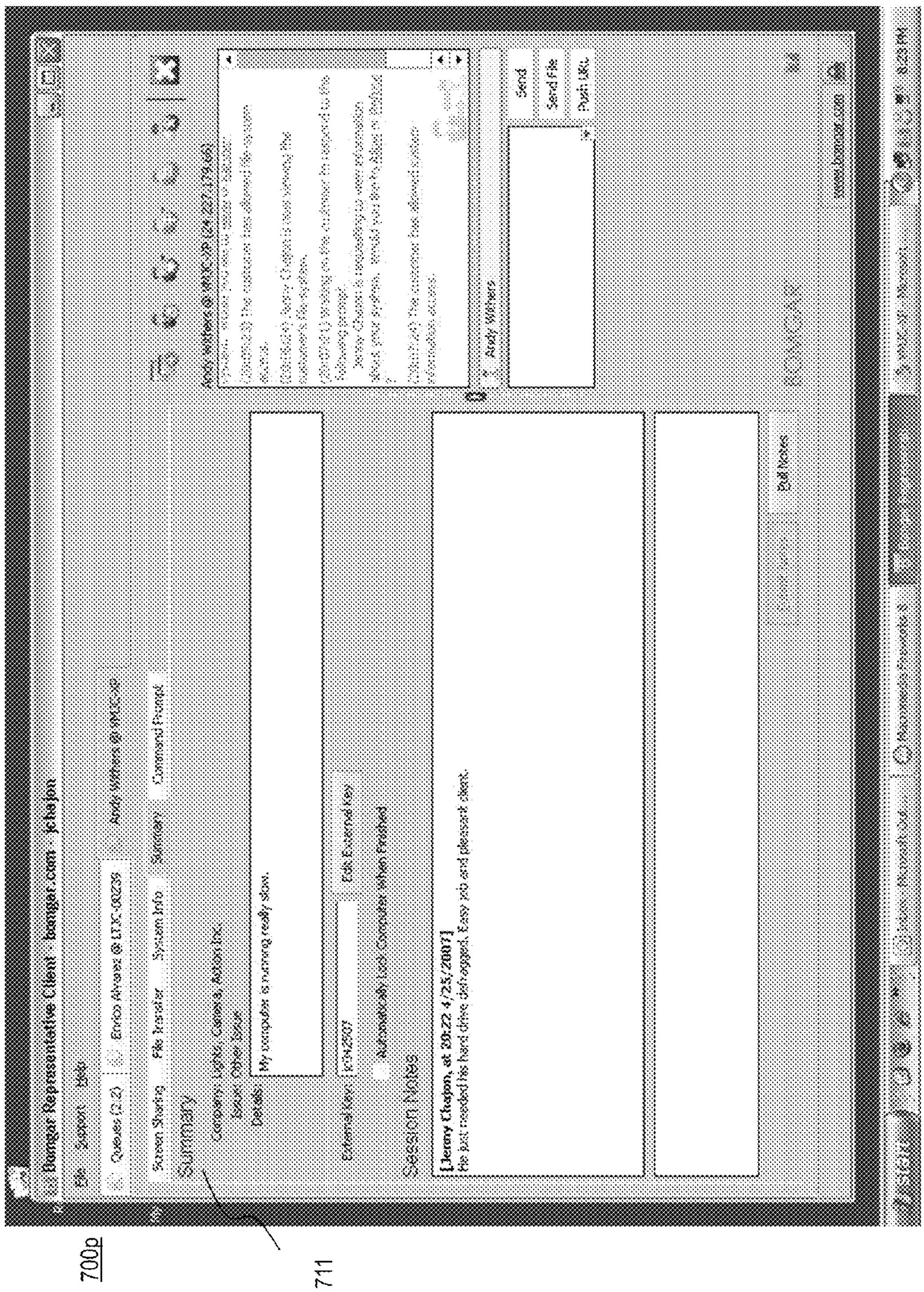
Figure 7Q:
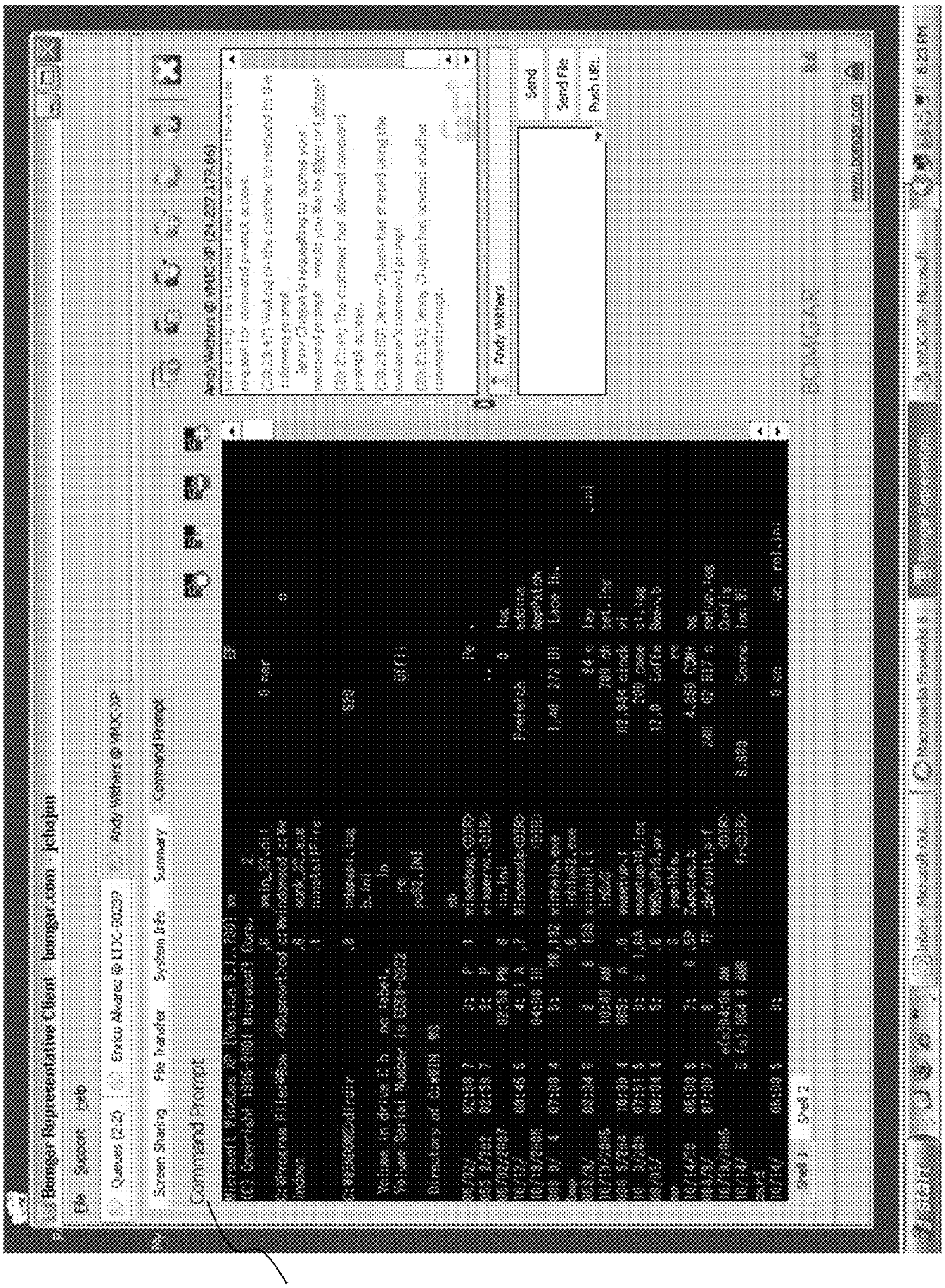
Figure 7R:
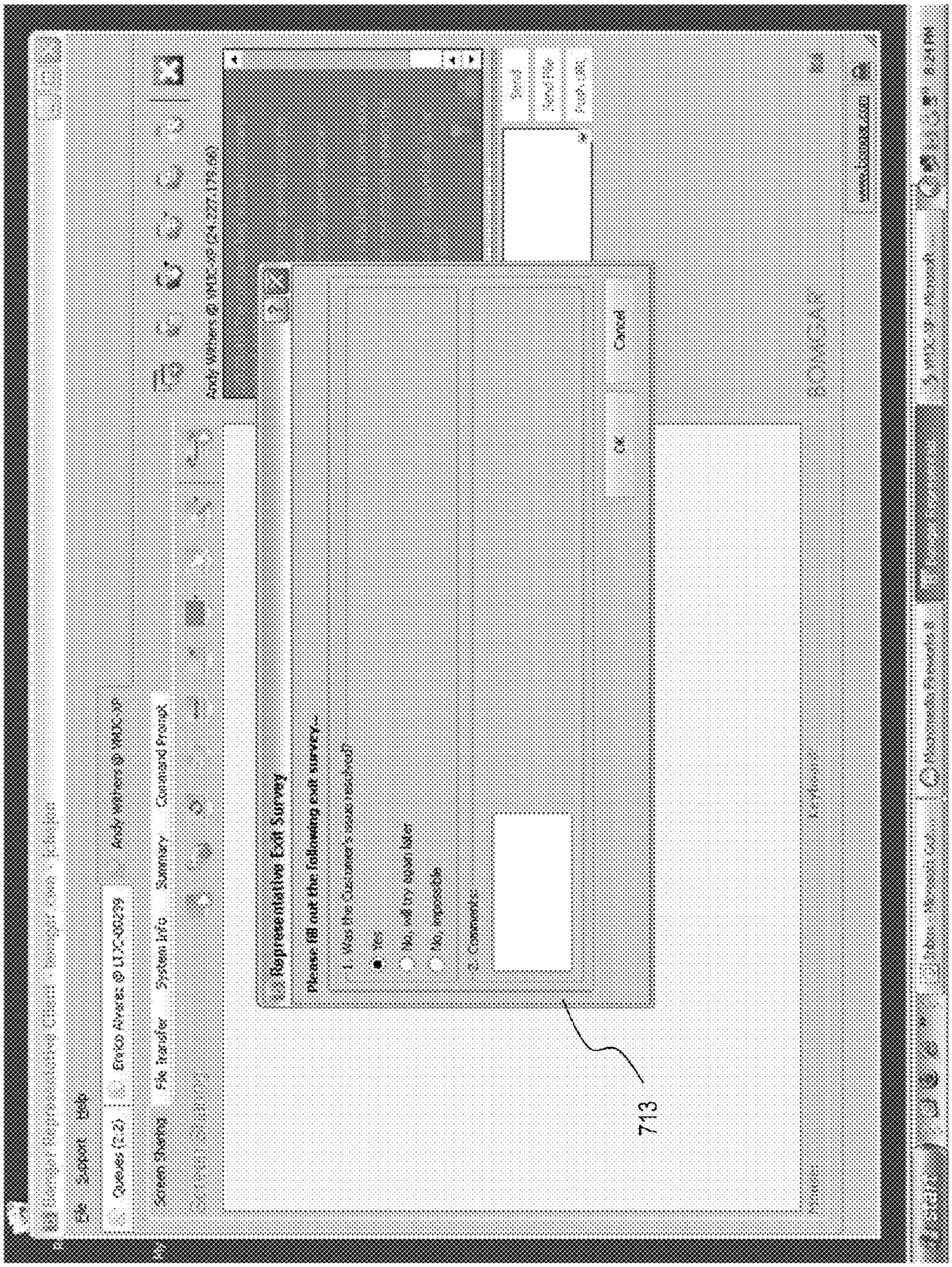

FIGS. 7A-7R are diagrams of a GUI for providing representative application functions, according to an exemplary embodiment. As shown in FIG. 7A, a representative interface screen 700*a* displays customers who are waiting for a support session. According to one embodiment, these customers are listed in either a private queue or a public/team queue. The private queue 701 provides a list of customers that the representative has in an open session or who are waiting for a support session with the representative specifically. The customers list can be displayed after the representative has pulled them from the public/team queue or when they enter a session key or selected the representative's display name. In addition to the customer's name, the representative can also view and sort session requests by the customer's company name, category of requested support, or problem description, or time in queue along with other relevant information.

The public/team queue 702 enumerates the customers who are waiting for a support session with all logged-in representatives. When a customer first enters the public site to initiate a session, the customer can enter such information as name, company name, category of requested support, and problem description. Based on the category the customer selects (i.e., MICROSOFT Outlook, Word, etc.), the customer is placed in a specific team queue. If the representative is in one or more support teams, the representative can view a tab for each of the teams as well as an "All Representatives" tab, where general sessions are listed (sessions not specifically destined for either a particular support team or representative).

The representative can also easily configure preferences using a settings screen 703, as shown in screens 700*b*-700*d* of FIGS. 7B-7D. For example, the representative can choose to have a visual or audible alert when a customer in another session sends a chat message and also when the representative enters a support session.

To start a session with a remote customer, the representative may choose a customer from the private queue or one of the team queues and either double-click on the customer's name or select the name and then click "Accept" as illustrated in FIG. 7A. This action creates a new tab for that customer and switches the interface view to that customer's session window. For a quick reference of the ways to start a session, the representative can click on the "Start" button to view an options menu 704 of screen 700*e* (FIG. 7E).

An alternate approach for starting a support session is through the use of one-time, randomly generated session keys. When the customer calls with a support request rather than filling out an online support request, the representative can generate a session key 705 using the representative client interface, as shown in screen 700*f* (FIG. 7F). The representative may then either direct the customer to the unique URL or ask the customer to enter this session key on the customer interface, which will automatically add that customer to the private queue and open a new session tab.

The "Push and Start" feature 706 of screen 700*g* (in FIG. 7G) enables a representative to push an executable file to an unattended, remote computer on the local area network. The representative must have administrative rights to that computer. If the representative is authorized to access a Jumpoint™ network, the representative can also browse that Jumpzone™ for the computer to which he or she wishes to push a remote support session.

The representative can share his or her screen with one or more remote attendees with the "Presentation" feature 707 of screen 700*h*, shown in FIG. 7H.

Before the remote screen sharing session begins, the representative has the option to chat with the remote customer. This instant communication capability can be made available throughout the session. The representative can select from a number of pre-determined messages, which are configurable from the administrative interface 608 of FIGS. 6M-6N as discussed previously. The chat window records not only the messages and the time they were sent, but also serves as a running log of all activities that occur throughout the session, including files transferred and permissions granted. In addition to chatting with the remote customer, the representative can also chat with other support representatives.

From the customer's session window, the representative may click on "Screen Sharing" and then "Request Control" as seen in screen 700*i* of FIG. 7I. For the greatest control capability, the representative may select "Full Control of Customer Screen." Once the remote customer has granted permission, the customer's screen will appear in the representative's window, enabling the representative to control the remote desktop just as if the representative were physically present. Full mouse, keyboard, application, and program control are also available with this option.

If the representative selects "View Only of Customer Screen," the customer can grant the representative the ability to view the customer's remote desktop, but not manipulate the mouse or keyboard. The representative can toggle between these options at any time during the session. If the representative wants to increase privilege level (i.e., switch from "View Only to Full Control"), the remote customer is to grant such permission. While in a remote control session, the representative can use special keys to quickly navigate to a number of key diagnostic and troubleshooting areas with a single click. The representative can also switch to presentation mode during a support session to display his or her screen to the remote customer.

If the representative should decide at any point during the session that another logged-in representative could better handle one of his/her sessions, the representative can click on the "Share" or the "Transfer" button. This action opens a dropdown list of support teams and representatives. When the representative shares a session, the representative maintains control over the session but can receive input from one or more other representatives. When the representative transfers a session, control is passed to the other representative, and the representative can either continue viewing the session or hand over control entirely. The target representative is then provided with the option to either accept or reject the session before the transfer is complete.

During a support session, the representative can transfer files and directories both to and from the remote customer's computer using screen 700*j* of FIG. 7J. The remote customer can be prompted to accept or decline the action before the representative can either send/receives files to the customer system 105. It is noted that the representative does not have to have full control of the customer's computer in order to transfer files.

The "System Info" tab 710 seen in screens 700*k*-700*o* of FIGS. 7K-7O gives the representative a complete snapshot of the remote computer's system information to speed time to diagnosis and issue resolution. System information includes the remote system's device manager; running processes; security, system, and application events; startup programs, installed programs, and Windows updates; scheduled tasks; and network information.

The "Summary" tab 711 of screen 700*p* (FIG. 7P) gives an overview of the customer's issue as entered on the support request menu. The representative can also add notes to be included in the session report or viewed by another representative should the session be shared or transferred. If the XML API interface is enabled, the representative can also designate an external key for use in the API reports.

The representative can open a virtual command line (also known as remote command shell) interface to the customer's computer via the "Command Prompt" tab 712 as seen in screen 700*q*, illustrated in FIG. 7Q. The representative can then type locally but have the commands executed on the remote computer. The representative can work from multiple shells or save a copy of the shell.

The software (i.e., downloaded application 121) also enables the representative to host multiple support sessions at the same time. For each session that the representative initiates, a new tab will be created at the top of the representative interface. If one customer sends a chat message or initiates a file transfer while the representative is in another session window, that customer's tab will flash and a notification will sound to alert the representative that another session needs attention.

If the representative wants to stop remote control of the remote computer but continue working with the remote customer, the representative can either switch to view-only or completely shut down screen sharing to continue with only chat. To end the session entirely, the representative may click the "X" in the upper right-hand corner of the specific session the representative wishes to discontinue. Ending the session also uninstalls the customer client software from the remote computer.

At the end of the session, the representative can fill out a short survey 713, as displayed in screen 700*r* (FIG. 7R). The questions are fully customizable, as previously shown in the "Exit Surveys" tab 605 of FIGS. 6F-6G, and the survey information is available for later view from the reporting feature of the administrative interface. If one or more of the questions is required, the representative will not be allowed to close the session until he or she has answered those questions.

FIGS. 8A-8D are diagrams of a GUI for providing customer application functions, according to an exemplary embodiment. To start a support session with the representative, the remote customer downloads and runs the remote application 123 on the representative system 103. A support portal screen 800*a* is consequently provided to establish the support session. According to one embodiment, this provides the representative system 103 with an encrypted connection to the appliance 101 and, through the appliance 101, to the representative.

Figure 8A:
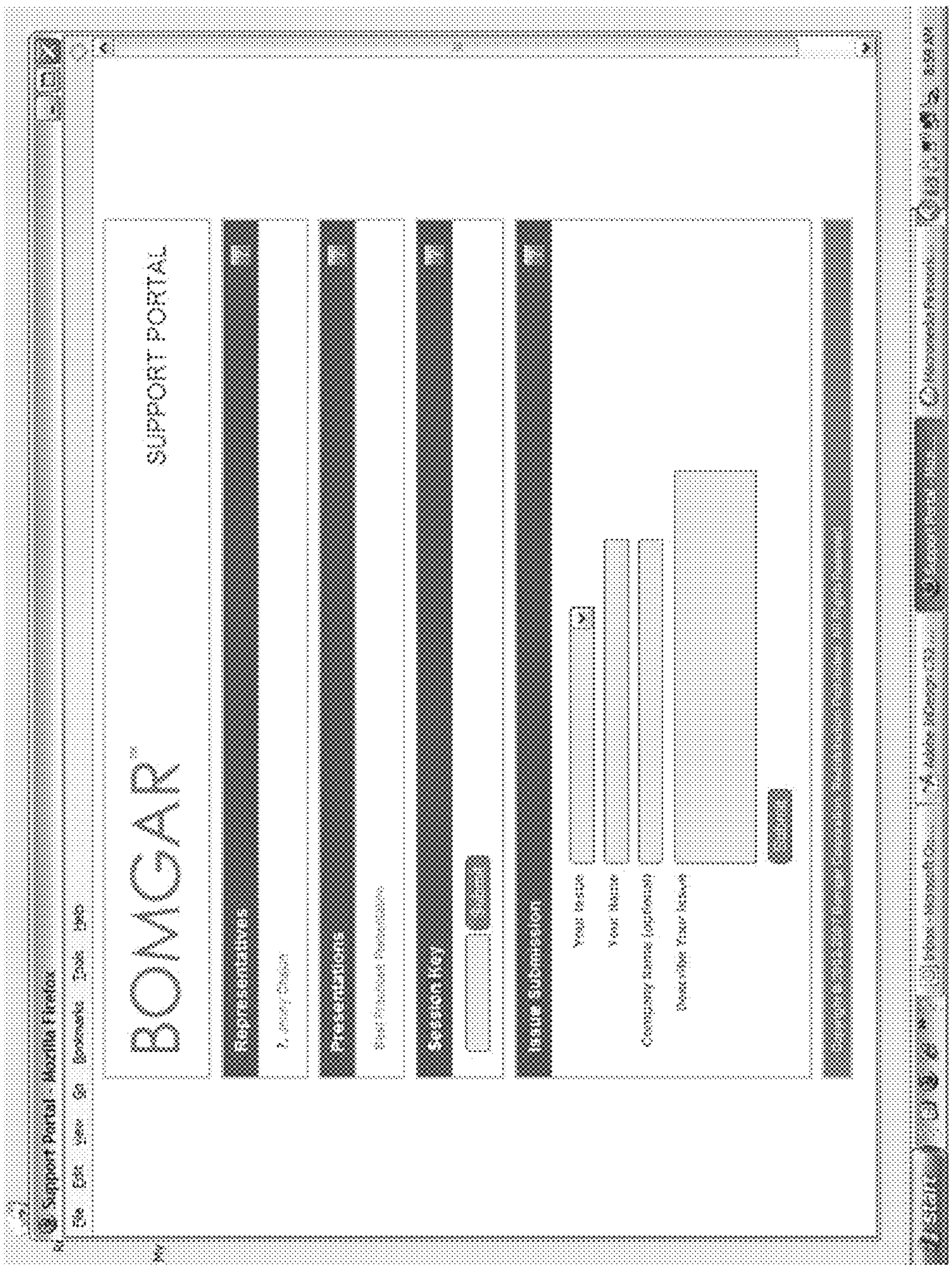
FIGS. 8A-8D are diagrams of a GUI for providing customer application functions, according to an exemplary embodiment.
Figure 8B:
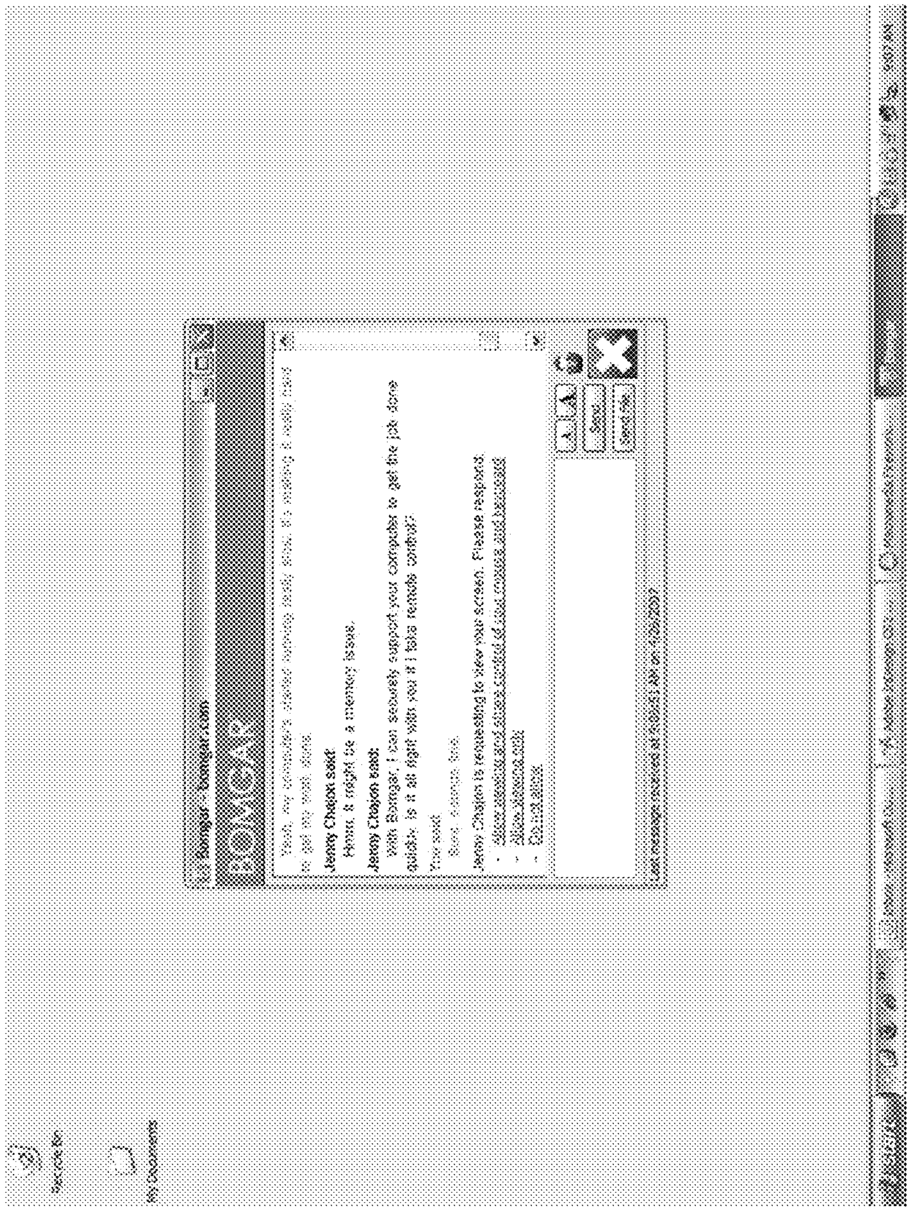

From the customer side, the public site 800*a* is the appliance's home page where customers will go to request a support session. On this page, the customer can input his or her name, company name, category of support, and problem description (if using the form method for initiating a support session). This information will place the customer into the proper support team queue and give the representative an advance idea of how to help him or her. As an alternative, the customer may directly select a representative from a list of representatives by clicking on the particular representative's name to initiate a support session. Furthermore, the customer may contact the representative indicating a need for a support session and the representative may issue the customer a uniquely generated, one time session key which the customer has to enter to initiate a support session with the representative. The customer can also select a presentation to join. This is illustrated in FIG. 8A.

During the session, the customer can, for example, communicate by sending chat messages. The customer can then request the transfer of files to the representative system 103 through the customer interfaces screen 800*b* illustrated in FIG. 8B. A "Stop Session" button provides for a capability to automatically suspend screen sharing and entirely close the session if the customer wishes. The customer can also end the session by closing the window of the screen 800*c*.

Figure 8C:
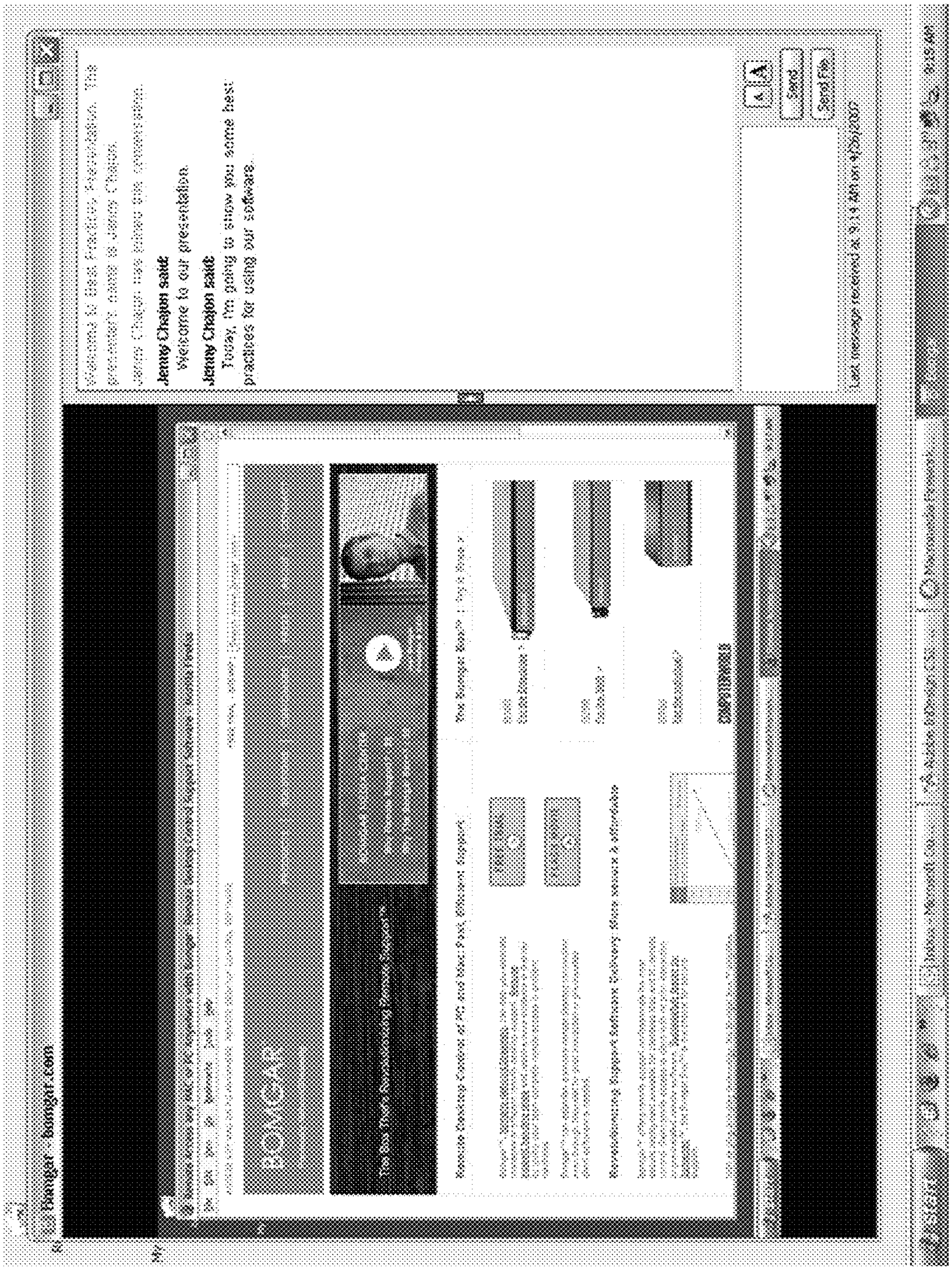

After the session is complete, the remote customer can take an exit survey, which obtains feedback from the customer on the support experience. By way of the example, the customer is prompted to enter a rating of the service provided by to the representative and to write comments about the customer's experience in the session as depicted in screen 800*c* of (FIG. 8C). This survey information, in another embodiment, can be available for later viewing through the reporting feature of an administrative interface. The customer can also receive notification relating to the termination of the support session; e.g., whether that the representative can no longer view the customer's screen and/or that the support software has been completely uninstalled from the customer system 105.

Figure 8D:
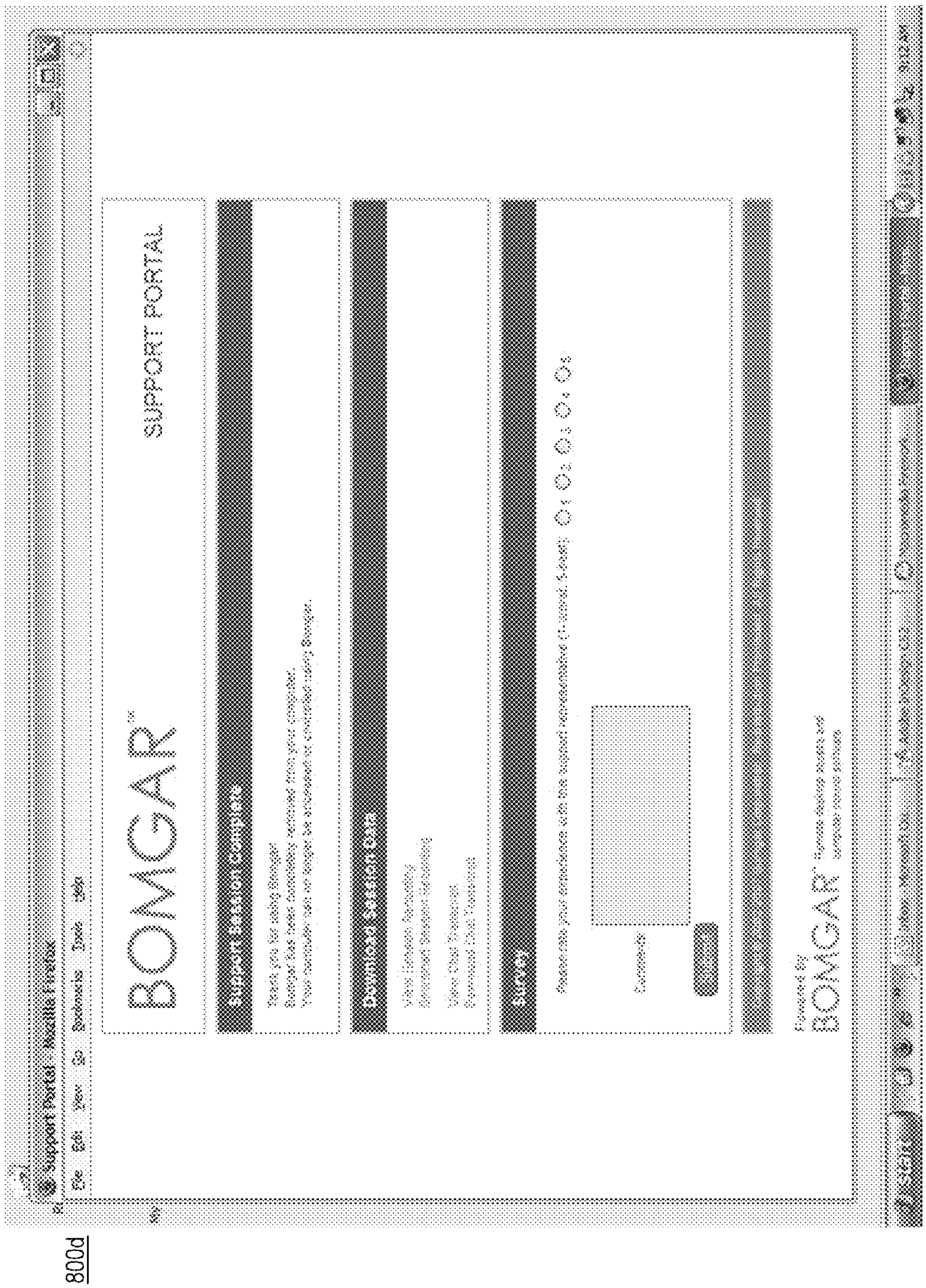

As seen in screen 800*d* of FIG. 8D, the customer can also view the representative's screen. The customer can chat with the presenter and with other attendees throughout the presentation. By clicking on the arrow on the left of the chat bar, the customer can collapse the chat bar to gain a larger viewing screen. If the customer receives a chat while the chat bar is collapsed, the side arrow will flash orange.

The processes described herein for providing secure, on-demand remote support may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
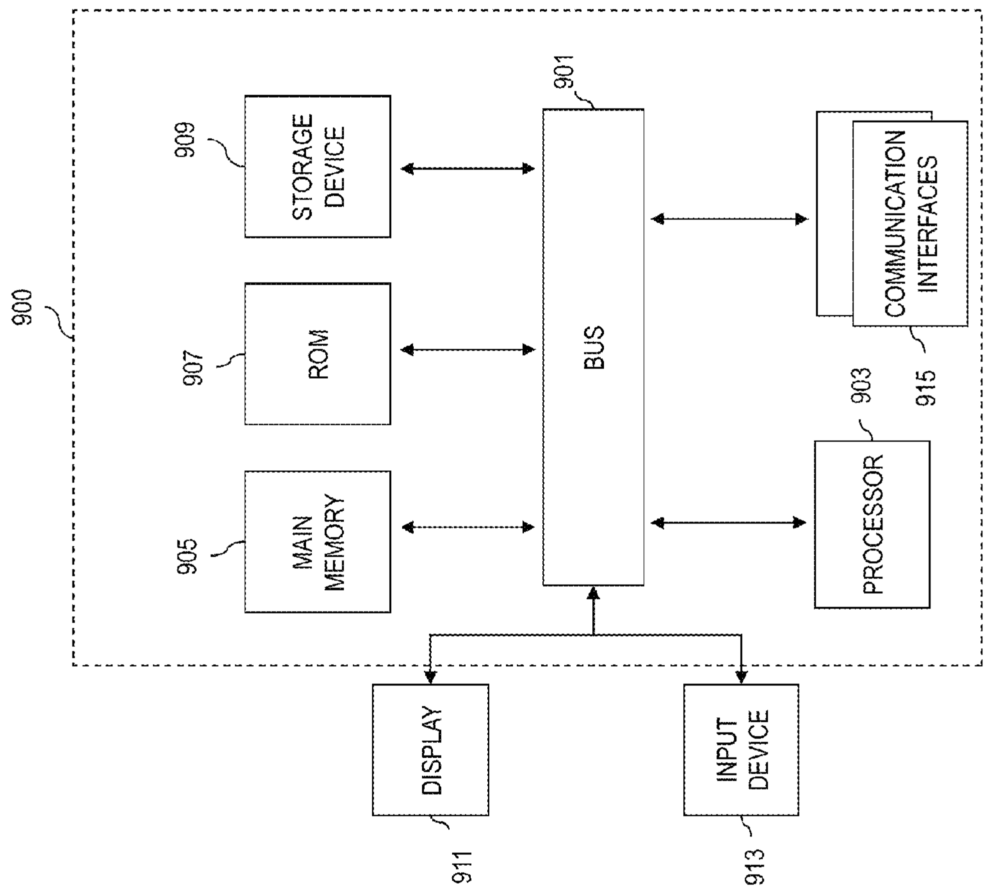
FIG. 9 is a diagram of a computer system that can be used to implement various embodiments of the invention.

FIG. 9 illustrates a computer system 900 upon which an embodiment according to various exemplary embodiments can be implemented. For example, the processes described herein can be implemented using the computer system 900. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to one embodiment contemplated herein, the processes described are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the certain embodiments. Thus, the exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements, which fall within the purview of the appended claims.

The following patent application is incorporated herein by reference in its entirety: co-pending U.S. patent application (Ser. No. 11/748,871) filed May 15, 2007, entitled "NETWORK APPARATUS FOR SECURE REMOTE ACCESS AND CONTROL."

What is claimed is:

1. A method comprising:

communicating, by a network appliance that is a standalone hardware device or devices that include a processor, with a representative system;

communicating, by the network appliance, with a customer system configured to execute a customer application for enabling a remote support service, and wherein the network appliance is managed through a graphical user interface (GUI) rendered at the customer system and/or the representative system; and permitting, via the network appliance, control and access to the customer system by the representative system or to the representative system by the customer system for providing the remote support service, wherein the representative system executes a representative application, the customer application and the representative application being provided by the network appliance, based on selection of the customer system or the representative system in the GUI, and wherein the network appliance is configured to centrally manage, log, and route all screen updates and activities, via the customer application, of the customer system to the representative system, the network appliance being managed by the customer system or the representative system, wherein the customer application is automatically removed from the customer system after each support session.

2. A method according to claim 1, wherein the network appliance is further configured to provide a web-based user interface to facilitate establishment of a support session between the representative system and the customer system.

3. A method according to claim 1, wherein the network appliance is further configured to provide a chat interface for capturing instant messages between the representative system and the customer system, and to provide an audio interface for providing voice communication between the representative system and the customer system.

4. A method according to claim 1, wherein the network appliance is further configured to control access to the customer system according to a representative profile.

5. A method according to claim 1, wherein the representative application provides the GUI that includes a section for displaying a queue of users that requested the support service.

6. A method according to claim 1, wherein the customer application provides the GUI that includes, a first section for providing a chat session, a second section for initiating a file transfer relating to the support service; and a third section for viewing a screen of the representative system.

7. A method according to claim 1, wherein the network appliance is further configured to provide a web-based user interface to generate a report of the logged activities.

8. A method according to claim 1, further comprising:

configuring login information by a user of the customer system;

authenticating the representative system using the login information, wherein the login information is utilized by a user of the representative system to login in the network appliance; and upon authenticating the representative system, establishing a secure connection, via the network appliance, between the representative system and the customer system for routing the screen updates and the activities.

9. A method according to claim 1, wherein the network appliance is located at a premise of a user associated the customer system.

10. An apparatus comprising:

at least one processor; and at least one memory including computer program code, the at least one memory and the computer program code configured to, with the at least one processor, cause the apparatus to perform at least the following, initiate establishment of communication with a representative system, via a representative application, which is downloaded from the apparatus to the representative system, and a customer system, via a customer application, which is downloaded from the apparatus to the customer system, for permitting control of the customer system to the representative system for providing remote support service, based on selection of the customer system or representative system in a graphical user interface (GUI) rendered at the customer system and/or the representative system, wherein the customer system is configured to execute the customer application for enabling the support service, and the network apparatus is configured to centrally manage, log all screen updates and activities and to initiate forwarding of screen updates and activities, via the customer application, of the customer system to the representative system, wherein the apparatus is a standalone hardware and is managed by the customer system or the representative system, wherein the customer application is automatically removed from the customer system after each support session.

11. An apparatus according to claim 10, wherein the apparatus is further caused to:

present a web-based user interface configured to initiate establishment of a support session between the representative system and the customer system.

12. An apparatus according to claim 10, wherein the apparatus is further caused to:

capture instant messages between the representative system and the customer system.

13. An apparatus according to claim 10, wherein the apparatus is further caused to:

control access to the customer system according to a representative profile.

14. An apparatus according to claim 10, wherein the representative application provides the GUI that includes a section for displaying a queue of users that requested the technical support service.

15. An apparatus according to claim 10, wherein the customer application provides the GUI that includes, a first section for providing a chat session, a second section for initiating a file transfer relating to the technical support service; and a third section for viewing a screen of the representative system.

16. An apparatus according to claim 10, wherein the apparatus is further caused to:

log the activities and to generate a report of the logged activities.

17. An apparatus according to claim 10, wherein the network apparatus is configured to host multiple support sessions concurrently.

18. An apparatus according to claim 17, wherein if a representative associated with the representative system decides at any point during the sessions that another logged-in representative could better handle one or more of the sessions, then the representative can share the one or more sessions with the other representative.

19. An apparatus according to claim 18, wherein the other representative is selected from a list of representatives.

20. A method comprising:

downloading, into a memory, an application from a network appliance that is a standalone hardware device or devices to a representative system;

downloading, into another memory, another application from the network appliance, wherein the network appliance is configured to facilitate establishment of a remote technical support session by the representative system with a customer system, and wherein the downloading of the application and the another application is based on selection of the customer system or representative system in a graphical user interface (GUI) rendered at the customer system and/or the representative system;

wherein the network appliance is configured to centrally manage all screen updates and activities, via the customer application, of the customer system to the representative system, wherein the network appliance is managed by the customer system or the representative system; and initiating automatic self-removal of the customer application from the customer system upon termination of the technical support session.

21. A method according to claim 20, wherein the network appliance is further configured to provide a web-based user interface to facilitate establishment of the support session between the representative system and the customer system.

22. A method according to claim 20, wherein the network appliance is further configured to provide a chat interface for capturing instant messages to the customer system, and to provide an audio interface for providing voice communication between the representative system and the customer system.

23. A method according to claim 20, wherein the network appliance is further configured to control access to the customer system according to a representative profile.

24. A method according to claim 20, wherein the downloaded another application provides the GUI that includes a section for displaying a queue of customers that requested the technical support service.

25. A method comprising:

downloading, into a memory, an application from a network appliance that is a standalone hardware device at a customer system, downloading, into another memory, another application from the network appliance to a representative system, and wherein the downloading of the application and the another application is based on selection of the customer system or representative system in a graphical user interface (GUI) rendered at the customer system and/or the representative system, wherein the network appliance is configured to facilitate establishment of a remote technical support session with the representative system, and the network appliance is further configured to centrally manage, log all screen updates and activities and to initiate forwarding of the screen updates and activities, via the customer application, of the customer system to the representative system, wherein the network appliance is managed by the customer system or the representative system; and initiating automatic self-removal of the application from the customer application from the customer system upon termination of the technical support session.

26. A method according to claim 25, wherein the network appliance is further configured to provide a web-based user interface to facilitate establishment of the support session between the representative system and the customer system.

27. A method according to claim 25, wherein the network appliance is further configured to provide a chat interface for capturing instant messages to the representative system, and to provide an audio interface for providing voice communication between the representative system and the customer system.

28. A method according to claim 25, wherein the network appliance is further configured to control access to the customer system according to a representative profile.

29. A method according to claim 25, wherein the application provides the GUI that includes, a first section for providing a chat session, a second section for initiating a file transfer relating to the technical support service; and a third section for viewing a screen of the representative system.

* * * * *